United States Patent
Nagamune

(10) Patent No.: US 8,836,795 B2
(45) Date of Patent: Sep. 16, 2014

(54) IMAGE CAPTURING DEVICE AND IMAGE CAPTURING METHOD

(76) Inventor: Yasushi Nagamune, Tsukuba (JP)

(*) Notice: Subject to any disclaimer, the term of this patent is extended or adjusted under 35 U.S.C. 154(b) by 13 days.

(21) Appl. No.: 13/359,977

(22) Filed: Jan. 27, 2012

(65) Prior Publication Data

US 2012/0212619 A1 Aug. 23, 2012

Related U.S. Application Data

(63) Continuation of application No. PCT/JP2010/062832, filed on Jul. 29, 2010.

(30) Foreign Application Priority Data

Jul. 30, 2009 (JP) ................................. 2009-178343
Jul. 28, 2010 (JP) ................................. 2010-169505

(51) Int. Cl.
*H04N 5/33* (2006.01)
*H04N 9/04* (2006.01)
*H04N 5/225* (2006.01)

(52) U.S. Cl.
CPC ................. *H04N 5/33* (2013.01); *H04N 5/332* (2013.01); *H04N 9/045* (2013.01); *H04N 5/2256* (2013.01)
USPC .................... 348/164; 250/338.1; 250/339.14; 250/341.8; 250/342

(58) Field of Classification Search
CPC ......... H04N 5/33; H04N 5/332; H04N 9/045; H04N 5/2256; H04N 3/09; G06T 2207/10048; G02B 13/14; G02B 5/282
USPC ...................... 348/164; 250/336.1, 336.2–395
See application file for complete search history.

(56) References Cited

U.S. PATENT DOCUMENTS 7,235,775 B2* 6/2007 Masaki .......................... 250/226
7,755,016 B2* 7/2010 Toda et al. .................. 250/208.1

(Continued)

FOREIGN PATENT DOCUMENTS

EP 1 530 033 A1 5/2005
JP 62-208784 A 9/1987

(Continued)

OTHER PUBLICATIONS

Korean Office Action regarding Korean Patent Application No. 10-2012-7002645, issued by Korean Patent Office on May 16, 2013.

(Continued)

*Primary Examiner* — Sath V Perungavoor
*Assistant Examiner* — Nathnael Aynalem
(74) *Attorney, Agent, or Firm* — Novak Druce Connolly Bove + Quigg LLP

(57) ABSTRACT

Disclosed is an image capturing device provided with an irradiation unit, an image capturing unit, and a color representation setting unit. The irradiation unit irradiates a subject with infrared rays having different wavelength intensity distributions, the image capturing unit captures images of the subject by the respective infrared rays being reflected by the subject and forming image information indicating the respective images, and the color representation setting unit sets color representation information for representing the respective images, which are indicated by the formed image information, by different plain colors. Also disclosed is an image capturing method for separating infrared rays from a subject into infrared rays having different wavelength intensity distributions, capturing images of the subject by the respective infrared rays having different wavelength intensity distributions, forming image information indicating the respective images, and representing the respective images, which are indicated by the formed image information, by different plain colors.

17 Claims, 42 Drawing Sheets

(56) References Cited

U.S. PATENT DOCUMENTS

| | | | |
|---|---|---|---|
| 7,830,434 B2 * | 11/2010 | Li et al. | 348/294 |
| 2002/0172400 A1 | 11/2002 | Gloger et al. | |
| 2005/0133690 A1 | 6/2005 | Higashitsutsumi | |
| 2006/0071156 A1 | 4/2006 | Masaki | |
| 2010/0149493 A1 * | 6/2010 | Penn et al. | 353/20 |
| 2010/0289893 A1 * | 11/2010 | Yoo et al. | 348/135 |

FOREIGN PATENT DOCUMENTS

| | | |
|---|---|---|
| JP | 4-7992 A | 1/1992 |
| JP | 4-86075 A | 3/1992 |
| JP | 4-357926 A | 12/1992 |
| JP | 8-65690 A | 3/1996 |
| JP | 2000-152254 A | 5/2000 |
| JP | 2001-36916 A | 2/2001 |
| JP | 2002-171519 A | 6/2002 |
| JP | 2003-78908 A | 3/2003 |
| JP | 2004-77143 A | 3/2004 |
| JP | 2004-236915 A | 8/2004 |
| JP | 2005-45559 A | 2/2005 |
| JP | 2006-109120 A | 4/2006 |
| JP | 2006-148690 A | 6/2006 |
| JP | 4286123 B | 6/2009 |
| JP | 2012-009983 A | 1/2012 |

OTHER PUBLICATIONS

International Search Report issued in PCT/JP2010/062832 dated Sep. 7, 2010.

International Preliminary Report on Patentability issued in PCT/JP2010/062832 dated Feb. 7, 2012.

Office Action issue by Chinese Patent Office on Feb. 8, 2014 regarding a counterpart Chinese patent application No. 201080034037.6.

* cited by examiner

Fig. 22
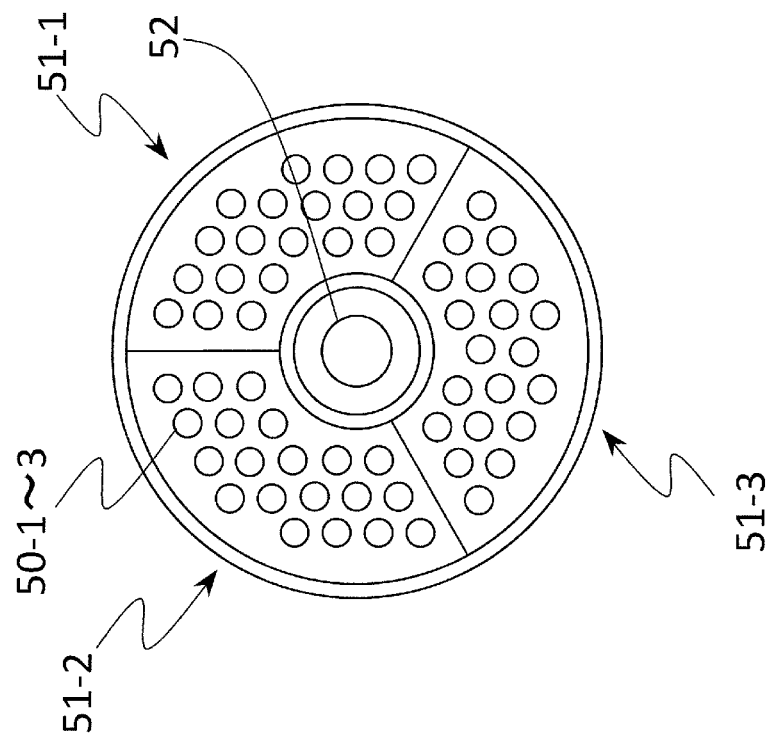
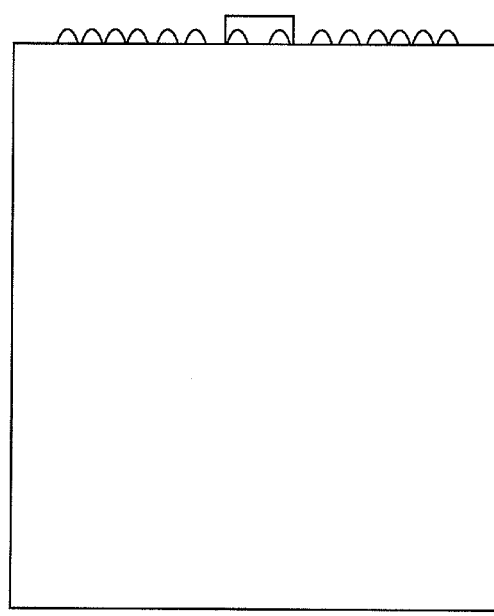

Fig. 27
(b-1)
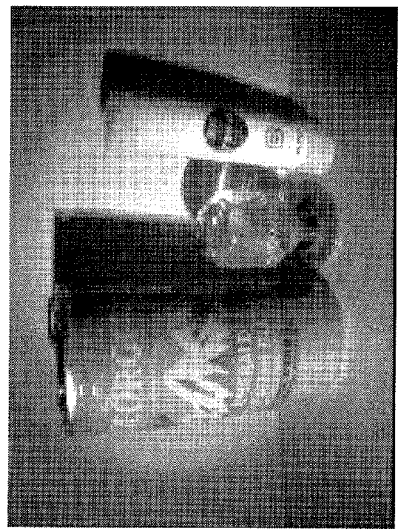
(b-3)
(b-2)
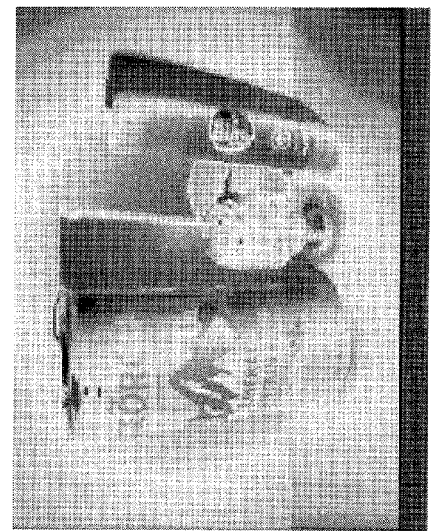
(b-4)

Fig. 31
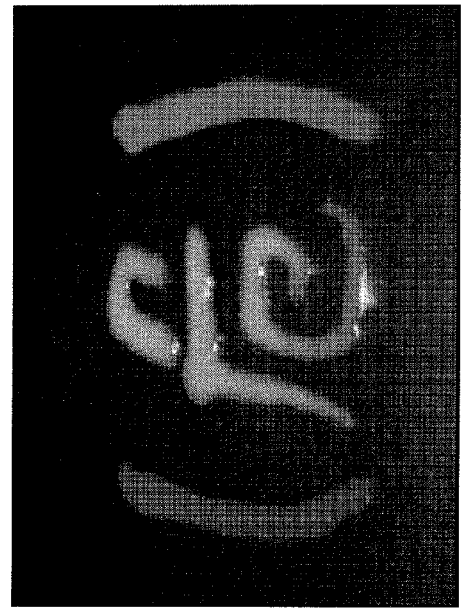
(b)
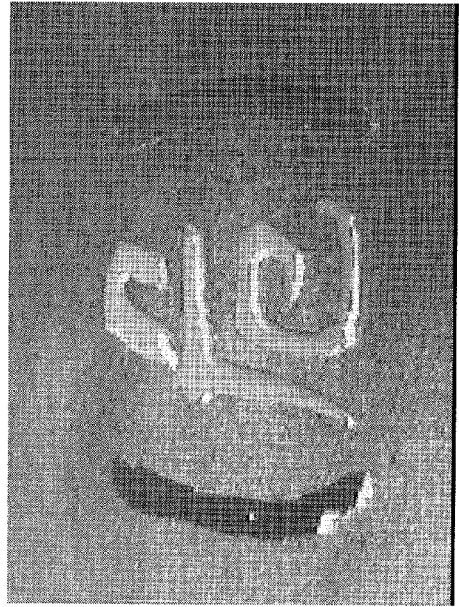
(a)

IMAGE CAPTURING DEVICE AND IMAGE CAPTURING METHOD

CROSS REFERENCE TO RELATED APPLICATIONS

This application is a U.S. continuation application filed under 35 USC 111(a) claiming benefit under 35 USC 120 and 365(c) of PCT application JP2010/062832, filed on Jul. 29, 2010, and benefit of priority from the prior Japanese Patent Application No. 2009-178343, filed on Jul. 30, 2009, and the prior Japanese Patent Application No. 2010-169505, filed on Jul. 28, 2010; the entire contents of which are incorporated herein by reference.

BACKGROUND OF THE INVENTION

1. Field of the Invention

The present invention relates to an image capturing device and an image capturing method for forming a color image of an object using an infrared beam reflected by the object or an infrared beam radiated by the object, and so on.

2. Description of the Related Art

Conventionally, as a method for forming a color image of an object by irradiating an infrared beam onto the object, a pseudo-color scale indication has been used. Namely, An intensity level of an intensity distribution of an infrared beam, which is obtained from an infrared beam reflected by the object, is divided into a plurality of intensity levels, and by assigning a proper color to each intensity level interval, a color image is formed and the color image is displayed as an infrared color image of the object.

However, although the pseudo-color scale indication is effective for use of extracting a certain intensity level in comparison with the gray scale indication (monochromatic indication), which indicates an image with density of gray color, and the monochromatic color scale indication, which indicates an image with density of a mono-color or a primary color, conversely, there are a lot of cases where the image becomes unnatural and hard to look because image data is not increased.

On the other hand, in the field of astronomy, conventionally, using a plurality of infrared band-pass filters to infrared beams irradiated by fixed stars and nebulas, a plurality of infrared images are formed, and a method of coloring each of the infrared images with proper and a plurality of colors and forming a synthetic color image has been performed.

However, there are a lot of cases where this synthetic color image is hard to look because this synthetic color image is colored, being not related to an image by a visible light. And, it is not able to capture satellites, etc. which do not radiate infrared.

On the other hand, conventionally, by composing a monochromatic infrared photograph and a normal visible light photograph, forming a synthetic color photograph has been also performed.

However, this synthetic color photograph is not related to real colors. Therefore, seemingly it is fantastic or artistic, but it looks unnatural because it is not real and it is photographed only at a daytime with the sun-beam.

On the other hand, a color still image capturing device is proposed, which includes a monochromatic video camera, a light source which radiates red, blue, and green lights, a control circuit which controls so as to emit red, blue, and green lights from the light source sequentially, and a capturing synthetic circuit which sequentially captures output video signals of the video camera when the light source radiates the red, the blue, and the green lights (for example, reference: Japanese Patent laid-open publication No. Tokkaihei 08-65690).

However, the color still image capturing device of Japanese Patent laid-open publication No. Tokkaihei 08-65690 is a device related to a visible light region but is not intended for infrared beams. And, the color still image capturing device of Japanese Patent laid-open publication No. Tokkaihei 08-65690 is a device which composes colors by additive mixture color with the same colors as colors of visible lights radiated, therefore, at least at this point, it is different from following disclosed one aspect of the present invention and one embodiment of the present invention.

On the other hand, an X-ray CT scanning device is proposed which includes an X-ray source generating X-ray, a two-dimensional X-ray detector detecting an X-ray transmitted through an inspected body, and a patient bed, where the X-ray source can turn consecutively with a synchronization with the movement of the patient bed and can scan the inspected body spirally, the X-ray CT scanning device having a energy conversion means which can change energy properties of an X-ray irradiated onto an object along a slice direction, and by scanning spirally using the energy conversion means, the device being capable of measuring at a same slice position by X-ray having a plurality of and different effective energies, and by extrapolating obtained data among data measured with a same effective energy, and it is possible to obtain an image having an arbitrary effective energy and an difference between images having an arbitrary effective energy (for example, reference: Japanese Patent laid-open publication No. Tokkai 2004-236915).

However, the X-ray CT scanning device of Japanese Patent laid-open publication No. Tokkai 2004-236915 is a device related to an X-ray region, but is not intended for infrared beams. And, the X-ray CT scanning device of Japanese Patent laid-open publication No. Tokkai 2004-236915 is an X-ray transmission image capturing device, which is different from the present invention. Furthermore, a color synthetic image by the X-ray CT scanning device of Japanese Patent laid-open publication No. Tokkai 2004-236915 is colored so as to improve visibility and is quite different coloring from nature, therefore, at least at this point, the X-ray CT scanning device is different from the following disclosure of one aspect of the present invention and one embodiment of the present invention.

On the other hand, a wavelength selecting type liquid crystal camera device is proposed which sets a light image obtained by capturing operation as a light image at each wavelength region and extracts a specific object image, including a liquid crystal filter which has an optical band pass filter function, and can change the center wavelength by voltage, an imaging device which photo-electrically changes a light image at a wavelength region selected by this liquid crystal filter and generates a video signal, and an image calculating part which calculates a signal level difference between two images having different wavelengths output from this imaging device, and generates a video signal based on an absolute value of this difference (for example, Japanese Patent laid-open publication No. Tokkai 2000-152254).

However, the wavelength selecting type liquid crystal filter of Japanese Patent laid-open publication No. Tokkai 2000-152254 is a device which can transmit only one wavelength region, but is not equivalent to the present invention. And the wavelength selecting type liquid crystal camera device of Japanese Patent laid-open publication No. Tokkai 2000-152254 is a device which is intended to improve visibility by detecting a signal level difference between two images having different wavelengths and by imaging, therefore, at least at this point, the wavelength selecting type liquid crystal camera device is different from following disclosed one aspect of the present invention and one embodiment of the present invention.

In addition, in Japanese Patent laid-open publication No. Tokkai 2000-152254, a wavelength selecting type liquid crystal camera device is also proposed which sets a light image obtained by capturing operation as a light image at each wavelength region and extracts a specific object image, including a liquid crystal filter which has an optical band pass filter function, and which is capable of changing the center wavelength by voltage, a color imaging device which separates a light image at each wavelength region selected by this liquid crystal filter into red (R), green (G), and blue (B) regions, photo-electrically changes, and generates a R color video signal, a G color video signal, and a B color video signal, wherein the wavelength selecting type liquid crystal camera calculates a signal level difference about each pixel having a same spatial coordinate to each of R color, G color, and B color about R color video signal, G color video signal, and B color video signal output from this color imaging device, and generates R color video signal, G color video signal, and B color video signal based on an absolute value of this difference, and a color video signal composing part which composes R color video signal, G color video signal, and B color video signal output from this color imaging device and generates a synthetic color video signal.

However, this liquid crystal filter of Japanese Patent laid-open publication No. Tokkai 2000-152254 is a device which separates a light image into a red (R) region, a green (G) region, and a blue (B) region, and the light is intended for a visible region, therefore, at least at this point, the wavelength selecting type liquid crystal camera device is different from following disclosure of one aspect of the present invention and one embodiment of the present invention.

On the other hand, an infrared color image forming device is proposed, which includes an infrared camera which detects an infrared beam radiating or reflected from an object and obtains infrared spectrum image, a memory device which beforehand memorizes correspondence data between a color and an infrared spectrum radiating intensity or an infrared spectrum reflectivity about the object, a first processing means which decides a color at each position of the infrared spectrum image from a value of an infrared spectrum radiating intensity or an infrared spectrum reflectivity at each position of the infrared spectrum image based on the correspondence data, and a second processing means which synthetically colors at each position of an image of the object based on a color data obtained by the first processing means (for example, reference: Japanese Patent laid-open publication No. Tokkai 2002-171519).

However, the infrared color image forming device of Japanese Patent laid-open publication No. Tokkai 2002-171519 requires a measurement and a preparation of correspondence data between a real color of an object and an infrared spectrum radiating intensity or an infrared spectrum reflectivity beforehand, therefore, a prior minute visible and infrared spectrum measurement of the object is essential. Such correspondence data requires a memory device which memorizes the correspondence data and time, at least at this point, the infrared color image forming device is different from the present invention which does not need coloring based on comparison with correspondence data.

On the other hand, a night vision color camera is proposed, which is characterized by irradiating an infrared beam and a ultraviolet beams onto an object and by outputting a color image signal by judging a color from an infrared beam image signal obtained by capturing the object and an ultraviolet beam image signal (for example, reference: Japanese Patent laid-open publication No. Tokkai 2001-36916 and Japanese Patent laid-open publication No. Tokkai 2005-45559).

However, the night vision color camera of Japanese Patent laid-open publication No. Tokkai 2001-36916 is a camera which needs irradiating an ultraviolet beam, therefore, the present invention is different at least at a point where the present invention does not need such an ultraviolet irradiation.

On the other hand, an infrared capturing device is proposed, which includes plural optical filters which selectively transmit or reflect infrared wavelength regions which are different each other in an optical system, a plurality of capturing means which capture each infrared light image obtained by a plurality of optical filters, and a signal processing means which forms an image data from an image signal obtained by plural capturing means (for example, reference: Japanese Patent laid-open publication No. Tokkaisho 62-208784).

However, the infrared capturing device of Japanese Patent laid-open publication No. Tokkaisho 62-208784 is an image capturing device which is only for infrared beams and a relation with image capturing under a visible light is not mentioned. And, coloring, which is totally unrelated to an image by a visible light, is performed. Moreover, it is not able to capture an object, etc. which do not radiate infrared beams. In other words, reappearing color of an object under a visible light by capturing with an infrared irradiation is not disclosed.

On the other hand, an infrared image capturing device is proposed, which is characterized by displaying an infrared image on a color display, and by displaying output signals from infrared detectors having different detecting wavelengths, the signals corresponding to different dies, on a display (for example, reference: Japanese Patent laid-open publication No. Tokkaihei 04-86075).

However, the infrared image capturing device of Japanese Patent laid-open publication No. Tokkaihei 04-86075 is an image capturing device which is only for an infrared beam and a relation to an image capturing under a visible light is not described. And, the coloring is totally unrelated to an image by a visible light. Moreover, it is not able to capture an object, etc. which do not radiate infrared beams. It is not disclosed to reappear color of an object under a visible light by irradiating an infrared beam.

On the other hand, an infrared image capturing device is proposed, which is an infrared image capturing device including an infrared beam light source having a radiation distribution at an infrared region, an image capturing lens, a CCD sensor where light receiving elements having a light receiving sensitivity at an infrared region and a visible region are placed in a shape of a matrix, a plurality of color filters each of which transmits a visible light at a specific wavelength region and an infrared beam at a specific wavelength region and which is characterized by comprising an infrared transmitting filter which transmits an infrared beam excluding a visible light, an image capturing signal forming means which generates an image signal based on a light incidence of an infrared beam into the image sensor, a digital conversion means which converts the image capturing signal into digital signal, and a memory which temporarily maintains a digital signal converted by the digital conversion means (for example, reference: Japanese Patent laid-open publication No. Tokkai 2006-109120).

However, the infrared image capturing device of Japanese Patent laid-open publication No. Tokkai 2006-109120 needs an infrared transmitting filter which transmits an infrared beam excluding a visible light.

On the other hand, an image capturing device is proposed, which includes an image capturing means which captures an object, generates a plurality of color signals based on a visible light component and generates an infrared beam brightness signal based on an infrared component from the object, and a color image generating means which generates a color image based on each color signal generated by the image capturing means and an infrared beam brightness signal (for example, reference: Japanese Patent laid-open publication No. Tokkai 2006-148690).

However, the image capturing device of Japanese Patent laid-open publication No. Tokkai 2006-148690 is a device which captures an image by synthesizing an image under a visible light and an image under a infrared beam, so has a difficulty in a color image capturing under a darkness.

On the other hand, a method for improving an eyesight in a car, in particular, during a night time, at a bad weather, or at fog, where an image of a current traffic scene is captured by a camera reacting at an outside region of a visible spectrum, and the image is reappeared by a visible spectrum using an optical system displaying device in a car, is proposed, which is characterized by automatically distinguishing a type of an object included in a traffic scene captured by a camera and by indicating an object distinguished depending on a type on an optical system displaying device by a brightness and/or color corresponding to a typical brightness and/or color which is had by the object under a day light (for example, reference: Japanese Patent laid-open publication No. Tokkai 2003-78908).

However, the means and the device improving view in a car of Japanese Patent laid-open publication No. Tokkai 2003-78908 have a problem where a burden of image processing becomes very large because type of all objects included in a video image must be distinguished. And, there is sense of incongruity because of display by monochromatic or pseudo-color with mono-colors.

On the other hand, an endoscope device is proposed, which is characterized by including an illuminating means which is cable of illuminating an illuminating light which includes a white illuminating light in a visible light region and an illuminating light including a light in a wavelength region except a visible light region onto an object selectively, and a plurality of kinds of filters which transmit lights in different wavelength regions in a visible light region, and, where the filters are mosaic-filters having plural transmitting property which also transmit a light in a wavelength region more than a visible light region, further including a solid state image capturing device which captures an image of an object illuminated by the illuminating means, the mosaic-filter being put on a receiving surface, and a means obtaining a color image by assigning a desired color corresponding to each kind of filter of the mosaic-filter, to each image element of an image corresponding to an output signal which read out from the solid state image capturing device by capturing an image of the object (for example, reference: Japanese Patent laid-open publication No. Tokkaihei 04-357926).

However, the endoscope device of Japanese Patent laid-open publication No. Tokkaihei 04-357926 is a device which is cable of detecting color differences of each part of an object which is difficult to distinguish by a normal image in a visible region and displaying by pseudo-color, where it is not disclosed to reappear color of an object under a visible light by capturing an image with an infrared irradiation.

On the other hand, a system which is cable of measuring chromaticity in a visible and an invisible regions is proposed, which is characterized by including, at least, a spectrum optical part which receives a radiation light in all wavelength region which is radiated from an object sample, and which makes the radiation light into a spectrum of elemental lights of n units (n>=3) having different center wavelength each other, a photoelectric conversion part which converts each of the element lights of n unit photo-electrically, and generates each of electric signals of n unit which correspond to the element lights of n unit, respectively, an image processing part which, by processing the electric signals of n unit, performs a generation of a pseudo-color image of the sample and a calculation of a number value which is defined based on a coloring system for doing color display of the pseudo-color image, and an image outputting part which output the pseudo-color image and/or the number value, where the image processing part comprises, at least, an image signal generation processing means which, by independently applying each of sensitivity function of m units (m>=3) against one signal group comprising the electric signals of n unit, generates pseudo-color basic image signals of m unit corresponding to each sensitivity function, a vector conversion processing means which, by applying matrix M to the pseudo-color basic image signals of m units and performing vector conversion, generates three pseudo-color image signals, an image formation processing means which composes the three pseudo-color image signals and generates the pseudo-color image, and a color processing means which calculates the number value defined based on the color system using the three pseudo-color image signals, where the sensitivity function of m units which is determined based on a correlation between a difference, which should be observed, of a physical condition or a chemical condition forming between each object which composes object group which the object sample belongs and a difference of a waveform forming between optical spectrum of each object which composes the object group, and where the matrix M is a matrix for approaching a most suitable sensitivity property and is, as a result, determined a color reproduction error forming at a time of generating the three pseudo-color image signals so as to become minimal (for example, reference: Japanese Patent laid-open publication No. Tokkai 2004-77143).

However, the system which is cable of measuring chromaticity in a visible and an invisible regions of Japanese Patent laid-open publication No. Tokkai 2004-77143 is a system which evaluates a desired information which is intended to be obtained from object sample by comparing with a standard sample, using an invisible color value and a color indication of a pseudo-color image, and which needs a preparation of a standard sample, and it is necessary to make a spectrum minutely in a wide wavelength range, therefore, there is a problem where a burden of image processing becomes very large.

SUMMARY OF THE INVENTION

One of the problems that the present invention aims to solve is to form a color image having colors as natural as possible under a darkness.

For achieving the purpose mentioned above, as one aspect of the present invention, an image capturing device is disclosed which includes an irradiating part, a capturing part, and a color setting part; wherein the irradiating part irradiates infrared beams having different wavelength intensity distributions onto an object; the capturing part captures an image of the object using each infrared beam of the infrared beams having different wavelength intensity distributions, the each infrared beam being reflected by the object, and forms image data which represent each image; and the color setting part sets to the image data color data for coloring the each image with each different single color, the each image being represented by the image data which are formed.

Furthermore, it is possible to define various color spaces, thereby various colorings are possible in general. Specifically, an RGB color system using three primary colors of light "R", "G", and "B" is a typical example. In the RGB coloring system, it is possible to define a light of wavelength 700 nm as a primary color "R", a light of wavelength 546.1 nm as a primary color "G", and a light of wavelength 435.8 nm as a primary color "B". But, on many display devices except for special display devices such as laser projectors, it is difficult to display such fixed one wavelength, therefore, it is possible to set or define "R", "G", and "B" appropriately as colors having specific wavelength intensity distributions. In other words there is not only the case when expressions called "R", "G", and "B" express primary colors or mono-colors having specific one wavelength, respectively, but also the case when the expressions express primary colors or mono-colors having specific wavelength intensity distributions and appearances similar to three primary colors of "R", "G", and "B", respectively.

And, it is said that, as cone cells which are visual cells of a person, there are 3 cells which are a cell which has sensitivity in a red wavelength region or "R wavelength region" which is at a central wavelength around 564 nm and in a wavelength range around 400 nm to around 680 nm, a cell which has sensitivity in a green wavelength region or "G wavelength region" which is at a central wavelength around 534 nm and in a wavelength range around 400 nm to around 650 nm, and a cell which has sensitivity in a blue wavelength region or "B wavelength region" which is at a central wavelength around 420 nm and in a wavelength range around 370 nm to around 530 nm. And, a person is said to see a color corresponding to "R", "G", and "B" by those three kinds of cells, respectively. Furthermore, a precise definition is difficult because there are individual differences about those wavelength ranges.

And, with a separation of a visible light from an object into "R wavelength region", "G wavelength region", and "B wavelength region", by a color glass filter or etc., each image by each wavelength region is captured. Then it is preferable to color luminosity of the image by "R wavelength region" with "R", luminosity of the image by "G wavelength region" with "G", and luminosity of the image by "B wavelength region" with "B", and to color and display those three colored images as a color image by, so-called, additive mixture color where three primary colors of a light are piled up and displayed.

It is possible to perform a CMY color indication display where "C" (Cyan), "M" (Magenta), and "Y" (Yellow) are three primary colors. This is often used at a case when luminosity of an image is displayed by applying ink, etc. having specific color density to white paper, etc., which is called subtractive mixture color because colors are mixed to block light.

Furthermore, it is also preferable to use a RGBB color display or a CMYBk (key) color display where B (Black) is added, CMYK (Key) color display, etc.

In addition, in each aspect of the present invention, to color means to express luminosity of an image under a visible light or an in-plane intensity distribution of a specific physical quantity with luminosity of a color. But, as mentioned above, there are cases to color with a primary color or a mono-color and to color with a plurality of colors by additive mixture color or by subtractive mixture color for displaying a color image or a color indication. In addition, there is a case when a primary color or a mono-color consists of a specific one wavelength or has a specific wavelength intensity distribution.

Furthermore, on the other hand, it is possible to consider an infrared beam to be an invisible light or an electromagnetic wave which is more than around 750 nm, according to a relative spectral sensitivity curve which is an international standard of a sensitivity of an eye of a person. But, because there is an individual difference in wavelength sensitivity of eyes of a person, it is difficult to make a precise drawing, and the wavelength may fluctuate in some cases.

In addition, an infrared beam is generally considered to be an invisible light which a person cannot see. However, even if a light belongs to an infrared beam category, a person can see it in a case when its intensity is very strong.

Furthermore, it is also possible to consider "R" or "R wavelength region" to be a color or a light having a center wavelength around 640 nm, "G" or "G wavelength region" to be a color or a light having a center wavelength around 530 nm, and "B" or "B wavelength region" to be a color or a light having a center wavelength around 435 nm, etc.

Furthermore, it is also possible to consider "R" or "R wavelength region" to be a color or a light having a wavelength region around 626 nm to around 740 nm, "G" or "G wavelength region" to be a color or a light having a wavelength region around 500 nm to around 565 nm, and "B" or "B wavelength region" to be a color or a light having a wavelength region around 450 nm to around 485 nm, etc.

Furthermore, it is also possible to consider "R" or "R wavelength region" to be a color or a light having a wavelength region around 570 nm to around 750 nm, "G" or "G wavelength region" to be a color or a light having a wavelength region around 480 nm to around 570 nm, and "B" or "B wavelength region" to be a color or a light having a wavelength region around 400 nm to around 480 nm, and so on.

Thus, it is difficult to distinguish "R", "G", "B", "R wavelength region", "G wavelength region", and "B wavelength region" minutely, and in some cases wavelength ranges may fluctuate and a degree of a heap may also fluctuate. Furthermore, a light and a light beam mean a same thing.

In addition, as another aspect of the present invention, in one of the aspects mentioned above, a configuration is disclosed wherein the irradiating part further generates infrared beams having the different wavelength intensity distribution by infrared beams which one or a plurality of any one of LEDs (light emitting diodes), infrared LEDs, LDs (laser diodes), and infrared LDs radiates/radiate.

In addition, as still another aspect of the present invention, in one of the aspects mentioned above, a configuration is disclosed wherein the capturing part further comprises a solid state capturing device such as a CCD (Charge Coupled Device) image sensor, a CMOS (Complementary Metal Organic semiconductor), an ADP (Avalanche Photodiode) image sensor, etc., a capturing tube or a capturing plate such as Image Dissector, Iconoscope, an Image Orthicon, a Vidicon, a Saticon, a Plumbicon, a Newvicon, a Newcosvicon, a Chalnicon, a Trinicon, a HARP (High-gain Avalanche Rushing amorphous Photoconductor), a magnetic-focus type image intensifier, micro-channel plate, or a bolometer type capturing device such as a MEMS (Micro Electro Mechanical System) bolometer, or a pyroelectric type capturing device, etc.

It is preferable that the capturing device is configured with a solid state capturing device using a single element system such as Si or Ge, etc. or a compound system such as SiGe, InAs, InSb, PbS, PBSe, InGaAs, or HgCdTe, etc.

In addition, as still another aspect of the present invention, in any one of embodiments mentioned above, a configuration is disclosed wherein the capturing device further includes a lens, an iris, or a filter.

Furthermore, a color setting means that in displaying an image whether luminosity of the image is colored by what color is set beforehand. A color setting may be performed, for example, at timing of transmission of image data or an image signal and by corresponding image data or an image signal to a standard trigger consecutively. And, a color setting may be performed by forming color data or a color setting signal separately, by overlaying color data or a color setting signal on image data or an image signal, with an address in a memory, or by attaching a label or a flag in signal processing, etc.

In addition, as still another aspects of the present invention, an image capturing device is disclosed which comprises: an irradiating part, a capturing part, a color setting part, and a control processing part; wherein the capturing part sends a capturing operation start signal to the control processing part; the control processing part sends an irradiating operation start instruction signal to the irradiating part based on the capturing operation start signal and sends a color setting operation start instruction signal to the color setting part, the irradiating part irradiates infrared beams having different wavelength intensity distributions onto an object based on the irradiating operation start instruction signal; the capturing part captures an image of the object using each infrared beam of the infrared beams having different wavelength distributions, the each infrared beam being reflected by the object, and forms image data which represent the each image; and the color setting part sets, based on the color setting operation start instruction signal, to the image data color data for coloring the each image with each different single color, the each image being represented by the image data which are formed.

Furthermore, in any one of aspects of the present invention, information or data is content or a state and news of a thing or a matter. Information or data is preferable to be transmitted by a signal. Therefore, there is a case when Information or data and a signal mean a same thing.

In addition, as still another aspect of the present invention, an image capturing device is disclosed which comprises: an irradiating part, a capturing part, a color setting part, and a control processing part; wherein the control processing part sends an irradiating operation start instruction signal to the irradiating part, furthermore sends a capturing operation start instruction signal to the capturing part, and furthermore sends a color setting operation start instruction signal to the color setting part; the irradiating part irradiates infrared beams having different wavelength intensity distributions onto an object based on the irradiating operation start instruction signal; the capturing part captures an image of the object using each infrared beam of the infrared beams having different wavelength distributions based on the capturing operation start instruction signal, the each infrared beam being reflected by the object, forms image data which represent the each image, and sends the image data to the color setting part; and the color setting part sets, based on the color setting operation start instruction signal, to the image data color data for coloring the each image with each different single color, the each image being represented by the image data which are formed.

In addition, as still another aspect of the present invention, an image capturing device is disclosed which comprises: an irradiating part, a capturing part, a color setting part, and a control processing part; wherein the irradiating part sends an irradiating operation start signal to the control processing part, furthermore irradiates infrared beams having different wavelength intensity distributions onto an object, the control processing part sends, based on the irradiating operation start signal, a capturing operation start instruction signal to the capturing part, furthermore sends a color setting operation start instruction signal to the color setting part; the capturing part captures an image of the object using each infrared beam of the infrared beams having different wavelength distributions, the each infrared beam being reflected by the object, forms image data which represent the each image, and sends the image data to the color setting part; and the color setting part sets, based on the color setting operation start instruction signal, to the image data color data for coloring the each image with each different single color, the each image being represented by the image data which are formed.

In addition, as still another aspect of the present invention, an image capturing device is disclosed which comprises: an irradiating part, a capturing part, a color setting part, and a control processing part; wherein the color setting part sends a color setting operation start signal to the control processing part, the control processing part sends, based on the color setting operation start signal, a capturing operation start instruction signal to the capturing part, furthermore sends a capturing operation start instruction signal to the capturing part; the irradiating part sends, based on the irradiating operation start instruction signal, irradiates infrared beams having different wavelength intensity distributions onto an object, the capturing part captures, based on the capturing operation start instruction signal, an image of the object using each infrared beam of the infrared beams having different wavelength distributions, the each infrared beam being reflected by the object, forms image data which represent the each image, and sends the image data to the color setting part; and the color setting part sets to the image data color data for coloring the each image with each different single color, the each image being represented by the image data which are formed.

In addition, as still another aspect of the present invention, in any one of the aspects mentioned above, a configuration is disclosed which furthermore comprises a displaying part, the control processing part sends, furthermore, a displaying operation start instruction signal to the displaying part, the displaying part colors and displays, based on the displaying operation start instruction signal, each of images which are expressed by image data which are set the color data according to the color data.

In addition, as still another aspect of the present invention, in any one of the aspects mentioned above, a configuration is disclosed which furthermore comprises an image storing part, the control processing part furthermore sends an image storing operation start instruction signal to the image storing part, the image storing part stores, based on the image storing operation start instruction signal, image data which are set the color data.

In addition, as still another aspect of the present invention, in any one of the aspects mentioned above, a configuration is disclosed wherein the image storing part further sends image data, which are set with the color data, stored in the image storing part, to the displaying part based on the image storing operation start instruction signal, and the displaying part colors and displays, based on the displaying operation start instruction signal, an image which is represented by the image data, which are set with the color data, and/or, an image which is represented by the image data, which are set with the color data, stored in the image storing part, according to the color data.

As another aspect of the present invention, in any one of the aspects mentioned above, it is preferable that the irradiating part further informs to the part which sends the irradiating operation start instruction signal that the irradiating part receives the irradiating operation start instruction signal.

As another aspect of the present invention, in any one of the aspects mentioned above, it is preferable that the capturing part further informs to the part which sends the capturing operation start instruction signal that the capturing part receives the capturing operation start instruction signal.

As another aspect of the present invention, in any one of the aspects mentioned above, it is preferable that the color setting part further informs to the part which sends the color setting operation start instruction signal that the color setting part receives the color setting operation start instruction signal.

As another aspect of the present invention, in any one of the aspects mentioned above, it is preferable that the control processing part further informs to the image capturing operation start signal that the control processing part receives the image capturing operation start signal.

As still another aspect of the present invention, in any one of the aspects mentioned above, it is preferable that one or more of the irradiating operation start instruction signal, the image capturing operation start signal, and the color setting operation start instruction signal is/are further sent with an infrared beam.

As still another aspect of the present invention, in any one of the aspects mentioned above, it is preferable that one or more of the irradiating operation start instruction signal, the image capturing operation start instruction signal, and the color setting operation start instruction signal is/are further sent with an infrared beam.

As still another aspect of the present invention, in any one of the aspects mentioned above, it is preferable that one or more of the irradiating operation start signal, the image capturing operation start instruction signal, and the color setting operation start instruction signal is/are further sent with an infrared beam.

As still another aspect of the present invention, in any one of the aspects mentioned above, it is preferable that one or more of the irradiating operation start instruction signal, the image capturing operation start instruction signal, and the color setting operation start signal is/are further sent with an infrared beam.

In addition, as still another aspect of the present invention, in any one of the aspects mentioned above, a configuration is disclosed wherein one or more of the displaying operation start instruction signal and the image storing operation start instruction signal is/are further sent with an infrared beam.

In addition, as still another aspect of the present invention, in any one of the aspects mentioned above, it is preferable that one or more of various operation start signals and various operation start instruction signals is/are further sent by radio.

In addition, as still another aspect of the present invention, in any one of the aspects mentioned above, it is preferable that the irradiating part further overlaps the irradiating operation start signal onto one or more of the infrared beams having different wavelength intensity distributions.

In addition, as still another aspect of the present invention, in any one of the aspects mentioned above, it is preferable that the capturing part further comprises a wavelength detecting part; wherein the wavelength detecting part measures wavelength of one or more of the infrared beams having different wavelength intensity distributions and/or one or more of infrared beams having different wavelength intensity distributions which are reflected by the object, and detects state of an operation of the irradiating part.

In addition, as still another aspect of the present invention, in any one of the aspects mentioned above, it is preferable that the capturing part further comprises an information generating part; wherein the information generating part generates a composite signal or a component signal from the capturing operation start signal and the image data.

In addition, as still another aspect of the present invention, in any one of the aspects mentioned above, it is preferable that the control processing part further comprises an information separating part; wherein the information separating part separates the composite signal or the component signal into one or more of the capturing operation start signal and the image data. In addition, a component signal is a video signal or an image data wherein a brightness signal, a synchronization signal, and color signal constituting an image are separated and able to be treated, a composite signal is a composite synchronization signal or an image data wherein a brightness signal, a synchronization signal, and color signal constituting an image are composed and able to be treated even with one signal cable.

In addition, as still another aspect of the present invention, in any one of the aspects mentioned above, a configuration is disclosed wherein an image converting part is further comprised and the image converting part forms an image data or an image which is converted by applying one or more of the four basic operations of arithmetic which includes addition, subtraction, multiplication and division, an exponential function, a logarithmic function and an arbitrary function to one or more of the image data, which are set with the color data, and the image data, which are set with the color data, stored in the image storing part.

In addition, as still another aspect of the present invention, in any one of the aspects mentioned above, a configuration is disclosed wherein the capturing part further generates a capturing operation start signal, an information generating part is further comprised and the information generating part generates composite data wherein the capturing operation start signal and the image data are composed as separable.

In addition, as still another aspect of the present invention, in any one of the aspects mentioned above, a configuration is disclosed wherein the control processing part further comprises an information separating part and the information separating part separates one or more of the capturing operation start signal and the image data from the composite data.

In addition, as still another aspect of the present invention, in any one of the aspects mentioned above, a configuration is disclosed wherein among images represented by the image data which are formed, the color setting part further sets color data for coloring a first image using "R", the first image being captured using an infrared beam having a wavelength intensity distribution where a wavelength range or a center wavelength is located at a shortest wavelength side, to the image data representing the first image, and sets color data for coloring the image which is captured other than the first image using other than "R" to image data representing the image which is captured other than the first image.

In addition, as still another aspect of the present invention, an image capturing device is disclosed which comprises a separating part, a capturing part, and a color setting part; wherein the separating part separates a light beam from an object into infrared beams having different wavelength intensity distributions; the capturing part captures an image of the object and forms image data of the object using each of the infrared beams; and the color setting part sets color data for coloring a first image using "R" among the images which are captured, the first image being captured using an infrared beam having a wavelength intensity distribution where a wavelength range or a center wavelength is located at a shortest wavelength side, to image data representing the first image, and sets color data for coloring the image which is captured other than the first image using other than "R" to the image data other than image data representing the first image.

In addition, as still another aspect of the present invention, in any one of aspects mentioned above, an image capturing device is disclosed wherein the color setting part sets color data for coloring a first image using "R" among the images which are captured, the first image being captured using a first infrared beam having a wavelength intensity distribution where a wavelength range or a center wavelength is located at a shortest wavelength side, to image data representing the first image, sets color data for coloring a second image using "G", the second image being captured using a second infrared beam having a wavelength intensity distribution where a wavelength range or a center wavelength is located at a shortest wavelength side next to the first infrared beam, to image data representing the second image, and sets color data for coloring a third image using "B", the third image being captured other than the first image and the second image to image data representing the third image.

In addition, as further another aspect of the present invention, an image capturing device is disclosed wherein the image capturing device comprises a separating part, a capturing part, and a color setting part; wherein the separating part separates a light beam from an object into light beams having different wavelength intensity distributions; the capturing part captures an images of the object and forms image data of the object using each of the light beams having different wavelength intensity distributions; and the color setting part sets color data for coloring a first image using "R", among the images which are captured, the first image being captured using a light beam having a visible light having "R wavelength region" and an infrared beam having a wavelength intensity distribution closest to the "R wavelength region", to image data representing the first image, and sets color data for coloring the image which is captured other than the first image using other than "R", onto the image data other than image data representing the first image.

In addition, as still another aspect of the present invention, in any one of the aspects mentioned above, an image capturing device is disclosed wherein the color setting part sets color data for coloring a first image using "R", among the images which are captured, the first image being captured using a light beam having a visible light having "R wavelength region" and a first infrared beam having a wavelength intensity distribution closest to the "R wavelength region", to image data representing the first image, sets color data for coloring a second image using "G", the second image being captured using a light beam having a visible light having "G wavelength region" and an infrared beam having a wavelength intensity distribution closest to the first infrared beam, to image data representing the second image, and sets color data for coloring a third image using "B", the third image being captured other than the first image and the second image to image data representing the third image.

In addition, as still another aspect of the present invention, in any one of aspects mentioned above, it is further preferable that the first image is colored using "R", the second image is colored using "B", and the third image is colored using "G."

In addition, as still another aspect of the present invention, in any one of aspects mentioned above, it may be further a case that the first image is colored using "G", the second image is colored using "B", and the third image is colored using "R."

In addition, as still another aspect of the present invention, in any one of aspects mentioned above, it may be further a case that the first image is colored using "G", the second image is colored using "R", and the third image is colored using "B."

In addition, as another aspect of the present invention, in any one of aspects mentioned above, it may be further a case that the first image is colored using "B", the second image is colored using "R", and the third image is colored using "G."

In addition, as still another aspect of the present invention, in any one of aspects mentioned above, it may be further a case that the first image is colored using "B", the second image is colored using "G", and the third image is colored using "R."

In addition, as another aspect of the present invention, in any one of aspects mentioned above, it is preferable further that the predetermined colors are constituted using one or more of single colors or primary colors of "R", "G", and "B", or suitable different single colors or primary colors, furthermore, as a combination of them.

In addition, as still another aspect of the present invention, in any one of aspects mentioned above, it is preferable further that the separating part comprises one or more of one or plurality of band-pass filters, one or plurality of dichroic plate filters, or one or plurality of dichroic prism filters, which have different transmission wavelength intensity distributions or different reflectivity wavelength intensity distributions Furthermore, as a filter for three plates comprising dichroic prisms, there are a compound prism which comprises three prisms and outputs lights from a first prism and a second prism through two internal reflections, respectively (so-called, dichroic prism of Phillips type), a compound prism which comprises three prisms and outputs a light from a first prism through two internal reflections and outputs a light from a second prism through one internal reflection (so-called, dichroic prism of Sony type), an original triangle pillar shape compound prism which comprises three right angle triangular prisms and one second-class side triangular prism (so-called, dichroic prism of cascade type), an original square pillar shape compound prism which comprises four right angle second prize side triangular prisms and have an X-shaped join (so-called, cross dichroic prism, or, X-cube), a cubicalness compound prism which comprises two tetrahedron and two quadrangular pyramid, has Z-shaped side and join, and has three-dimensional light path (so-called, Z-cube), etc.

In addition, as still another aspect of the present invention, in any one of aspects mentioned above, it is preferable further that the separating part comprises a glass filter, a plastic filter, a liquid crystal filter, etc.

In addition, as still another aspect of the present invention, in any one of aspects mentioned above, a configuration is disclosed wherein the capturing part further comprises a plurality of pixels, the separating part being attached to each of the plurality of pixels.

In addition, as still another aspect of the present invention, in any one of aspects mentioned above, it is preferable further that the band-pass plate filter has a shape of lens.

In addition, as another aspect of the present invention, in any one of aspects mentioned above, it is preferable further that a light input part of the dichroic prism filter has a shape of lens.

In addition, as still another aspect of the present invention, in any one of aspects mentioned above, it is preferable further that the capturing part comprises plurality of capturing parts, and that operation start of the plurality of capturing parts is synchronized.

In addition, as still another aspect of the present invention, in any one of aspects mentioned above, it is preferable further that the operation start of the plurality of capturing parts is synchronized by Genlock or equivalent means.

In addition, as still another aspect of the present invention, in any one of aspects mentioned above, it is preferable further that the image capturing is performed by cutting either one or more of ultra-violet beams, visible light beams, and infrared beams.

In addition, as still another aspect of the present invention, in any one of aspects mentioned above, a configuration is disclosed wherein a displaying part is further comprised which colors an image represented by the image data, which are set with the color data, according to the color data and displays the image.

In addition, as still another aspect of the present invention, in any one of aspects mentioned above, it is preferable further that the displaying part colors an image represented by the image data, which are set with the color data, according to the color data and displays the image while putting off time.

As still another aspect of the present invention, in any one of aspects mentioned above, a configuration of the image capturing device is disclosed wherein the displaying part displays the different images consecutively and displays a color image.

As still another aspect of the present invention, in any one of aspects mentioned above, a configuration of the image capturing device is disclosed wherein the displaying part composes colors of the different images by additive mixture color and displays a color image.

As still another aspect of the present invention, in any one of aspects mentioned above, a configuration of the image capturing device is disclosed wherein the displaying part composes colors of the different images by subtractive mixture color and displays a color image.

As still another aspect of the present invention, in any one of aspects mentioned above, it is preferable further that the image capturing device composes an emitting type displaying device wherein the displaying part comprises such as a cathode-ray tube monitor, a liquid crystal monitor, etc., a transmitting type displaying device, a reflecting type displaying device, a printed matter, etc.

Furthermore, it is preferable in general that a cathode-ray tube monitor and a liquid crystal monitor, which are generally the displaying part, display an image of an object as a color image by additive mixture color using "R", "G", and "B", according to the image data which are set color data.

In addition, it is preferable that, in a display by printing, a image of an object is displayed as a color image by subtractive mixture color using "C", "M", and "Y".

In addition, as still another aspect of the present invention, in any one of aspects mentioned above, a configuration is disclosed wherein an image storing part is further comprised and the image storing part stores image data which are set with the color data.

Furthermore, it is preferable that the image storing part is configured using a video recorder, a video encoder, a FPGA, a PLD, A CPLD, a DSP, a SDRAM, a field memory, a flame memory, a SAMPLE&HOLD circuit, a latch circuit, etc.

In addition, as another aspect of the present invention, in any one of aspects mentioned above, a configuration is disclosed wherein the irradiating part further modulates an intensity of each of the infrared beams at a different phase and irradiates each of the infrared beams onto the object.

In addition, as still another aspect of the present invention, in any one of aspects mentioned above, a configuration is disclosed wherein the irradiating part further modulates an intensity of each of the infrared beams at a different frequency and irradiates each of the infrared beams onto the object.

In addition, as still another aspect of the present invention, in any one of aspects mentioned above, a configuration is disclosed wherein the irradiating part further irradiates each of the infrared beams onto the object at a different time period substantially.

As still another aspect of the present invention, in any one of aspects mentioned above, furthermore, it is preferable that the infrared beams having different wavelength distributions are modulated in terms of strength by making either one or more of LEDs and LDs flash.

As still another aspect of the present invention, in any one of aspects mentioned above, it is preferable further that the infrared beams having different wavelength distributions are modulated in terms of strength by making one or more of LEDs or LDs emit a pulse/pulses.

As still another aspect of the present invention, in any one of aspects mentioned above, it is preferable further that the infrared beams having different wavelength distributions are modulated in terms of strength to a waveform such as a square wave, a sine wave, a cosine wave, a triangle wave, a saw wave, or a synthetic wave of them or to each waveform of them having duty ratio, bias, a synthetic wave of them, etc.

As still another aspect of the present invention, in any one of aspects mentioned above, it is preferable further that the infrared beams having different wavelength distributions are modulated in terms of strength with an opening and shutting slit or a mechanical chopper and are irradiated onto an object.

As still another aspect of the present invention, furthermore, it is preferable further that, by using a time lag in infrared irradiation with each single pulse of the infrared beams having different wavelength distributions, the infrared beams having different wavelength distributions, which are modulated in terms of strength at a different phase, are irradiated onto an object.

As still another aspect of the present invention, it is preferable further that by using a time lag in infrared irradiation with each of a plurality of pulses of the infrared beams having different wavelength distributions, the infrared beams having different wavelength distributions, which are modulated in terms of strength at a different phase, are irradiated onto an object.

As still another aspect of the present invention, it is preferable further that phase difference of the infrared beams having different wavelength distributions, which have different wavelength distributions and are modulated in terms of strength at a different phase, is less than 0.1 seconds.

As still another aspect of the present invention, in any one of aspects mentioned above, it is preferable further that the infrared beams having different wavelength distributions are formed with an infrared LED and/or an infrared lamp and an infrared filter.

Furthermore, as an infrared filter, there are various infrared band-pass filters having a transmission wavelength region, a combination of an infrared long wavelength transmission filter and an infrared short wavelength transmission filter, etc.

As still another aspect of the present invention, in any one of aspects mentioned above, it is preferable further that the infrared beams having different wavelength distributions are formed by wavelength modulation or polarization modulation to an infrared LED and/or an infrared LD. Furthermore, it is preferable the wavelength modulation or the polarization modulation is performed electromagnetically.

As another aspect of the present invention, in any one of aspects mentioned above, it is preferable further that the infrared LED and the infrared LD emit in a wavelength region in a wavelength region around 750 nm to 1200 nm.

As another aspect of the present invention, in any one of aspects mentioned above, furthermore, it is preferable further that the infrared LED and the infrared LD emit at a center wavelength in a wavelength region around 750 nm to 1200 nm.

Furthermore, as still another aspect of the present invention, in any one of aspects mentioned above, it is preferable that the infrared beams having different wavelength distributions are radiated from a plurality of infrared beam light sources.

Furthermore, as still another aspect of the present invention, in any one of aspects mentioned above, it is preferable that the infrared beams having different wavelength distributions are radiated with one or more of infrared beam light sources being separated into a plurality.

In addition, as still another aspect of the present invention, in any one of aspects mentioned above, it is preferable that operation of the irradiating part and the operation of the capturing part start synchronously.

In addition, as still another aspect of the present invention, in any one of aspects mentioned above, it is preferable that operation of the irradiating part, the operation of the capturing part, and the operation of the coloring part start synchronously.

In addition, as still another aspect of the present invention, in any one of aspects mentioned above, it is preferable that operation of the irradiating part and the operation of the capturing part start in every predetermined time period.

In addition, as still another aspect of the present invention, in any one of aspects mentioned above, it is preferable that operation of the irradiating part, the operation of the capturing part, and the operation of the coloring part start in every predetermined time period.

In addition, as still another aspect of the present invention, in any one of aspects mentioned above, a configuration is disclosed wherein the capturing part detects, separates, and captures each of the infrared beams having different wavelength distributions, which are reflected by the object and are modulated in terms of strength at a different frequency In addition, as still another aspect of the present invention, in any one of aspects mentioned above, it is preferable that operation of the irradiating part and the operation of the capturing part start regularly at frequency more than 10 Hz.

In addition, as still another aspect of the present invention, in any one of aspects mentioned above, it is preferable that operation of the irradiating part, the operation of the capturing part, and the operation of the coloring part start regularly at frequency more than 10 Hz. Because in the case when different images consecutively are displayed at frequency more than 10 Hz, almost a color still image or a color animation is seen by a person's eye.

In addition, as still another aspect of the present invention, in any one of aspects mentioned above, a configuration is disclosed wherein the displaying part colors and displays an image which is represented by the image data, which are set with the color data, and/or, an image which is represented by the image data, which are set with the color data, stored in the image storing part, according to the color data.

In addition, as still another aspect of the present invention, in any one of aspects mentioned above, a configuration is disclosed wherein the displaying part colors each image which is represented by image data, which are set with the color data, according to the color data and displays the each image simultaneously.

In addition, as still another aspect of the present invention, in any one of aspects mentioned above, it is preferable that operation of the irradiating part, the operation of the capturing part, the operation of the coloring part, and the operation of the image storing part start synchronously.

In addition, as still another aspect of the present invention, in any one of aspects mentioned above, it is preferable that operation of the irradiating part, the operation of the capturing part, the operation of the coloring part, and the operation of the image storing part start in every predetermined time period.

In addition, as still another aspect of the present invention, in any one of aspects mentioned above, it is preferable that either one or more of the irradiating part, the capturing part, the control processing part, the coloring part, the image storing part, the image converting part, and the displaying part is/are integrated.

In addition, as still another aspect of the present invention, in any one of aspects mentioned above, it is preferable that either one or more of the control processing part, the irradiating part, the capturing part, the coloring part, the image storing part, the image converting part, and the displaying part is/are made on a chip.

In addition, as still another aspect of the present invention, in any one of aspects mentioned above, it is preferable that either one or more of the irradiating part, the capturing part, the control processing part, the coloring part, the image storing part, the image converting part, and the displaying part further comprises a density adjusting part where the density adjusting part adjusts one or more of luminosity or density, contrast, and a parameter of gamma revision at coloring of either one or plurality of the image data, which are set with the color data, the image data, which are set with the color data, stored in the image storing part, and the converted image data.

In addition, as still another aspect of the present invention, in any one of aspects mentioned above, it is preferable that the coloring part or the control processing part comprises a signal outputting part which outputs either one or plurality of RGB video signal, NTSC video signal, PAL video signal, SECAM video signal, other composite video signals, YC separation signal, S video signal, SDI signal, other component signals, digital video signal affiliated with MPEG, Ethernet video signal, other digital video signals, and so on.

In addition, as still another aspect of the present invention, in any one of aspects mentioned above, it is preferable that one or more of the irradiating part, the capturing part, the coloring part, and the control processing part outputs one or more of an RGB video signal, an NTSC video signal, a PAL video signal, a SECAM video signal, other composite video signals, a YC separation signal, an S video signal, an SDI signal, other component signals, digital video signal affiliated with MPEG, Ethernet video signal, other digital video signals, and so on.

In addition, as still another aspect of the present invention, in any one of aspects mentioned above, an image capturing method is disclosed which comprises: irradiating infrared beams having different wavelength intensity distributions on an object; forming image data which represent each image by capturing an image of the object using each infrared beam having different wavelength intensity distributions reflected by the object; and coloring the each image with each different single color represented by the image data which are formed.

In addition, as still another aspect of the present invention, furthermore, it is disclosed that a first image is colored, among the images which are captured, by using "R", the first image being captured using an infrared beam having a wavelength intensity distribution where a wavelength range or a center wavelength is located at a shortest wavelength side, and the image which is captured other than the first image using other than "R" is colored.

In addition, as another further aspect of the present invention, furthermore, it is disclosed that a first image is colored, among the images which are captured, using "R", the first image being captured using a first infrared beam having a wavelength intensity distribution where a wavelength range or a center wavelength is located at a shortest wavelength side, a second image using "G", the second image being captured using a second infrared beam having a wavelength intensity distribution where a wavelength range or a center wavelength is located at a next shortest wavelength side after the first infrared beam, and the image which is captured other than the first image and the second image is colored by using other than "B".

In addition, as still another aspect of the present invention, in any one of aspects mentioned above, it is preferable further that the second image is colored by using "B" and the image which is other than the first image and the second image is colored by using "G".

In addition, as still another aspect of the present invention, in any one of aspects mentioned above, it is preferable further that the different mono-colors are one or more of "R", "G", and "B", or proper different mono-colors or primary colors, furthermore a combination of these.

In addition, as still another aspect of the present invention, in any one of aspects mentioned above, furthermore, it is preferable further that the first image is colored by using "R" and the images which are captured other than the first image are colored by using one or more of "G" and "B", or proper different mono-colors or primary colors, furthermore a combination of these.

In addition, as still another aspect of the present invention, in any one of aspects mentioned above, it is preferable further that the different mono-colors are one or more of "C", "M", and "Y", or proper different mono-colors or primary colors, as well as combinations of them.

In addition, as still another aspect of the present invention, in any one of aspects mentioned above, it is preferable further that the images which are colored are made into color images by using proper two mono-colors which are mixed by additive mixture color, two primary colors, or two among "R", "G", and "B".

In addition, as still another aspect of the present invention, in any one of aspects mentioned above, it is preferable further that the images which are colored are made into color images by using proper two mono-colors which are mixed by subtractive mixture color, two primary colors, or two among "C", "M", and "Y".

In addition, as still another aspect of the present invention, in any one of aspects mentioned above, it is preferable further that the images which are colored are made into color images by using proper three mono-colors which are mixed by additive mixture color, three primary colors, or "R", "G", and "B".

In addition, as still another aspect of the present invention, in any one of aspects mentioned above, it is preferable further that the images which are colored are made into color images by using proper three mono-colors which are mixed by subtractive mixture color, three primary colors, or "C", "M", and "Y".

In addition, as still another aspect of the present invention, in any one of aspects mentioned above, it is preferable further that the RGB color image is converted into a converted color image by an RGBB color, an index color, a CMY color, a CMYK color, or other kind of color indications.

In addition, as still another aspect of the present invention, in any one of aspects mentioned above, it is preferable further to form an image which is converted by applying one or more of four basic operations of arithmetic including addition, subtraction, multiplication and division, an exponential function, a logarithmic function, and an arbitrary function to the image.

In addition, as still another aspect of the present invention, in any one of aspects mentioned above, it is preferable further to storage one or more of the images which are captured, the color image by two mono-colors or two primary colors, the color image by three mono-colors or three primary colors, the RGB color image, the CMY color image, the image which is converted, and the converted color image.

In addition, as still another aspect of the present invention, in any one of aspects mentioned above, it is preferable further to storage one or more of the images which are captured, the color image by two mono-colors or two primary colors, the color image by three mono-colors or three primary colors, the RGB color image, the CMY color image, the image which is converted, and the converted color image.

In addition, as still another aspect of the present invention, in any one of aspects mentioned above, it is preferable further to adjust one or more of color balance, hue, luminosity or density, contrast, and a parameter of parameter of gamma revision of one or more of the images which are colored, the color image by two mono-colors or two primary colors, the color image by three mono-colors or three primary colors, the RGB color image, the CMY color image, the image which is converted, and the converted color image In addition, as still another aspect of the present invention, in any one of aspects mentioned above, it is preferable further to irradiate two, three, or more than four infrared beams having different wavelength intensity distributions to the object.

In addition, as still another aspect of the present invention, in any one of aspects mentioned above, it is disclosed further to modulate an intensity of each of the infrared beams having different wavelength intensity distributions at a different phase and irradiate each of the infrared beams onto the object.

In addition, as still another aspect of the present invention, in any one of aspects mentioned above, it is disclosed further to modulate an intensity of each of the infrared beams having different wavelength intensity distributions at a different frequency and irradiate each of the infrared beams onto the object.

In addition, as still another aspect of the present invention, in any one of aspects mentioned above, it is disclosed further to irradiate the infrared beams having different wavelength intensity distributions at a different time period onto the object. In other words, it is preferable that each infrared beam is not irradiated at the same time substantially.

In addition, as still another aspect of the present invention, in any one of aspects mentioned above, it is preferable to start the irradiating operation and the capturing operation synchronously.

In addition, as still another aspect of the present invention, in any one of aspects mentioned above, it is preferable to start the irradiating operation, the capturing operation, and the coloring operation synchronously.

In addition, as still another aspect of the present invention, an image capturing method is disclosed which comprises: separating an infrared beam from an object into infrared beams having different wavelength intensity distributions; capturing an image of the object using each infrared beam having different wavelength intensity distributions; and coloring a first image, among the images which are captured, using "R", the first image being captured using an infrared beam having a wavelength intensity distribution where a wavelength range or a center wavelength is located at a shortest wavelength side, and coloring the image which is captured other than the first image using other than "R".

In addition, as still another aspect of the present invention, an image capturing method is disclosed which comprises: coloring a first image, among the images which are captured, using "R", the first image being captured using a first infrared beam having a wavelength intensity distribution where a wavelength range or a center wavelength is located at a shortest wavelength side, a second image using "G", the second image being captured using a second infrared beam having a wavelength intensity distribution where a wavelength range or a center wavelength is located at a next shortest wavelength side after the first infrared beam, and the image which is captured other than the first image and the second image using "B".

In addition, as still another aspect of the present invention, in any one of aspects mentioned above, it is preferable further to color the second image using "B" and the image which is captured other than the first image and the second image using "G".

In addition, as still another aspect of the present invention, in any one of aspects mentioned above, it is preferable further to irradiate an infrared beam having one wavelength distribution or an infrared beam having two or more than three different wavelength distributions to the object.

In addition, as still another aspect of the present invention, in any one of aspects mentioned above, it is preferable further to start the irradiating operation and the capturing operation synchronously.

In addition, as still another aspect of the present invention, in any one of aspects mentioned above, it is preferable further to start the irradiating operation, the capturing operation, and the coloring operation synchronously.

In addition, as still another aspect of the present invention, an image capturing method is disclosed which comprises: separating a light beam from an object into light beams having different wavelength intensity distributions; capturing an image of the object using each light beam having different wavelength intensity distributions; and coloring a first image, among the images which are captured, using "R", the first image being captured using a visible light beam having "R wavelength region" and an infrared beam having a wavelength intensity distribution closest to the "R wavelength region", and coloring the image which is captured other than the first image using other than "R".

In addition, as still another aspect of the present invention, an image capturing method is disclosed which comprises: coloring a first image, among the images which are captured, using "R", the first image being captured using a visible light having "R wavelength region" and a first infrared beam having a wavelength intensity distribution closest to the "R wavelength region"; coloring a second image using "G", the second image being captured using a visible light having "G wavelength region" and the second infrared beam having a wavelength intensity distribution close to the first infrared beam; and coloring the image other than the first image and the second image using "B".

In addition, as still another aspect of the present invention, in any one of aspects mentioned above, it is preferable further to color the second image using "B" and to color the image other than the first image and the second image using "G".

In addition, as still another aspect of the present invention, in any one of aspects mentioned above, it is preferable further to irradiate one, two, or more than three light beams having different wavelength intensity distributions to the object.

In addition, as still another aspect of the present invention, in any one of aspects mentioned above, it is disclosed further to modulate intensities of the light beams having different wavelength intensity distributions at a different phase and irradiate the light beams onto the object.

In addition, as another aspect of the present invention, in any one of aspects mentioned above, it is disclosed further to modulate an intensity of each of the light beams having different wavelength intensity distributions at a different frequency and irradiate each of the light beams onto the object.

In addition, as still another aspect of the present invention, in any one of aspects mentioned above, it is disclosed further to irradiate the light beams having different wavelength intensity distributions at a different time period onto the object. In other words, it is preferable that each infrared beam is not irradiated at the same time substantially.

In addition, as still another aspect of the present invention, in any one of aspects mentioned above, it is preferable further to start the irradiating operation and the capturing operation synchronously.

In addition, as still another aspect of the present invention, in any one of aspects mentioned above, it is preferable further to start the irradiating operation, the capturing operation, and the coloring operation synchronously.

In addition, as still another aspect of the present invention, in any one of aspects mentioned above, it is preferable to color and display the images which are captured.

In addition, as still another aspect of the present invention, in any one of aspects mentioned above, it is preferable to store the images which are captured.

In addition, as still another aspect of the present invention, in any one of aspects mentioned above, it is preferable to color and display one or more of the images which are captured and the images which are stored.

In addition, as still another aspect of the present invention, in any one of aspects mentioned above, it is preferable to color and display one or more of the images which are captured and the images which are stored, at the same time.

In addition, as still another aspect of the present invention, in any one of aspects mentioned above, it is preferable to color and display one or more of the images which are captured and the images which are stored, in the range of different time.

In addition, as another aspect of the present invention, in any one of aspects mentioned above, it is preferable further that a light beam from the object is either one or plurality of a light beam reflected by the object, a light beam transmitting the object, or a light beam radiating from the object.

In addition, a light beam or a light comprises, in general, one or more of an ultraviolet beam, a visible light beam, and an infrared beam.

As still another aspect of the present invention, in any one of aspects mentioned above, it is preferable further to utilize one or more of an ultraviolet beam, a visible light beam, and an infrared beam.

As still another aspect of the present invention, in any one of aspects mentioned above, it is preferable further to utilize sun light beam.

As still another aspect of the present invention, in any one of aspects mentioned above, it is preferable further to utilize a light beam from the moon.

As another aspect of the present invention, in any one of aspects mentioned above, it is preferable further to utilize a light beam from the space including a star, nebula, and so on.

As still another aspect of the present invention, in any one of aspects mentioned above, it is preferable further to utilize a light beam from an incandescent lamp.

As still another aspect of the present invention, in any one of aspects mentioned above, it is preferable further to utilize a light beam from a fluorescent lamp.

As still another aspect of the present invention, in any one of aspects mentioned above, it is preferable further to utilize an ultraviolet beam, a visible light beam, or an infrared beam as a bias light.

As still another aspect of the present invention, in any one of aspects mentioned above, it is preferable further to switch so as to use a color CCD camera, which is the capturing part, at the daytime and to use a monochromatic CCD camera, which is the capturing part, in the night. Furthermore, it is preferable that the change is carried out based on measuring the brightness using a light detecting element, a luminometer, solar battery, and so on.

As still another aspect of the present invention, in any one of aspects mentioned above, it is preferable further to use a monochromatic CCD camera, which is the capturing part, at the daytime and in the night together.

As still another aspect of the present invention, in any one of aspects mentioned above, it is preferable further to use a color CCD camera, which is the capturing part, at the daytime and in the night together.

As still another aspect of the present invention, in any one of aspects mentioned above, it is preferable to use a color CCD camera, which is the capturing part, using an infrared beam illumination in the night.

As still another aspect of the present invention, in any one of aspects mentioned above, it is preferable further to switch so as to use a color CMOS camera, which is the capturing part, at the daytime and to use a monochromatic CMOS camera, which is the capturing part, in the night. Furthermore, it is preferable that the change is carried out based on measuring the brightness using a light detecting element, a luminometer, solar battery, and so on.

As still another aspect of the present invention, in any one of aspects mentioned above, it is preferable further to use a monochromatic CMOS camera, which is the capturing part, at the daytime and in the night together.

As still another aspect of the present invention, in any one of aspects mentioned above, it is preferable further to use a color CMOS camera, which is the capturing part, at the daytime and in the night together.

As still another aspect of the present invention, in any one of aspects mentioned above, it is preferable further to switch so as to use an infrared cut filter at the daytime and not to use an infrared cut filter in the night. Furthermore, it is preferable that the switch is carried out based on measuring the brightness using a light detecting element, a luminometer, solar battery, and so on.

As another aspect of the present invention, in any one of aspects mentioned above, it is preferable further to make RGB components into one like a NTSC video signal for forming one image in case of a color CCD camera, which is the capturing part, or a color CMOS camera, which is the color capturing part.

As still another aspect of the present invention, in any one of aspects mentioned above, it is preferable further that the present invention is used for monitoring or security such as a night vision camera.

As still another aspect of the present invention, in any one of aspects mentioned above, it is preferable further that the present invention is used as a night vision goggle or a night vision scope.

As still another aspect of the present invention, in any one of aspects mentioned above, it is preferable further that the color image indication is displayed as monochromatic image indication.

As still another aspect of the present invention, in any one of aspects mentioned above, it is preferable further that a plurality of irradiating parts are fixed at a plurality of positions and that the image capturing is carried out using the capturing part and the coloring part, which are unified for carrying. In this case, although the irradiating parts are seemed to be independent, the capturing part, the coloring part, the control processing part, etc. are necessary for the image capturing by the present invention.

As still another aspect of the present invention, in any one of aspects mentioned above, it is preferable further that the irradiating part, the capturing part, the coloring part, the control processing part, etc. are set indoor such as at a ceiling or inside of a car, a train, a ship or an airplane, etc.

As still another aspect of the present invention, in any one of aspects mentioned above, it is preferable further that the irradiating part, the capturing part, the coloring part, the control processing part, etc. are set on a pillar used for a streetlight, a signboard, a signal, etc.

As still another aspect of the present invention, in any one of aspects mentioned above, it is preferable further that the irradiating part, the capturing part, the coloring part, the control processing part, etc. are set at a construction such as a house or a building.

As still another aspect of the present invention, in any one of aspects mentioned above, it is preferable further that the irradiating part, the capturing part, the coloring part, the control processing part, etc. are incorporated in a fluorescent lamp set.

As still another aspect of the present invention, in any one of aspects mentioned above, it is preferable to irradiate an infrared beam onto an object having a attaching component for reflecting an infrared beam having a certain wavelength intensity distribution and to obtain a color image of the object from an image captured using an infrared beam reflected from the object.

As still another aspect of the present invention, in any one of aspects mentioned above, it is preferable to irradiate an infrared beam onto an object having a attaching component for reflecting an infrared beam having a certain wavelength intensity distribution and to obtain a color image of the object, the color image having a same color or a color approximate to a color of the object under a white light in a visible region, from an image captured using the infrared beam reflected from the object.

As still another aspect of the present invention, an image capturing device is provided comprising: an irradiating part, a separating part, a capturing part, and a color setting part; wherein the irradiating part irradiates an infrared beam onto an object; the separating part separates an infrared beam reflected from the object into infrared beams having different wavelength intensity distributions; the capturing part captures an image of the object using each of the infrared beams and forms image data; and the color setting part sets to the image data color data for coloring each image with each different single color, the each image being represented by the image data which are formed.

As still another aspect of the present invention, an image capturing device is provided comprising: a separating part, a capturing part and, a color setting part; wherein the separating part separates a light beam from an object into light beams having different wavelength intensity distributions; the capturing part forms image data by capturing an image of the object using each of the light beams having different wavelength intensity distributions; and the color setting part sets to the image data color data for coloring each image with each different single color, the each image being represented by the image data which are formed.

As still another aspect of the present invention, an image capturing method is provided comprising: separating an infrared beam from an object into infrared beams having different wavelength intensity distributions; forming image data which represent each image by capturing an image of the object using each infrared beam having different wavelength intensity distributions; and coloring each image with each different single color, the each image being represented by the image data which are formed.

As still another aspect of the present invention, an image capturing method is provided comprising: irradiating an infrared beam onto an object separating an infrared beam reflected from the object into infrared beams having different wavelength intensity distributions; forming image data which represent each image by capturing an image of the object using each infrared beam having different wavelength intensity distributions; and coloring each image with each different single color, the each image being represented by the image data which are formed.

As still another aspect of the present invention, an image capturing method is provided comprising: separating a light beam from an object into light beams having different wavelength intensity distributions; forming image data which represent each image by capturing an image of the object using each infrared beam having different wavelength intensity distributions; and coloring each image with each different single color, the each image being represented by the image data which are formed.

As still another aspect of the present invention, an image capturing method is provided comprising: separating a light beam from an object into light beams having different wavelength intensity distributions; capturing an image of the object using each light beam having different wavelength intensity distributions; coloring a first image, among the images which are captured, using "R", the first image being captured using a visible light having "R wavelength region" and an infrared beam having a wavelength intensity distribution closest to the "R wavelength region"; coloring a second image using "B", the second image being captured using a visible light having "B wavelength region" and an infrared beam having a wavelength intensity distribution next closest to the "R wavelength region"; and coloring the image which is captured other than the first image and the second image using "G".

As still another aspect of the present invention, an image capturing method is provided comprising: obtaining a color image which has a same color or a color approximate to a color of an object under a white light in a visible region from an image captured using an infrared beam from the object.

As still another aspect of the present invention, an image capturing method is provided comprising: obtaining a color image which has a same color or a color approximate to a color of an object under a white light in a visible region by irradiating an infrared beam onto the object and from an image captured using an infrared beam reflected from the object.

As still another aspect of the present invention, an image capturing method is provided comprising: obtaining a color image which has a same color or a color approximate to a color of a skin of a person under a white light in a visible region by irradiating an infrared beam onto the skin of the person and from an image captured using an infrared beam reflected from the skin of the person.

As still another aspect of the present invention, an image capturing device is provided further comprising a silicon image sensor wherein a color image which has a same color or a color approximate to a color of the object under a white light in a visible region is obtained from images captured using the infrared beams from the object.

As still another aspect of the present invention, an image capturing device is provided wherein the capturing part further comprises a silicon image sensor wherein a color image which has a same color or a color approximate to a color of the object under a white light in a visible region is obtained from images captured using infrared beams reflected from the object.

As still another aspect of the present invention, an image capturing device is provided comprising: a separating part, a capturing part, and a color setting part; wherein the separating part separates a light beam from an object into light beams having different wavelength intensity distributions; the capturing part further comprises a silicon image sensor wherein image data are formed by capturing an image of the object from each light beam having different wavelength intensity distributions; the color setting part colors a first image using "R" which is captured using an infrared beam having a wavelength distribution closest to a visible light region, a second image using "B" which is captured using an infrared beam having a wavelength distribution next closest to a visible is light region after a wavelength distribution of an infrared beam used in capturing the first image, and a third image using "G" which is captured using an infrared beam having a wavelength distribution next closest to a visible light region after a wavelength distribution of an infrared beam used in capturing the second image; the first image, the second image, and the third image are combined; and an color image which has a same color or a color approximate to a color of the object under a white light in a visible region is obtained.

As still another aspect of the present invention, an image capturing method is provided comprising: irradiating an infrared beam onto an object having a attaching component for reflecting an infrared beam having a certain wavelength intensity distribution; and obtaining a color image of the object from an image captured using an infrared beam reflected from the object.

As still another aspect of the present invention, an image capturing method is provided comprising: irradiating an infrared beam onto an object having a attaching component for reflecting an infrared beam having a certain wavelength intensity distribution; and obtaining a color image of the object, the color image having a same color or a color approximate to a color of the object under a white light in a visible region, from an image captured using the infrared beam reflected from the object.

BRIEF DESCRIPTION OF THE DRAWINGS

FIG. 22 is a schematic diagram showing a configuration of embodiment 6 of an image capturing device and an image capturing method of the present invention, FIG. 27 shows photographs by example experiment 1 according to one embodiment of the present invention, FIG. 31 shows measurement data by example experiment 3 according to one embodiment of the present invention.

DETAILED DESCRIPTION OF THE INVENTION

Figure 1:
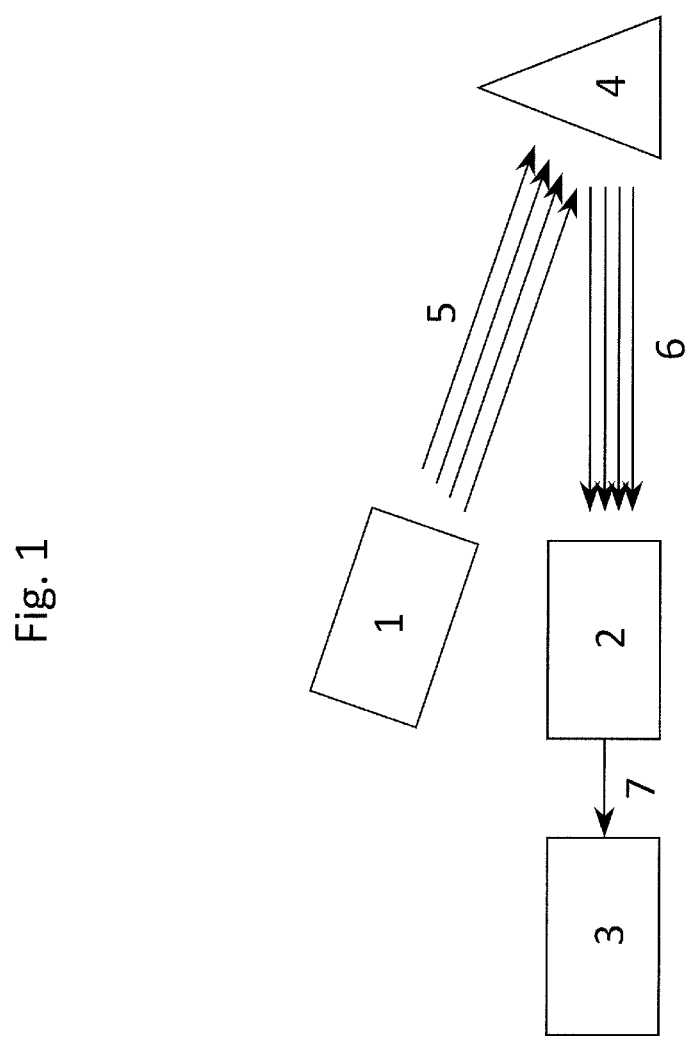
FIG. 1 is a schematic diagram showing a configuration of an image capturing device and an image capturing method according to one embodiment of the present invention.

Embodiment and examples according to the present invention are explained below, with reference to drawings. However, the present invention is not limited to the content explained below. In addition, each same mark is referred to a part having the same definition, and there may be a case in which its explanation is not repeatedly done.

(Outline of the Present Invention)

An outline of the present invention is explained.

An image capturing device according to one embodiment of the present invention includes an irradiating part and a capturing part. The irradiation part radiates infrared beams having different wavelength intensity distribution onto an object. Here, "infrared beams having different wavelength intensity distribution" means infrared beams having different wavelength ranges or center wavelengths each other. The capturing part captures an infrared image of the object by using each infrared beam of the infrared beams having different wavelength intensity distributions, the each infrared beam being reflected by the object.

For example, suppose that wavelengths of infrared beams, which the irradiating part irradiates, are $\lambda 1$, $\lambda 2$, $\lambda 3$, respectively. In this case, the capturing part makes the infrared beam having the wavelength $\lambda 1$ reflected from the object focus on an imaging plain which captures a light image such as CCD image sensors, and obtains an in-plain intensity distribution of the infrared beam having the wavelength $\lambda 1$ on the imaging plain. In general, an in-plain intensity distribution like this can be expressed using a two-dimensional distribution function. Then, in case of expressing a position on two-dimensions using a coordinate (x, y), it is assumed to express an intensity of an infrared beam having a wavelength $\lambda 1$ at a section having a center or gravity position (x, y) on an imaging plain as $I1(x, y)$. In the same manner, the capturing part makes the infrared beam having the wavelength $\lambda 2$ reflected from the object focus on an imaging plain, and obtains an in-plain intensity distribution of the infrared beam having the wavelength $\lambda 2$ on the imaging plain. It is assumed to express an intensity of an infrared beam having a wavelength $\lambda 2$ at a position (x, y) on an imaging plain as $I2(x, y)$. And, the capturing part makes the infrared beam having the wavelength $\lambda 3$ reflected from the object focus on an imaging plain, and obtains an in-plain intensity distribution of the infrared beam having the wavelength $\lambda 3$ on the imaging plain. It is assumed to express an intensity of an infrared beam having a wavelength $\lambda 3$ at a position (x, y) on an imaging plain as $I3(x, y)$.

It is possible to express $I1(x, y)$, $I2(x, y)$, and $I3(x, y)$, etc. as two-dimensional array data, etc. By using an expression form like this, it is possible to store image data in memory, and to transmit and receive image data as a signal.

Furthermore, it is preferable that the capturing part obtains $I1(x, y)$, $I2(x, y)$, and $I3(x, y)$ at the same time, or at different times. For example, it is possible to obtain $I1(x, y)$, $I2(x, y)$, and $I3(x, y)$ at the same time by irradiating infrared beams, which have wavelength $\lambda 1$, $\lambda 2$, and $\lambda 3$, respectively, at the same time, and by separating an infrared beam having each wavelength using a filter. And, it is possible to obtain $I1(x, y)$, $I2(x, y)$, and $I3(x, y)$ sequentially at different times by putting off time to irradiate infrared beams, which have wavelength $\lambda 1$, $\lambda 2$, and $\lambda 3$, respectively.

Because an infrared image corresponds to an in-plain intensity distribution of a colorless infrared beam on an imaging plain, a monochromatic, a mono-color, or a pseudo-color image depending on intensity of the infrared beam is displayed when displaying the infrared image on a displaying apparatus such as a liquid crystal displaying apparatus.

However, because generally when wavelengths of infrared beams are different, infrared reflectivity of an object are different, in case of irradiating an infrared beam having a plurality different wavelengths as stated above, values of $I1(x, y)$, $I2(x, y)$, and $I3(x, y)$ are different each other even at the same position on the object. Then, it is one of the purposes of the present embodiment to obtain a color image of an object by corresponding each of the values of $I1(x, y)$, $I2(x, y)$, and $I3(x, y)$ to luminosity or density of different mono-colors, respectively, and by reproducing colors of the object under a visible light beam.

As an expression method of colors, various kinds of methods are known. For example, in case of expressing color depending on each luminosity of "R", "G", and "B", it is assumed that value of $I1(x, y)$ is proportional to luminosity of "R" component, that value of $I2(x, y)$ is proportional to luminosity of "G" component, and that value of $I3(x, y)$ is proportional to luminosity of "B" component, respectively, and by carrying out additive mixture color to luminosity obtained by setting proper proportion coefficients, a color at a section of position (x, y) is determined. And, a color image is obtained by determining a color at each section over an in-plain.

More concretely, for example, luminosities of R, G, and B of "R", "G", and "B" respectively at a section in a displaying screen can be expressed as follow:

$$R = \alpha I1(x,y) \tag{1}$$

$$G = \beta I2(x,y) \tag{2}$$

$$B = \gamma I3(x,y) \tag{3}$$

Here, $\alpha$, $\beta$, and $\gamma$ are proportion coefficients which convert infrared intensities $I1(x, y)$, $I2(x, y)$, and $I3(x, y)$ into R, G, and B, respectively.

In this way, expressing a color at a section in a displaying screen using equation (1)-(3) with the intensities $I1(x, y)$, $I2(x, y)$, and $I3(x, y)$ is sometimes said as coloring according to information which equation (1)-(3) express, and $\alpha$, $\beta$, and $\gamma$ are sometime referred to as color data. In addition, R, G, and B of equation (1)-(3) are sometimes referred to as image data which are set with color data.

Of course, it is one example to make value of $I1(x, y)$ correspond to luminosity of "R", value of $I2(x, y)$ to luminosity of "G", and value of $I3(x, y)$ to luminosity of "B", and in general, it is possible to color by using various colors. Therefore, when it is assumed to express image data as $|I\rangle$, color data as H, and image data which are set with color data as $|C\rangle$, for example, $$|C\rangle = H|I\rangle \tag{4}$$

Here, it is possible to express as follows, $$|C\rangle = (R, G, B) \tag{5}$$

$$H = \begin{pmatrix} \alpha_1 & \alpha_2 & \alpha_3 \\ \beta_1 & \beta_2 & \beta_3 \\ \gamma_1 & \gamma_2 & \gamma_3 \end{pmatrix} \tag{6}$$

$$|I\rangle^T = (I1(x, y), I2(x, y), I3(x, y)) \tag{7}$$

Furthermore, $V^T$ corresponding to a vector V expresses a transpose vector of the vector V.

To make value of $I1(x, y)$ correspond to luminosity of "R", value of $I2(x, y)$ to luminosity of "G", and value of $I3(x, y)$ to luminosity of "B" corresponds to make off-diagonal elements in the right side of the equation (6) into zero. In this case, following equation is possible, $$(R, G, B) = (\alpha 1 I1(x, y), \beta 2 I2(x, y), \gamma 3 I3(x, y)) \tag{8}$$

$$= (\alpha I1(x, y), \beta I2(x, y), \gamma I3(x, y)) \tag{9}$$

Here, the equation (8) or (9) expresses the same thing as the equation (1)-(3) using other expression. Furthermore, as stated above, in general, coloring by using various colors is possible, and it is also possible to say that the case of not making off-diagonal elements in the right side of the equation (6) into zero corresponds to the case.

Furthermore, above expressions relate to expressions corresponding to coloring a two-dimensional image using a three-dimensional vector and a 3×3 matrix, and then it is also possible to express similarly with regard to coloring of a three-dimensional image.

In addition, number or size of sections in the imaging plain or the displaying screen, which is above mentioned, can be set variously, and then resolution or resolving power of the image improves so that the number of section is many or the size is small.

In one aspect of the present invention, by setting color data to image data, it is possible to display the image data as a color image or to reproduce by printing, etc.

As mentioned later, a scientific law is found by the inventor of the present application, wherein in case when $\lambda 1 < \lambda 2 < \lambda 3$, in making luminosity of "R" depend mainly on value of $I1(x, y)$, in other words, in making off-diagonal elements small or almost zero in comparison with diagonal elements in the right side of the equation (6), color of an object under a visible light beam is well reappear.

Furthermore, making luminosity of "R" component of image data, which are set with color data, depend mainly on value of $I1(x, y)$ may be referred to as coloring image by an infrared beam having the wavelength $\lambda 1$ using "R". It is similarly referred with respect to "G" component and "B" component.

FIG. 1 is a schematic diagram showing a configuration of an image capturing device according to one embodiment of the present invention. As shown in FIG. 1, the image capturing device includes an irradiating part 1, a capturing part 2, and a color setting part 3. The irradiating part 1 irradiates infrared beams 5 having different wavelength intensity distributions onto an object 4. The capturing part 2 captures an image of the object 4 using each infrared beam of the infrared beams 6 having different wavelength intensity distributions, the each infrared beam being reflected by the object 4, and forms image data 7 which represent each image. The color setting part 3 sets to the image data 7 color data for coloring the each image with each different single color, the each image being represented by the image data 7 which are formed.

It is preferable that infrared beams 5 having different wavelength intensity distributions are irradiate while differentiating timing of irradiation so as not to be irradiated at the same time substantially. Not to be irradiated at the same time substantially means that even if there is a time when infrared beams having different wavelength intensity distributions are irradiate at the same time, length of the time is shorter than length of a time when an infrared beam having one wavelength intensity distribution is irradiated. In addition, it is preferable that infrared beams 5 having different wavelength intensity distributions is irradiate at the same time. In this case, it is carried out to separate infrared beams 6 having different wavelength intensity distributions, the each infrared beam being reflected, using a filter, and etc.

In addition, even when there is a time when the infrared beams 5 having different wavelength intensity distributions are irradiate at the same time, it is preferable that each of the infrared beams 5 having different wavelength intensity distributions are irradiated onto the object 4, the infrared beams being modulated at different frequency. In this case, it is carried out to separate infrared beams 6 having different wavelength intensity distributions, the each infrared beam being reflected, by detecting and separating each of the infrared beams 6 having different wavelength intensity distributions, the each infrared beam being reflected by the object 4.

There is a case when an analog signal or a digital signal is used for transmission of the image data for transmission of the image data 7, and data representing each image is stored separately, and is transmitted. In addition, there is a case when signal information about display timing such as a starting position of brightness information or brightness data and luminosity data of images, or a capturing starting time and perpendicular synchronization of the screen is stored. In addition, in case of using a digital signal, starting positions of data representing each image, data representing size, etc. may be stored in the header information of the image data 7.

Each image which the image data 7 represents shows intensity distributions of the reflected infrared beams 6. Therefore, when the each image which the image data 7 represents is displayed on a display or by printing as it is, it is displayed by using a mono-color. Here, to be displayed by using a mono-color means to be expressed by using luminosity/density of only one color. For example, a position where intensity of the reflected infrared beams 6 is strong is expressed by using a bright red color and a position where intensity of the reflected infrared beams 6 is weak is expressed by using a dark red color. In this case, a mono-color expression by the red color is obtained. Therefore, it is possible to obtain a mono-color image by setting to the image data 7 the data to show by which color among mono-colors each image represented by the image data 7 is expressed.

For example, assume that images obtained by irradiating a first infrared beam, a second infrared beam, and a third infrared beam, which have three different wavelength intensity distributions, onto an object are a first image, a second image, and third image, respectively. In this case, for example, it is possible to refer to data expressing to color the first image by using red color, to color the second image by using a green color, and to color the third image by using blue color as color data.

In addition, with respect to color data, the color data may be indicated by expressing each image by using a mono-color having each different color, without specifying which mono-color is used for presentation. In addition, the color data may be indicated by expressing a plurality of images using a mono-color having a same color. For example, there is a case when the color data is indicated to express a first image and a third image by using a mono-color having the same color, and to express a second image using a mono-color having a different color. It is possible to modify data contents of image date later.

In addition, a color setting, that is, data for setting colors to image data 7 by color setting part 3, is setting to color luminosity of an image using which color beforehand when the image is displayed, and the color setting can be carried out by a timing of transmission of image data 7, by a correspondence of the image data 7 to a standard trigger consecutively, by generating a color setting signal separately, by overlaying a color setting information on image data 7, by setting an address of a memory, and by labeling or flagging in a signal processing. It is also possible that the implantation is carried out by embedding color data in image data 7 as one part of header information of image data 7.

Figure 2:
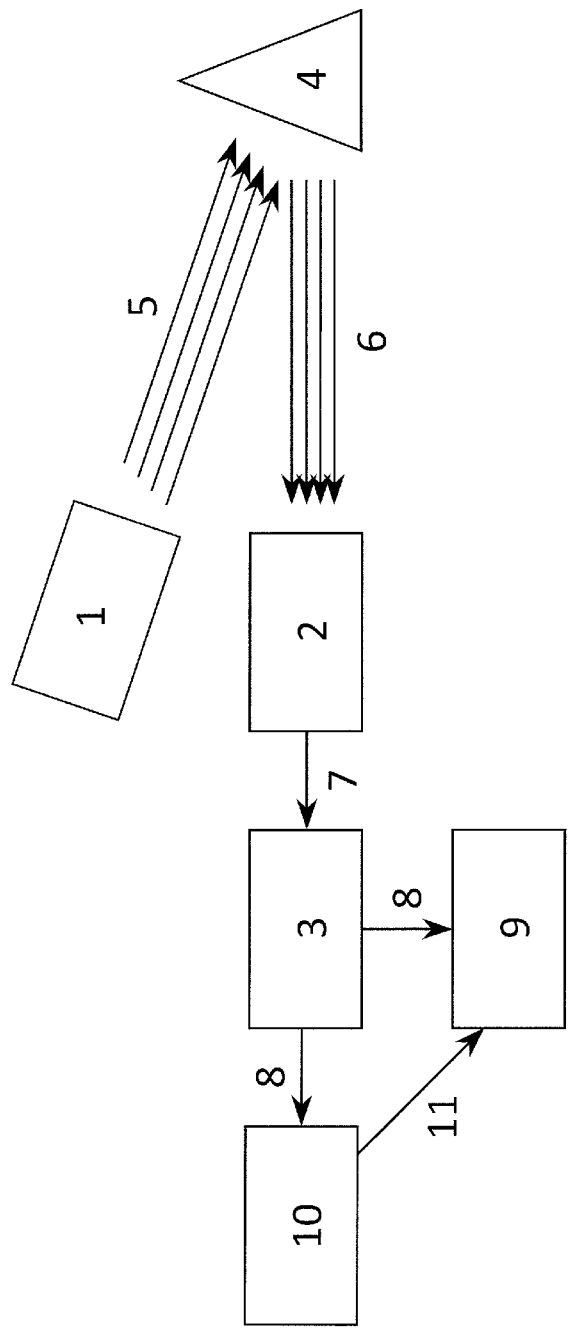
FIG. 2 is a schematic diagram showing a configuration of an image capturing device according to one embodiment of the present invention.

FIG. 2 is a schematic diagram showing a configuration of an image capturing device according to another embodiment of the present invention. As shown in FIG. 2, it is preferable further that in the present invention, a displaying part 9 is comprised wherein the displaying part 9 colors and displays each of different images by using a predetermined color according to image data 8. In other words, an image capturing device according to an embodiment of the present invention is further arranged with a displaying part 9. The displaying part 9 displays each image represented by image data 7 by image data 8 formed by setting color data to image data 7 at an expression specified by the image data. Furthermore, in the case where there are a plurality of images expressed by image data 7, they may be displayed simultaneously on the displaying part 9 or displayed at different times. In the case of displaying at different times, it is preferable that the display time is shortened so that a person is not aware that images of a plurality of colors are being displayed separately. For example, one image is displayed for only $\frac{1}{24}$ of a second before displaying the next image. In this way, if the displaying part 9 colors different images of the object captured by using each infrared beam having different wavelength intensity distributions by using a predetermined single color such as "R", "G", and "B" based on image data 8 and displays the images consecutively at high speed, an RGB color image in appearance is displayed.

In addition, the image capturing device related to the present embodiment may be further arranged with an image storing part 10. In this case, the image storing part 10 may store image data 8.

In addition, in the image capturing device related to the present invention, the displaying part 9 may display either image data 8 or image data 11 stored in the image storing part 11 or both. In this case, the image which is displayed is displayed according to the color data set in image data 8 or image data 11. Alternatively, an image may also be displayed according to color data different from the color data set in the image data so that image data 11 is displayed according to the color data set in image data 8. In addition, an image may be also displayed by coloring the image data 8 or image data 11 according to color data set anew by a user.

Furthermore, the displaying part 9 may display a total of three images simultaneously from either image data 8, image data 11, or both. In this case, if the displaying part 9 displays an image included in image data using predetermined colors, for example, "R", "G", and "B", it is possible to display an RGB color image.

Figure 3:
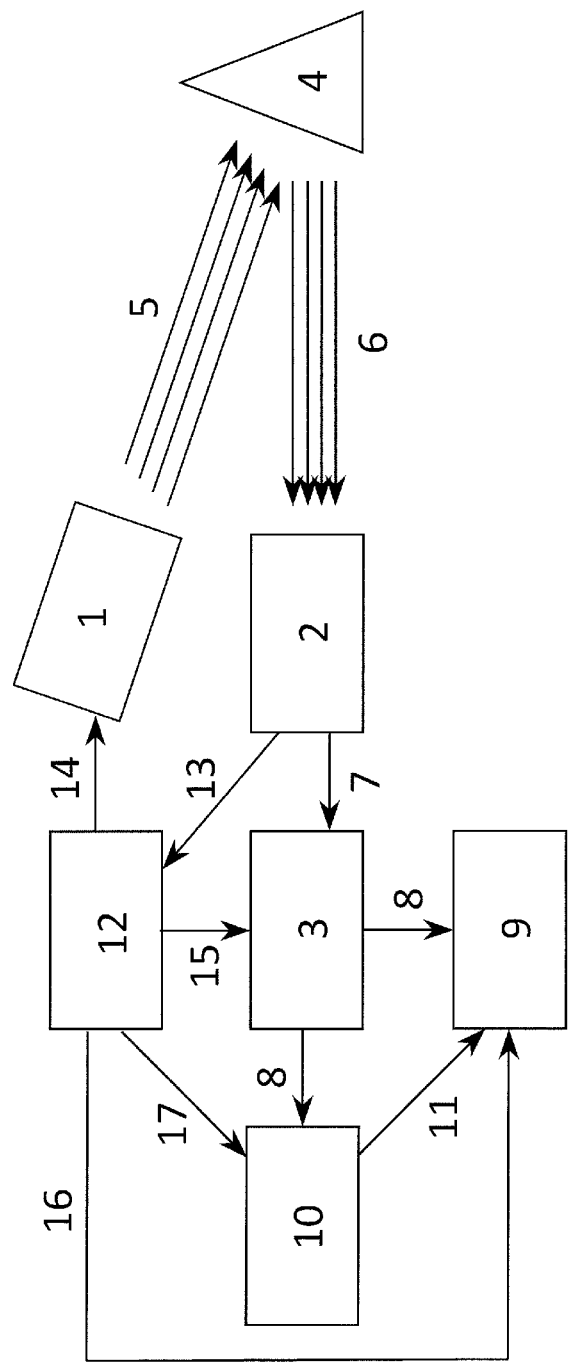
FIG. 3 is a schematic diagram showing a configuration of an image capturing device according to another embodiment of the present invention.

FIG. 3 shows the configuration of an image capturing device related to another embodiment of the present invention. As is shown in FIG. 3, the image capturing device related to the present embodiment is arranged with an irradiating part 1, a capturing part 2, a color setting part 3, and a control processing part 12. The capturing part 2 sends a capturing operation start signal 13 to the control processing part 12. The control processing part 12 sends an irradiating operation start instruction signal 14 to the irradiating part based on the capturing operation start signal 13 and further sends a color setting operation start instruction signal 15 to the color setting part 3. The irradiating part 1 irradiates infrared beams 5 having different wavelength intensity distributions to an object 4 based on the irradiating operation start instruction signal 14, the capturing part 2 captures an image of the object 4 by each reflected infrared beam 6 having different wavelength intensity distributions reflected from the object 4, forms image data 7 which represents each image, and sends to the data to the color setting part 3. The color setting part 3 sets color data to the image data 7 based on the color setting operation start instruction signal 15.

Furthermore, the image device related to the present embodiment may be further arranged with a displaying part 9. In this case, the control processing part 12 sends a displaying operation start instruction signal 16 to the displaying part 9 and the displaying part 9 colors and displays each image which is represented by image data 8 set with color data according to the color data based on the displaying operation start instruction signal 16.

Furthermore, the image device related to the present invention may further be arranged with an image storing part 10. In this case, the control processing part 12 may further send an image storing operation start instruction signal 17 to the image storing part 10 and the image storing part 10 may store image data 8 based on the image storing operation start instruction signal 17.

Furthermore, in the image device related to the present embodiment, the image storing device 10 may send image data 11 set with color data stored in the image storing part 10 to the displaying part 9 based on the image storing operation start instruction signal 17, and the displaying part 9 may color and display one or more of image data 8 and image data 11 according to the color data.

In addition, when the color setting part 9 sets to image data which represents a first image, which is captured by an infrared beam which has a wavelength intensity distribution in which the wavelength range or the center of wavelength is on the shortest wavelength side, among the images represented by image data, color data for coloring using "R", sets to image data which is formed other than the image data representing the first image color data for coloring other than "R", it is possible to obtain a color close to that of an image captured by using a visible light.

Furthermore, when the irradiating part 1 modulates the intensity by setting a phase difference to each infrared beam 5, and irradiates them onto the object 4, it is possible to form image data appropriate for video display.

Furthermore, the irradiating part 1 may modulate the intensity of each infrared beam 5 at different frequencies and irradiate them onto the object 4.

In addition, color separation is improved when the irradiating part 1 irradiates infrared beams 5 to the object 4 so that each infrared beam 5 is not irradiated substantially simultaneously.

Furthermore, when each image represented by one or more of image data 8 set with color data and image data 11 set with color data stored in the image storing part 10 are colored according to the color data and displayed simultaneously by the displaying part 9, flickering decreases.

In addition, the different mono-colors may be either "R", "G", or "B" or combination of two or more.

In addition, infrared beams having different wavelength intensity distributions may be irradiated to an object, an image may be captured using each infrared beam having different wavelength intensity distributions reflected from the object, image data which represents each image may be formed, and each image represented by the image data which is formed may be colored by using different mono-colors.

Furthermore, among the captured images, a first image captured using infrared beam having a wavelength intensity distribution in which the wavelength range or the center of wavelength is on the shortest wavelength side may be colored by using "R", and images captured other than the first image may be colored by using a color other than "R".

In addition, the different mono-colors may be either "R", "G", and "B", or a combination of two or more.

Figure 4:
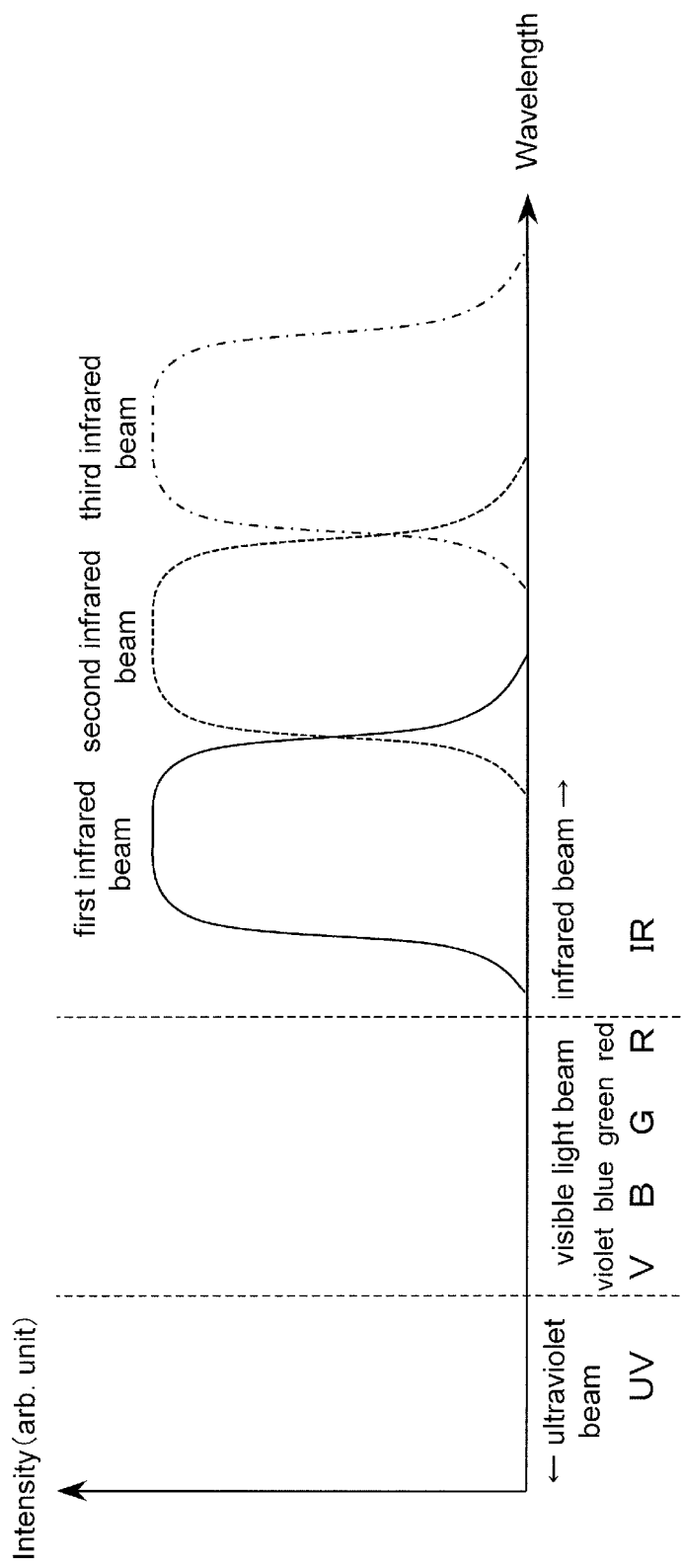
FIG. 4 is a schematic diagram showing a wavelength relation between an infrared beam, ultra-violet beam, and a visible light beam in one embodiment of the present invention.

FIG. 4 shows an example in the case where infrared beams having different wavelength intensity distributions are formed from three different wavelength distributions. Furthermore, infrared beams having different wavelength intensity distributions may also be formed from two or four or more different wavelength intensity distributions.

In addition, in infrared beams having different wavelength intensity distributions, different wavelength intensity distributions may overlap partially each other as shown in FIG. 4. Alternatively, there may be no overlap. In addition, different wavelength intensity distributions may have a shape of a rectangular wave distribution, a Gaussian distribution, or a Lorenz distribution. Alternatively, it may be a shape of a synthetic distribution of them, an asymmetric distribution, or an arbitrary distribution.

Furthermore, although a wavelength relationship with ultraviolet light or visible light is shown in FIG. 4, an infrared beam is located on the longer wavelength side than the visible light. In addition, violet, blue, green and red of the visible light are generally displayed as "V", "B", "G", and "R", and ultraviolet beam and infrared beam are generally display as "UV" and "IR". X rays are located on the shorter wavelength side than the ultraviolet beam. Radio waves such as microwaves are located on the longer wavelength side than the infrared beam.

Furthermore, infrared beams having different wavelength intensity distributions or wavelength modulation infrared beams may be generated by a heating element such as an incandescent light, a plasma light emitter such as a fluorescent lamp, or an infrared lamp, which emits infrared light, such as an infrared LED (light emitting diode), and an infrared band pass filter. In addition, they may also be generated by combining an infrared beam cut filter for removing a visible light, etc.

Furthermore, an infrared light band pass filter having a transmittance wavelength band or a combination of a long wavelength transmittance filter and a short wavelength transmittance filter is possible as an infrared band pass filter. A wavelength selection type liquid crystal filter may also be used.

In addition, a heating element such as an incandescent light, a plasma light emitter such as a fluorescent lamp, or an infrared lamp, which emits infrared light, such as an infrared LED, and a wavelength selection type liquid crystal filter attached with a shutter function may also be used.

In addition, an intensity modulation may be performed using an opening and closing slit, a chopper, or a shutter.

Figure 5:
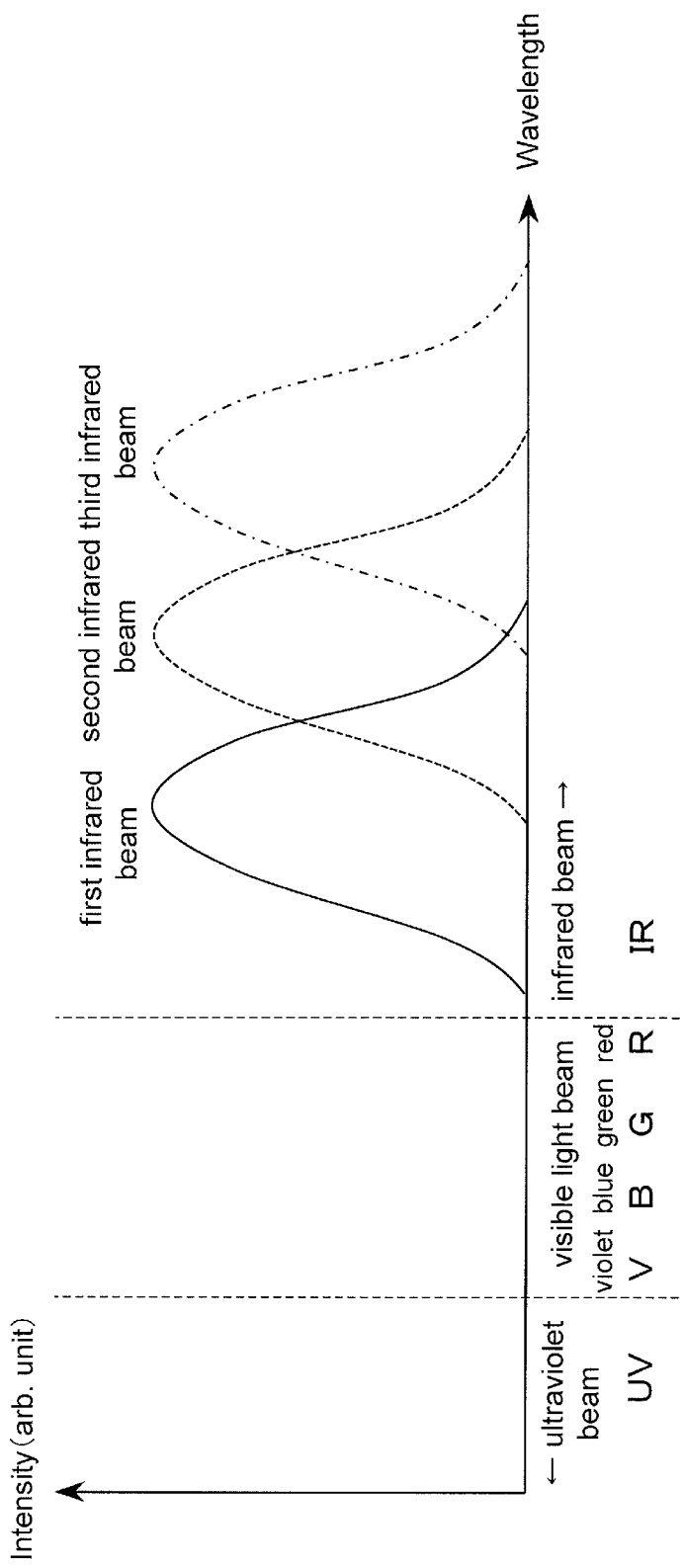
FIG. 5 is an example diagram showing wavelength intensity distributions in case of using three infrared LEDs, wherein each LED radiates infrared beams having different wavelength intensity distributions, in one embodiment of the present invention.

In addition, infrared beams having different wavelength intensity distributions may be formed using a plurality of LEDs or infrared LEDs, which emit infrared beams having different wavelength intensity distributions. FIG. 5 shows an example of wavelength intensity distributions in the case where three infrared LEDs which emit infrared beams having different wavelength intensity distributions are used.

Figure 6:
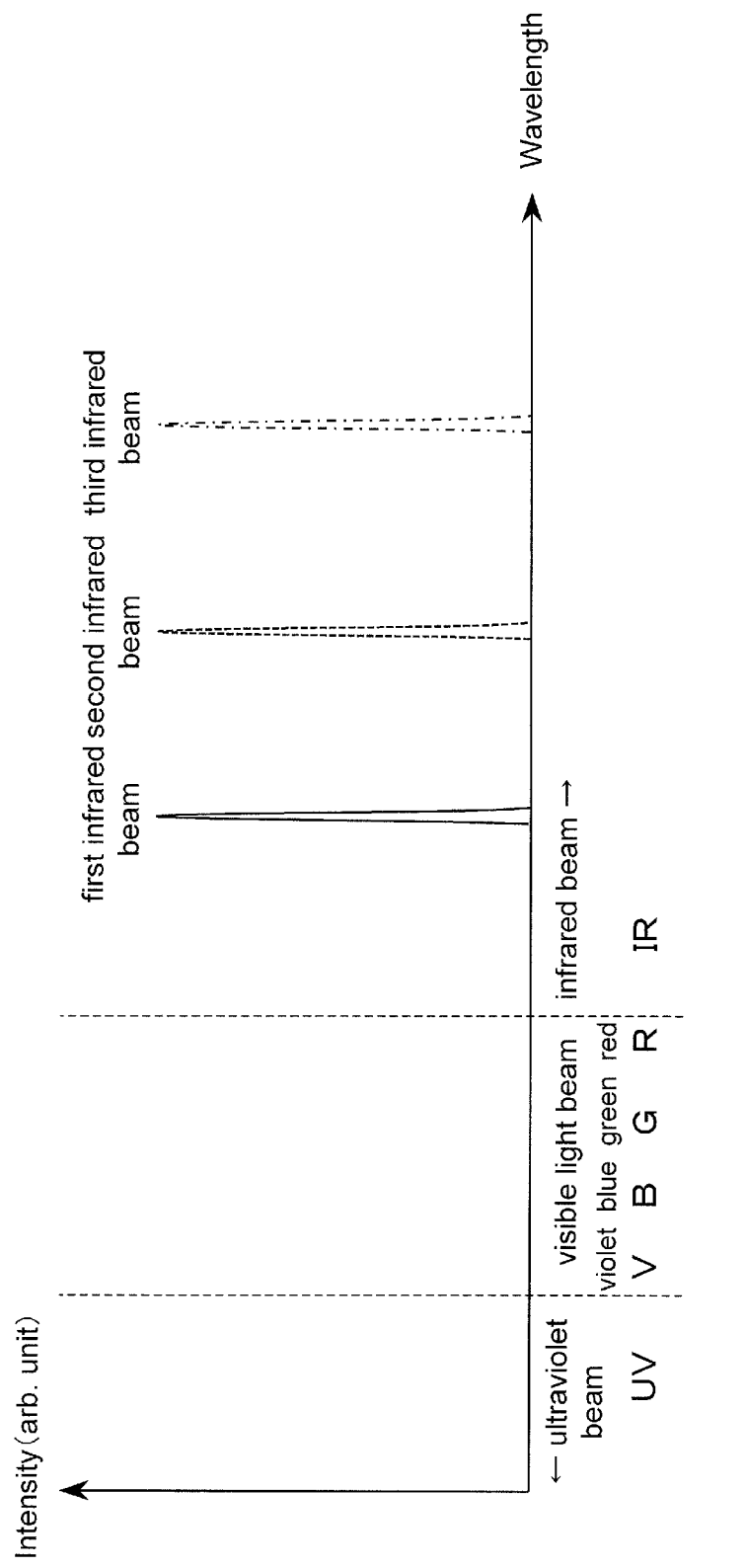
FIG. 6 is an example diagram showing wavelength intensity distributions in case of using three infrared LDs, wherein each LD radiates infrared beams having different wavelength intensity distributions, in one embodiment of the present invention.

In addition, infrared beams having different wavelength intensity distributions may be formed using a plurality of LDs (laser diode) or infrared LDs, which emit light beams having different wavelengths. FIG. 6 shows an example in the case of using three infrared LDs which emit infrared beams having different wavelength intensity distributions. It is generally the case that wavelength intensity distributions do not overlap as shown in FIG. 6 because ranges of wavelength distributions emitted by infrared LDs are narrow.

Furthermore, a combination of an infrared LED and an infrared LD is possible.

Furthermore, an intensity modulation may be performed by flashing an infrared LED or an infrared LD.

Furthermore, an intensity modulation may be performed by emitting the light of an infrared LED or infrared LD at different times in a pulse shape.

Furthermore, an intensity modulation may also be performed by an infrared LED or an infrared LD using a wave shape such as a square wave, a sine wave, a cosine wave, a triangular wave, a sawtooth wave, a wave of a combination of these, a wave having a duty ratio or a bias of these or a wave of a combination of these.

Furthermore, an intensity modulation of the light emitted by an infrared LED or an infrared LD may also be performed by changing the power which is supplied. Alternatively, an intensity modulation may also be performed by apparently flashing using an opening and closing slit, a chopper, or a liquid crystal shutter.

Furthermore, infrared beams having different wavelength intensity distributions may be formed by modulating the wavelength of an infrared LED or an infrared LD. Furthermore, a wavelength modulation may also be performed electromagnetically. Furthermore, a further intensity modulation may be performed.

Furthermore, infrared beams having different wavelength intensity distributions may be generated using a plurality of infrared beam sources.

Furthermore, infrared beams having different wavelength intensity distributions may be generated by dividing one or more infrared beams sources into a plurality of sources.

Furthermore, a capturing can be performed using a solid capturing element using a single element group such as Si or Ge, or a compound system such as SiGe, InAs, InSb, PbS, PbSe, InGaAs, or HgCdTe. On the other hand, the long wavelength side of a sensitivity wavelength region of Si is up to 1200 nm. Thus, infrared beams having different wavelength intensity distributions may be formed from about 750 nm to 1200 nm.

Furthermore, an infrared LED or an infrared LD can emit light also in a wavelength range between about 750 nm to 1600 nm. Thus, when infrared beams having different wavelength intensity distributions are generated by an infrared LED or an infrared LD emitting light in the wavelength range of 750 nm to 1200 nm, there is a good compatibility with a capturing device which uses Si as a solid capturing element.

Furthermore, in the case of InSb, the sensitivity wavelength region is from 1 μm to 6 μm. Thus, infrared beams having different wavelength intensity distributions may be formed from within this infrared wavelength region.

Furthermore, in the case of HgCdTe, the sensitivity wavelength region is from 6 μm to 16 μm. Thus, infrared beams having different wavelength intensity distributions may be formed from within this infrared wavelength region, and so on.

Furthermore, it is possible to perform an irradiating operation and a capturing operation synchronously.

Furthermore, it is possible to perform an irradiating operation, a capturing operation and an image data forming operation synchronously. Furthermore, it is possible to synchronously perform a color data setting operation.

Figure 7:
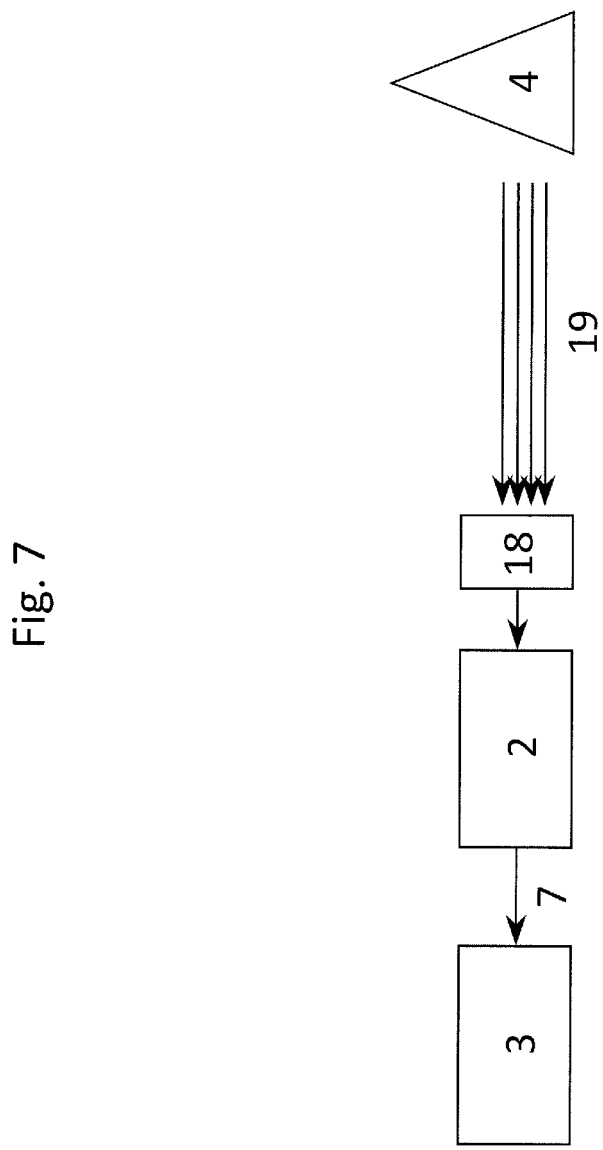
FIG. 7 is a schematic diagram showing a configuration of an image capturing device according to another embodiment of the present invention.

FIG. 7 shows a configuration of an image capturing device related to another embodiment of the present invention. As is shown in FIG. 7, the image capturing device related to the present embodiment is arranged with a separating part 18, a capturing part 2 and a color setting part 3. The separating part 18 separates a light beam 19 from an object 4 into infrared beams having different wavelength intensity distributions. The capturing part 2 captures an image of the object using each infrared beam to form image data 7. The color setting part 3 sets color data for coloring a first image, among the images captured, with "R", the first image being captured using an infrared beam having a wavelength intensity distribution in which the wavelength range or the center of wavelength is on the shortest wavelength side, to image data 7 which represents the first image, and sets color data for coloring an image/images captured other than the first image with a color/colors other than "R" to image data 7 other than image data 7 which represents the first image.

Figure 8:
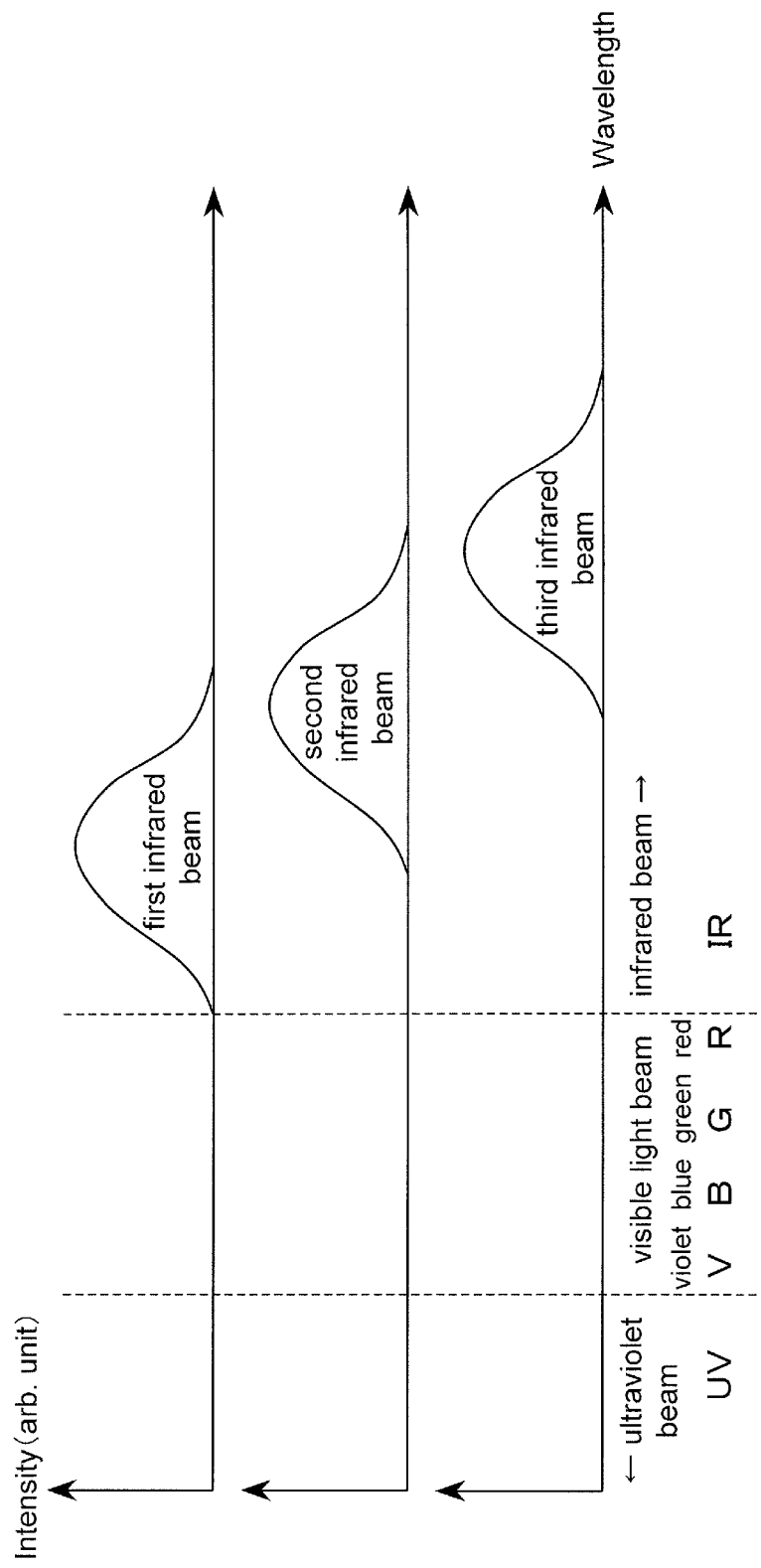
FIG. 8 is an example diagram showing wavelength intensity distributions of three different infrared beams separated by a separating part, in one embodiment of the present invention.

FIG. 8 shows an example of separating a light beam from an object into infrared beams having three different wavelength intensity distributions. Furthermore, the light beam may be separated into infrared beams having two or four or more different wavelength intensity distributions.

As is shown in FIG. 8, it is possible for the capturing part to capture three images of an object using a first infrared beam, a second infrared beam, and a third infrared beam having three different wavelength intensity distributions formed by separating using the separating part.

Here, the object generally includes particular infrared reflection characteristics or particular infrared light emitting characteristics for each section of the object in an infrared region. In this way, images of the object captured using infrared beams having different wavelength intensity distributions are different images each other. Thus, when the different images are differently colored using different colors or monocolors and displayed, then it is possible to display a color image with much more information compared to a mono-color scale display or a pseudo-color scale display.

In addition, an object is presumed to be a substance having a form such as a solid, liquid, or gas or to be a mixed substance. In this case, it has been discovered by the inventor of the present invention that a section which reflects or emits "R wavelength region" of a visible light beam at each section of the object tends to reflect or emit an infrared beam having a wavelength intensity distribution in a wavelength region close to the "R wavelength region." In addition, it has been discovered by the inventor of the present invention that a section which does not reflect or emit "R wavelength region" of a visible light beam tends not to reflect or emit an infrared beam having a wavelength intensity distribution in a wavelength region close to the "R wavelength region".

Therefore, among the three different images captured using a first infrared beam, a second infrared beam, and a third infrared beam having three different wavelength intensity distributions, color data are set where a first image captured using the first infrared beam having a wavelength intensity distribution with a wavelength range or the center of wavelength on the shortest wavelength side is colored by using "R", and images other than the first image are colored by using a color/colors other than "R". In addition, when reproduction such as coloring and displaying is performed according to the color data, it is possible to capture an infrared color image of an object equal or near to a color image captured using a visible light beam.

Furthermore, it is possible to set color data for coloring the first image using "R", the second image obtained using the second infrared beam using "G" and the third image obtained using the third infrared beam using "B" and to capture an RGB infrared image.

Furthermore, it is possible to set color data for coloring the first image using "R", the second image obtained using the second infrared beam using "B" and the third image obtained using the third infrared beam using "G" and to capture an RGB infrared image.

Furthermore, it is possible to set color data for coloring the first image using "G", the second image using "B", and the third image using "R".

Furthermore, it is possible to set color data for coloring the first image using "G", the second image using "R", and the third image using "B".

Furthermore, it is possible to set color data for coloring the first image using "B", the second image using "R", and the third image using "G".

Furthermore, it is possible to set color data for coloring the first image using "G", the second image using "G", and the third image using "R".

Furthermore, the image capturing device related to the present embodiment shown in FIG. 7 may further be arranged with a separating part 18, a capturing part 2 and a color setting part 3. In this case, the separating part separates a light beam 19 from an object 4 into light beams having different wavelength intensity distributions. The capturing part 2 captures an image of the object 4 using light beams having different wavelength intensity distributions and forms image data 7. The color setting part 3, among the captured images, sets color data for coloring a first image with "R" captured using a visible light beam having an "R wavelength region" and an infrared beam having the closest wavelength intensity distribution to the "R wavelength region" to image data which represents the first image, and sets color data for coloring an image/images captured other than the first image with a color/colors other than "R" to image data other than image data which represents the first image.

Figure 9:
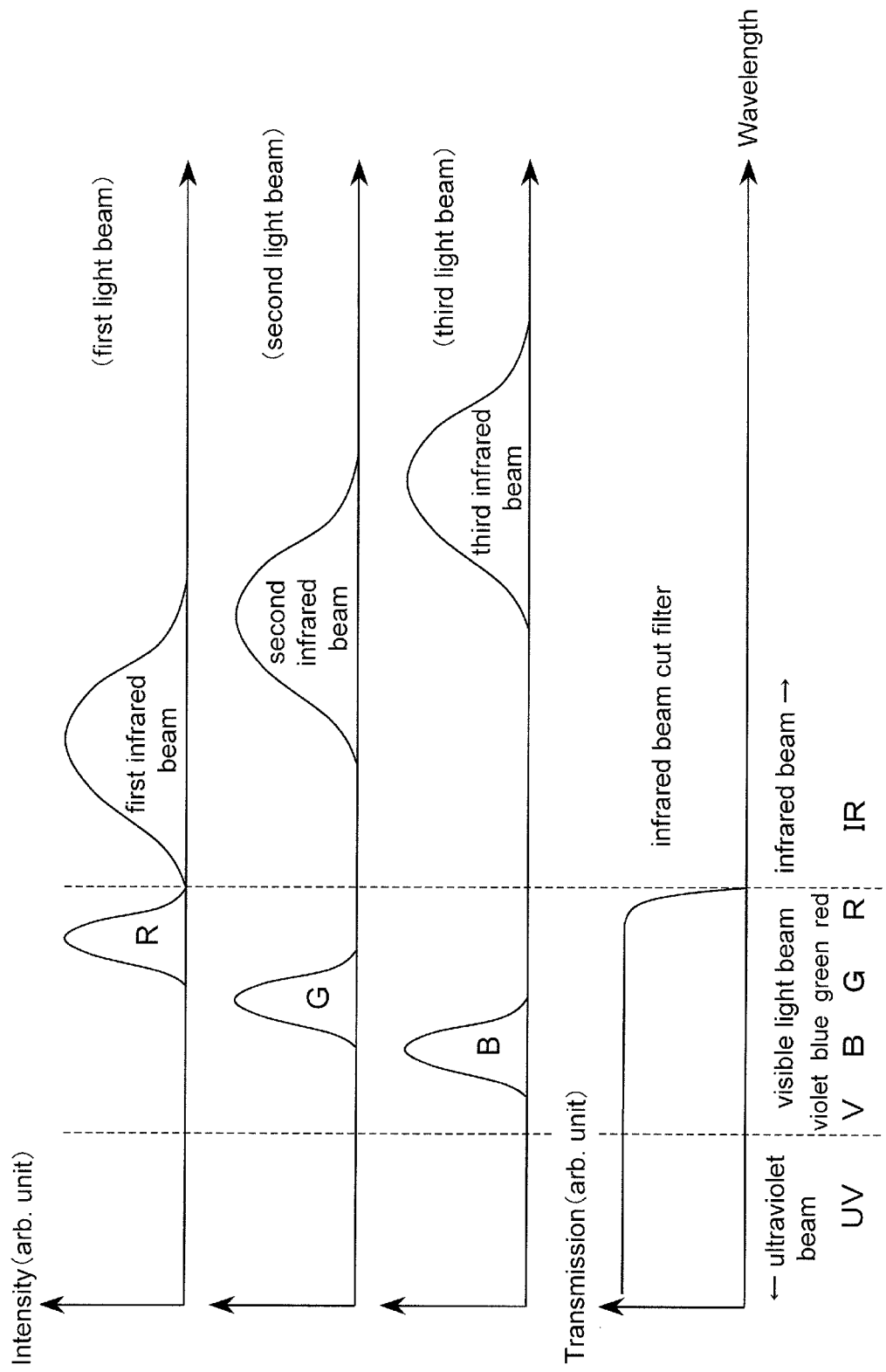
FIG. 9 is an example diagram showing a separation condition wherein a light beam from an object is separated into three, which have different wavelength intensity distributions, by the separating part, in one embodiment of the present invention.

FIG. 9 shows an example of separating a light beam from an object into light beams having three different wavelength intensity distributions. Furthermore, the light beam may be separated into light beams having not only three but also two or four or more different wavelength intensity distributions. Furthermore, an example of a transmittance of an infrared cut filter is shown in FIG. 9. As is shown in FIG. 9, the infrared cut filter cuts or blocks infrared beam and allows a visible light beam or an ultraviolet beam or both to penetrate.

In addition, as is shown in FIG. 9, it is possible for the capturing part to capture three different images of an object using a first light beam, a second light beam, and a third beam having three different wavelength distributions formed by separation using the separating part. In addition, among the three different images, color data for coloring a first image with "R" obtained by an "R wavelength region" and a first infrared beam is set to image data which represents the first image, color data for coloring a second image with "G" obtained by a "G wavelength region" and a second infrared beam is set to image data which represents the second image, and color data for coloring a third image with "B" obtained by a "B wavelength region" and a third infrared beam is set to image data which represents the third image. In this way, when reproduction such as coloring and displaying according to the color data is performed, it is possible to capture a visible and infrared color image of an object equal or near to an image captured using a visible light beam.

Furthermore, it is possible to capture an image by using a visible light when an infrared cut filter shown in FIG. 9 is used.

Figure 10:
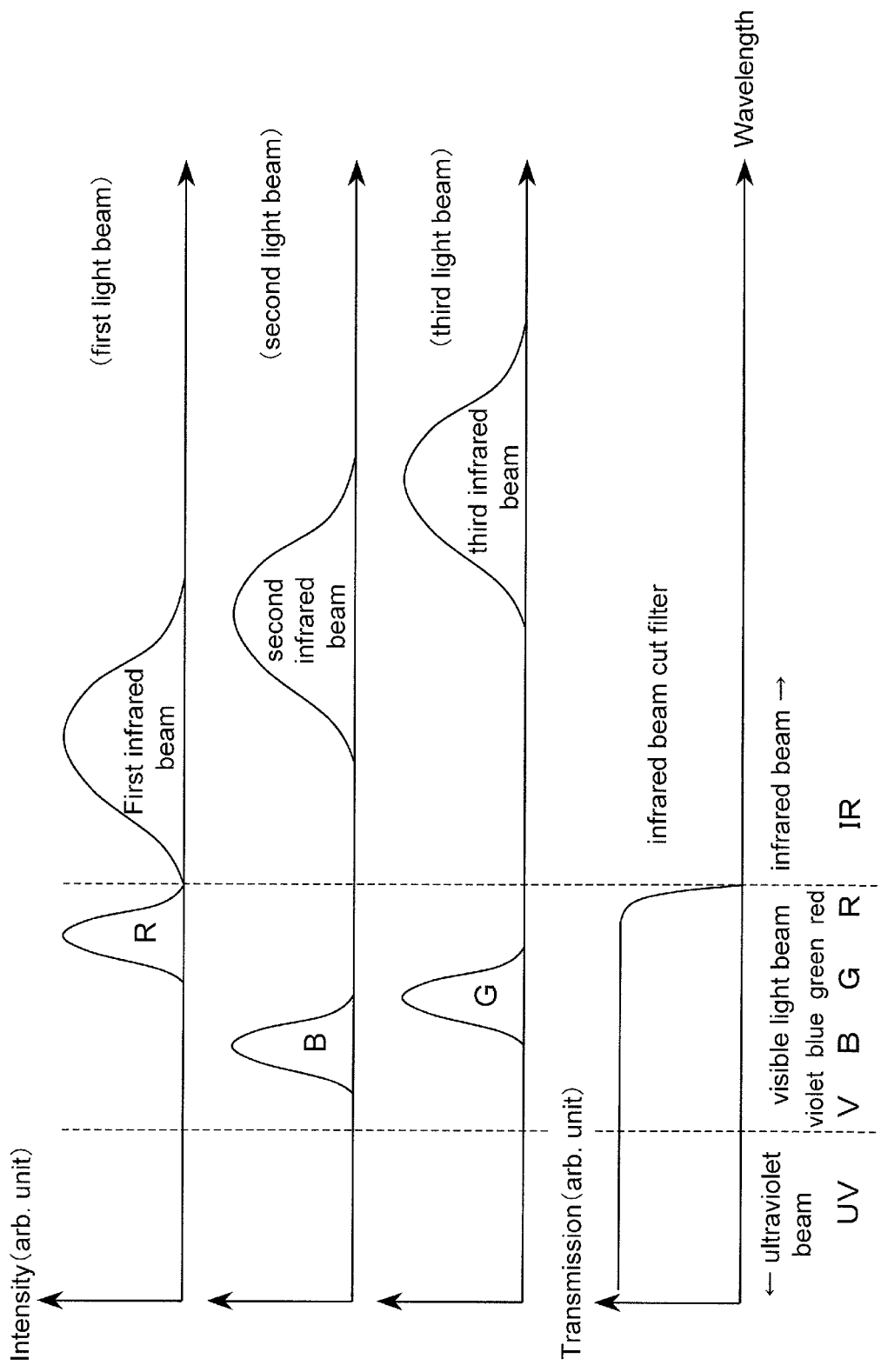
FIG. 10 is an example diagram showing a separation condition wherein a light beam from an object is separated into three, which have different wavelength intensity distributions, by the separating part, in one embodiment of the present invention.

FIG. 10 shows an example in the case where a first light beam is formed from an "R wavelength region" and a first infrared beam, a second light beam is formed from a "B wavelength region" and a second infrared beam, and a third light beam is formed from a "G wavelength region" and a third infrared beam. In this case also, when reproduction such as coloring and displaying is performed, it is possible to capture a visible and infrared color image of an object equal or near to an image captured using a visible light beam.

Furthermore, a first light beam may be formed from a "G wavelength region" and a first infrared beam, a second light beam may be formed from a "B wavelength region" and a second infrared beam, and a third light beam may be formed from an "R wavelength region" and a third infrared beam.

Furthermore, a first light beam may be formed from a "G wavelength region" and a first infrared beam, a second light beam may be formed from an "R wavelength region" and a second infrared beam, and a third light beam may be formed from a "B wavelength region" and a third infrared beam.

Furthermore, a first light beam may be formed from a "B wavelength region" and a first infrared beam, a second light beam may be formed from an "R wavelength region" and a second infrared beam, and a third light beam may be formed from a "G wavelength region" and a third infrared beam.

Furthermore, a first light beam may be formed from a "B wavelength region" and a first infrared beam, a second light beam may be formed from a "G wavelength region" and a second infrared beam, and a third light beam may be formed from an "R wavelength region" and a third infrared beam.

Figure 11:
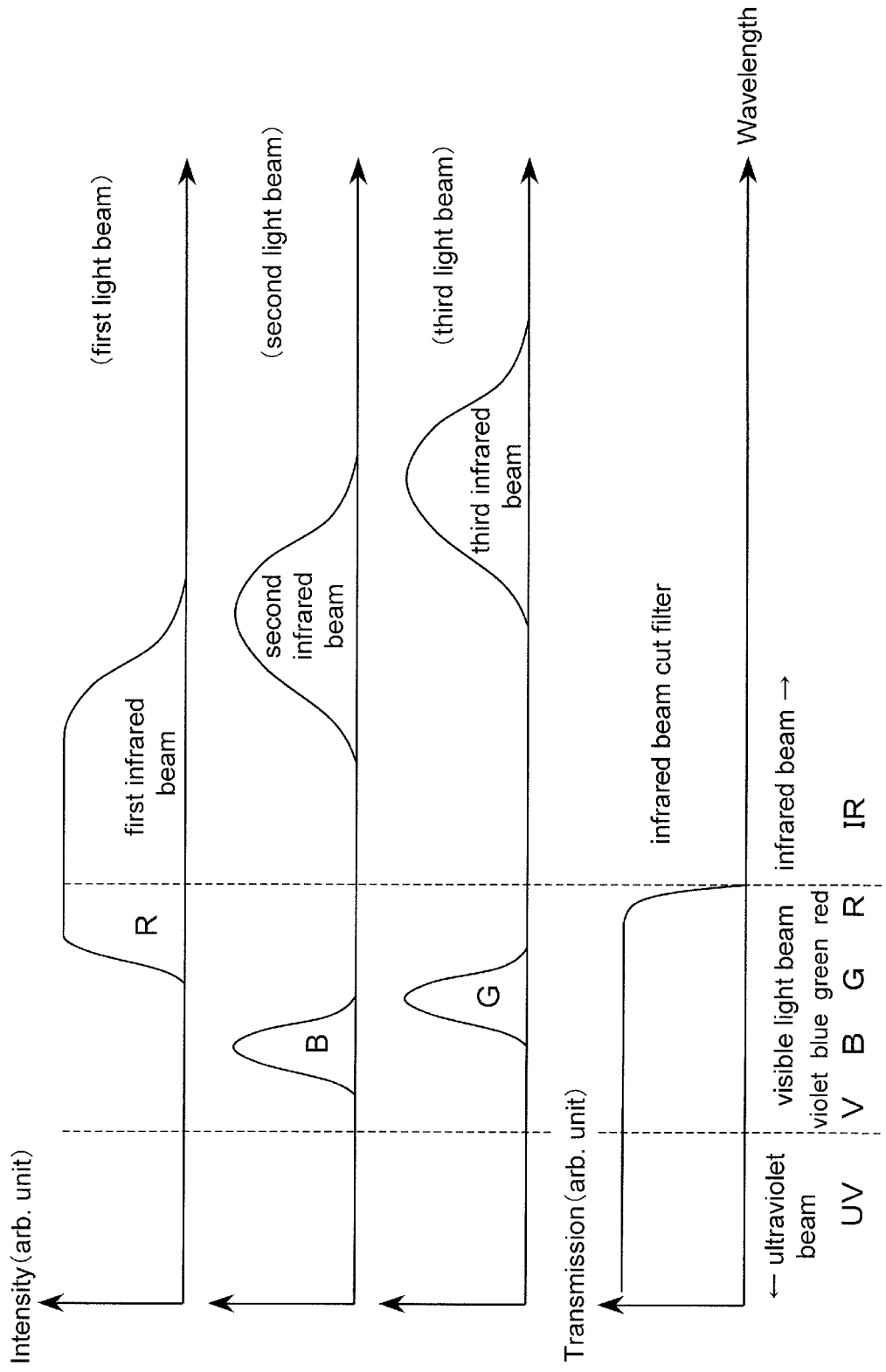
FIG. 11 is an example diagram showing a light beam from an object is separated into three, which have different wavelength intensity distributions, by the separating part, in one embodiment of the present invention.

Furthermore, as is shown in FIG. 11, a wavelength region in which an "R wavelength region" and a first infrared beam are consecutive and may be allowed to penetrate. In this way, it is possible to capture a brighter image.

Furthermore, in the case where a first light beam is formed from an "R wavelength region" and a first infrared beam, a second light beam is formed from a "G wavelength region" and a second infrared beam, and a third light beam is formed from a "B wavelength region" and a third infrared beam, a wavelength region in which the "R wavelength region" and the first infrared beam are consecutive and may be allowed to penetrate.

Furthermore, the capturing part may be arranged with a plurality of pixels and the separating part may be formed by being attached to each of the plurality of pixels.

An infrared beam from an object may be separated into infrared beams having different wavelength intensity distributions, an image of an object may be captured using each infrared beam having different intensity distributions, among the captured images a first image may be colored using "R" captured using an infrared beam having a wavelength intensity distribution in which a wavelength range or the center of wavelength is on the shortest wavelength side, and an image/images captured other than the first image may be colored with a color/colors other than "R".

A light beam from an object may be separated into light beams having different wavelength intensity distributions, an image of an object may be captured using each light beam having different intensity distributions, among the captured images, a first image may be colored using "R" captured using a visible light beam having an "R wavelength region" and an infrared beam having a wavelength intensity distribution closest to the "R wavelength region", and an image/images captured other than the first image may be colored with a color/colors other than "R".

(Embodiment 1)

Figure 12:
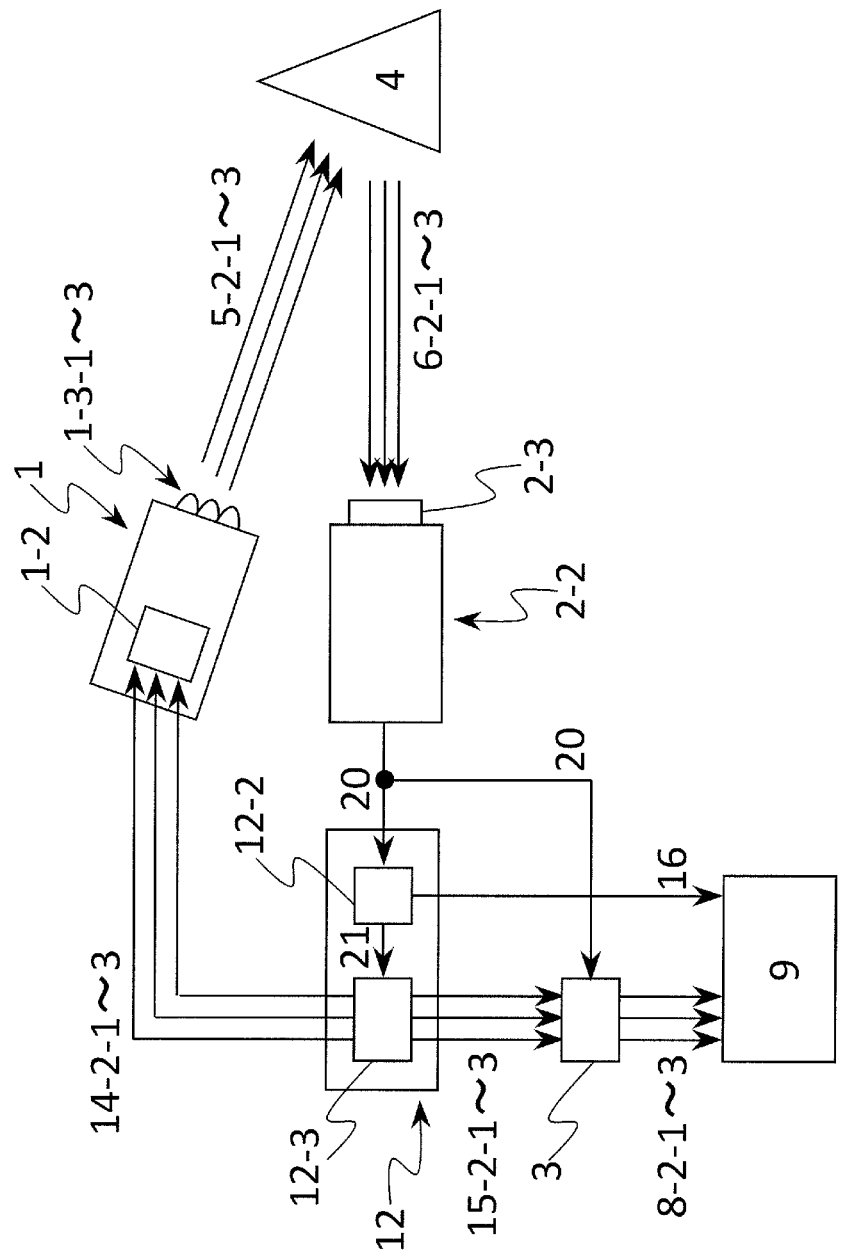
FIG. 12 is a schematic diagram showing a configuration of embodiment 1 of an image capturing device and an image capturing method of the present invention.

FIG. 12 shows a first embodiment of an image capturing device and an image capturing method according to the present invention. As is shown in FIG. 12, a CCD camera 2-2 which is a capturing part sends an NTSC video signal, in which zeroth image data and a first capturing operation start signal are overlapped, to a data separating part 12-2 which forms a control processing part 12. The data separating part 12-2 separates an odd/even field signal 21 which becomes a capturing operation start signal from the NTSC video signal 20. In addition, the signal is also sent to a control processing processor 12-3 which forms the control processing part 12.

Next, the control processing processor 12-3 sends a first irradiating operation start instruction signal 14-2-1 to an irradiating switch part 1-2 which forms the irradiation part 1. The irradiating switch part 1-2 makes a first infrared LED 1-3-1 emit and irradiate a first infrared beam 5-2-1 to an object 4.

In addition, the CCD camera 2-2 captures a first image from a first infrared beam 6-2-1 reflected from the object 4 to generate first image data and sends an NTSC video signal 20, in which the first image data and a second capturing operation start signal are overlapped, to the data separating part 12-2 and a color setting part 3. The data separating part 12-2 separates an odd/even field signal 21 from the NTSC video signal 20 and sends the signal to the control processing processor 12-3. The control processing processor 12-3 sends a first color setting instruction signal 15-2-1 to the color setting part 3. The color setting part 3 sends a first image within the NTSC video signal 20 to the displaying part 9 as image data 8-2-1 for making coloring possible using a first color. The displaying part 9 colors and displays the first image using the first color.

Furthermore, in the case where a main part of image data and a main part of a capturing operation start signal are apart in terms of time in an NTSC video signal 20, it is not always necessary to separate the image data from the NTSC video signal 20 sent to the color setting part 3. However, it is also possible to separate the image data from the NTSC video signal 20.

Next, the control processing processor 12-3 sends a second irradiating operation start instruction signal 14-2-2 to the irradiating switch part 1-2 which forms the irradiation part 1. The irradiating switch part 1-2 makes a second infrared LED 1-3-2 emit and irradiate a second infrared beam 5-2-2 to the object 4.

In addition, the CCD camera 2-2 captures a second image from a second infrared beam 6-2-2 reflected from the object 4 to generate second image data and sends an NTSC video signal 20 in which the second image data and a third capturing operation start signal are overlapped to the data separating part 12-2 and the color setting part 3. The data separating part 12-2 separates an odd/even field signal 21 from the NTSC video signal 20 and sends the signal to the control processing processor 12-3. The control processing processor 12-3 sends a second color setting instruction signal 15-2-2 to the color setting part 3. The color setting part 3 sends a second image within the NTSC video signal 20 to the displaying part 9 as image data 8-2-2 for making coloring possible using a second color. The displaying part 9 colors and displays the second image using the second color.

Next, the control processing processor 12-3 sends a third irradiating operation start instruction signal 14-2-3 to the irradiating switch part 1-2 which forms the irradiation part 1. The irradiating switch part 1-2 makes a third infrared LED 1-3-3 emit and irradiate a third infrared beam 5-2-3 to the object 4.

In addition, the CCD camera 2-2 captures a third image from a third infrared beam 6-2-3 reflected from the object 4 to generate third image data and sends an NTSC video signal 20 in which the third image data and a zeroth capturing operation start signal are overlapped to the data separating part 12-2 and color setting part 3. The data separating part 12-2 separates an odd/even field signal 21 from the NTSC video signal 20 and sends the signal to the control processing processor 12-3. The control processing processor 12-3 sends a third color setting instruction signal 15-2-3 to the color setting part 3. The color setting part 3 sends a third image within the NTSC video signal 20 to the displaying part 9 as image data 8-2-3 for making coloring possible using a third color. The displaying part 9 colors and displays the third image using the third color. With this operation, it is possible to display an image of the object 4 colored using colors from the first to third colors on the displaying part 9.

Furthermore, a lens 2-3 focuses infrared beams 6-2-1 to 6-2-3 on a capturing surface or pixels of the CCD camera 2-2.

Furthermore, it is possible to correspond the first to the third colors to "R", "G", and "B" respectively. Alternatively, it is possible to correspond the first to the third colors to "R", "B", and "G" respectively. Alternatively, it is possible to correspond the first to the third colors to "G", "B", and "R" respectively. Alternatively, it is possible to correspond the first to the third colors to "G", "R", and "B" respectively. Alternatively, it is possible to correspond the first to the third colors to "B", "R", and "G" respectively. Alternatively, it is possible to correspond the first to the third colors to "B", "G", and "R" respectively.

Furthermore, it is possible to use a camera with all pixel signal simultaneous transfer specifications such as a CCD camera as the capture part. The CCD camera may be a black and white CCD camera or a color CCD camera. In addition, if a CMOS camera is arranged with all pixel signal simultaneous transfer specifications, it may be arranged like a CCD camera. Furthermore, it is possible to arrange a CMOS camera to be with all pixel signal simultaneous transfer specifications if a memory is arranged on each pixel.

Furthermore, it is possible to use an RGB color monitor as the displaying part 9. In addition, it is possible to reform the image data 8-2-1 to 8-2-3, which can be colored, into an NTSC video signal using an RGB encoder and to display on an NTSC video camera monitor.

Figure 13:
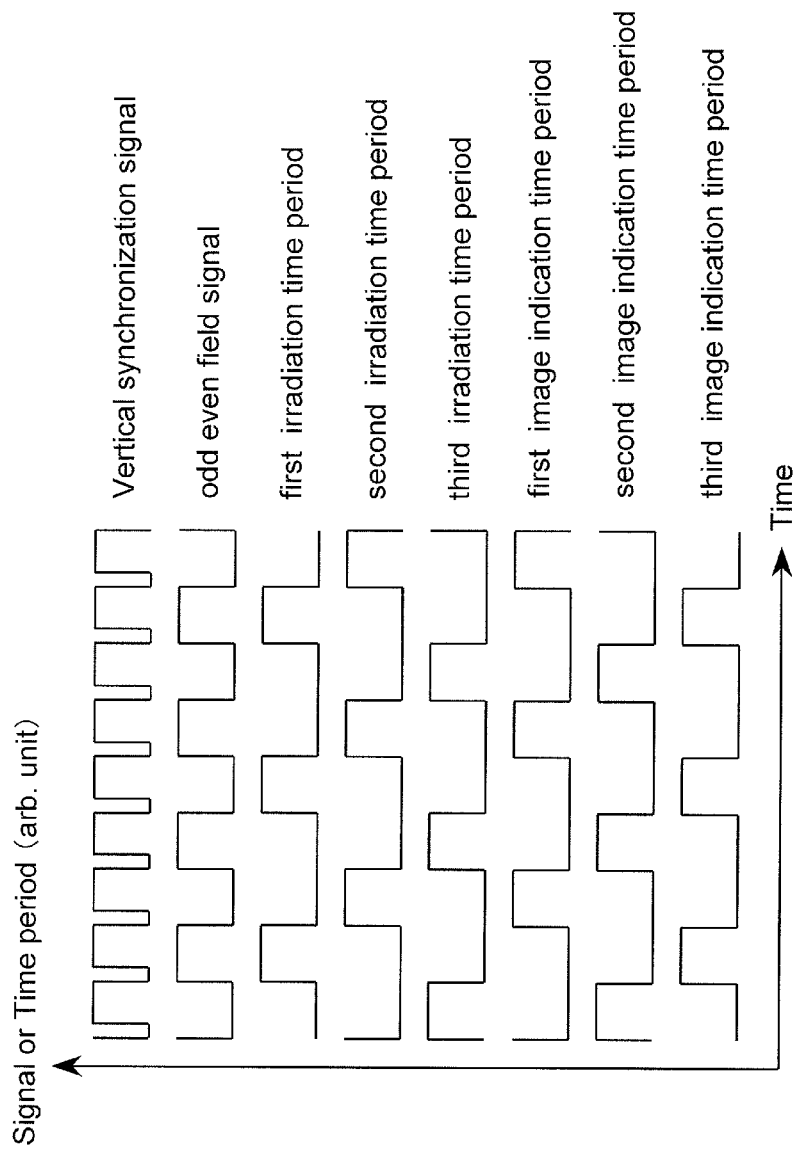
FIG. 13 is a schematic diagram showing a timing chart in embodiment 1 of an image capturing device and an image capturing method of the present invention.

FIG. 13 shows a timing chart of the first embodiment of an image capturing device and an image capturing method according to the present invention. In FIG. 13, a vertical synchronization signal, an odd/even field signal, a first irradiation time period, a second irradiation time period, a third irradiation time period, a first image indication time period, a second image indication time period, and a third image indication time period are shown in order from the top. In the first irradiation time period, the second irradiation time period, the third irradiation time period, the first image indication time period, the second image indication time period, and the third image indication time period, the time when a signal rises from a horizontal line along a vertical line shows the start time of each range and the time when a signal drops vertically from a horizontal line along a vertical line shows a completion time.

As is shown in FIG. 13, a first to a third infrared beams are respectively irradiated to an object within each time period from the first to the third irradiation time periods according to an odd/even field signal, and a first to a third images are respectively displayed within each time period from the first to third image indication time periods. At this time, the first image is colored and displayed using a first color, the second image is colored and displayed using a second color, and the third image is colored and displayed using a third color, thereby it is possible to display an infrared beam image of an object using the first to the third colors. It is possible to display an image using RGB color if the first, the second, and the third colors are set to "R", "G", and "B".

Furthermore, a vertical synchronization signal is also shown in FIG. 13. However, it is possible to use a vertical synchronization signal which can be separated using a data separating part instead of an odd/even field signal.

In addition, in FIG. 13, generally, the frequency of a vertical synchronization signal in an NTSC video signal is about 60 Hz, and the frequency of a square shaped wave of an odd/even field signal is about 30 Hz. In this case, the first to third images are alternately and repeatedly displayed at a frequency of about 20 Hz respectively, and are recognized by human eyes as a color image. In addition, if an object and a capturing part are not moving relatively, an image is displayed as a color still image and if they are moving relatively an image is displayed as color video.

In addition, in FIG. 13, the duty ratio of each irradiation time range is set so as to make irradiation to be one and non-irradiation to be two. In addition, a phase difference is set so that each irradiation is performed within different time periods. In this way the color separation is improved. However, it is possible to obtain a color image even if this is not strictly performed. In addition, each square shape wave does not have to be a strictly square shape wave.

Furthermore, in FIG. 13, the first to the third images are displayed with a delay of one field compared to the first to the third irradiations. In other words, for example, the third image of the previous field is displayed on a color monitor in the first irradiation time period.

In addition, in FIG. 13, one field of one odd field or one even filed in the odd/even fields is counted as one operation unit of an irradiation operation and an image display operation. However, a plurality of fields may be counted as one operation unit, one frame which is comprised of one even field and one odd field may be counted as one operation unit, and a plurality of frames may be counted as one operation unit.

An interlace with a field rate of 60 Hz or a frame rate of 30 Hz is present in a usual NTSC video signal. However, a similar operation may be performed by increasing the field rate or the frame rate, and images may be displayed using a non-interlace such as a progressive scan. A color still image or a color video can be obtained with less flicker as the display rate is increased.

Figure 14:
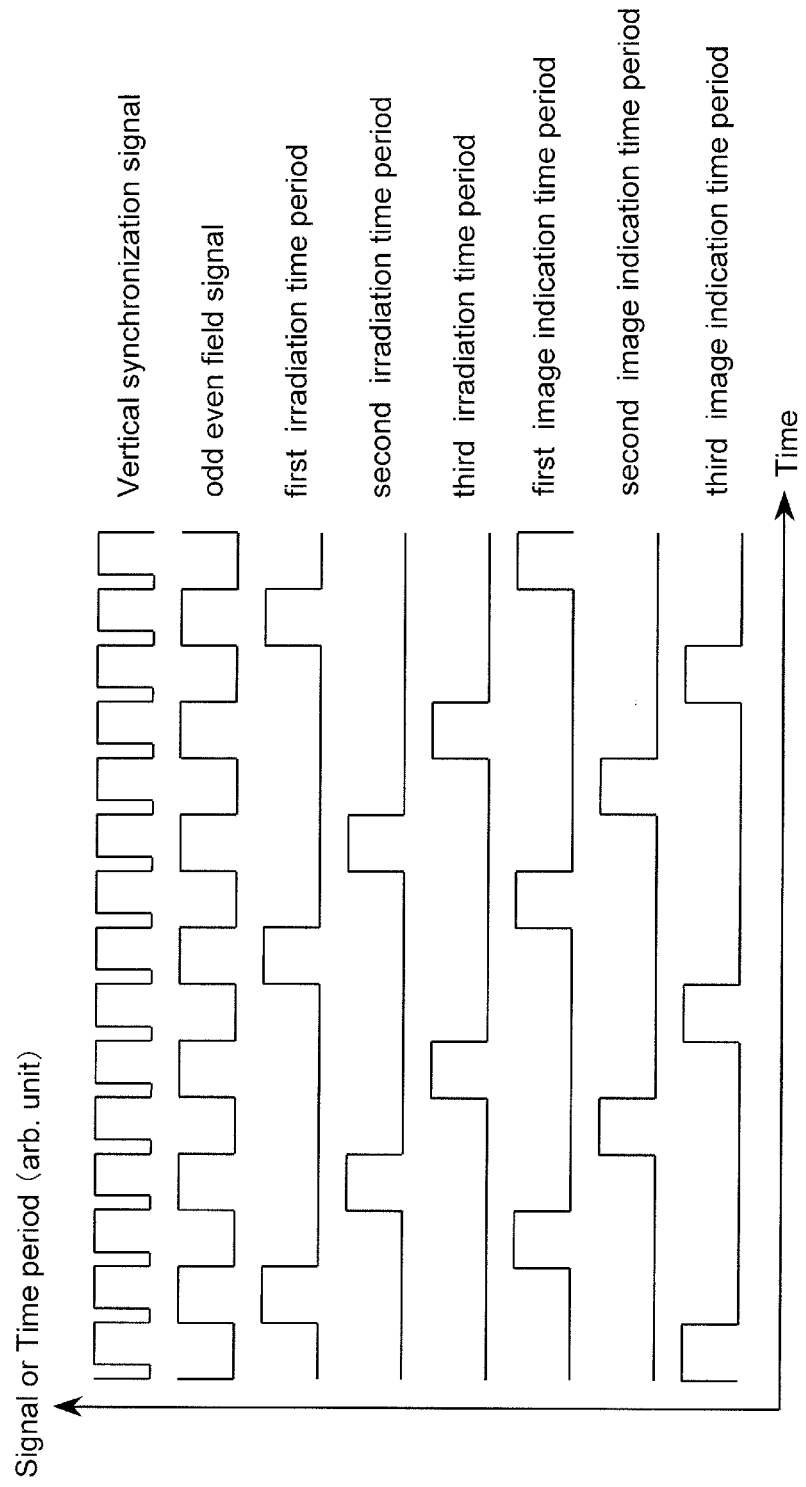
FIG. 14 is a schematic diagram showing a timing chart in embodiment 1 of an image capturing device and a method of the present invention.

FIG. 14 shows a timing chart in the case of a camera with pixel signal sequential readout specifications such as a CMOS camera as a capturing part in an image capturing device and image capturing method according to the present embodiment. In FIG. 14, similar to FIG. 13, a vertical synchronization signal, an odd/even field signal, a first irradiation time period, a second irradiation time period, a third irradiation time period, a first image indication time period, a second image indication time period, and a third image indication time period are shown in order from the top.

A first to a third infrared beams are sequentially irradiated on an object with synchronization to an odd field signal or an even field signal of an NTSC video signal. That is, as is shown in FIG. 14, the operation is performed so that the first infrared beam is irradiated within the first odd field of the NTSC video signal, the second infrared beam is irradiated within the next second odd field, the third infrared beam is irradiated within the third odd field, the first infrared beam is irradiated within the fourth odd field, the second infrared beam is irradiated within the fifth odd field, and so on. Furthermore, the first to the third infrared beams are not irradiated on the object within the even fields.

Furthermore, the odd fields can be set by replacing with the even fields. Alternatively, a plurality of fields may set as one operation unit. Alternatively, one frame or a plurality of frames may be set as one operation unit.

In FIG. 14, the duty ratio of each irradiation time period is set so as to make irradiation to be one and non-irradiation to be five, irradiation of the first to the third infrared beams are performed within different time periods, and the non-irradiation time periods are set in reverse parity fields against fields at the time of irradiation. In addition, color separation is improved when all pixel signals are readout in the time of non-irradiation. However, it is possible to obtain a color image even if this is not strictly performed. Furthermore, the irradiation time period of each infrared beam may overlap. In this case, color separation generally decreases, Furthermore, similarly, it is possible to correspond the first to the third colors to "R", "G", and "B" respectively.

Furthermore, the CMOS camera may be a black and white CMOS camera or a color CMOS camera.

In addition, similar operations may be performed by switching infrared beam irradiation for each of a plurality of even fields or a plurality of odd frames. Similar operations may be performed by increasing rate of field or frame and switching infrared beam irradiation.

While the aforementioned is an example in the case of a NTSC video signal, a video signal of a different standard such as a PAL signal may also be used.

Furthermore, the operations described above are examples that can be applied to the colors "R", "G", and "B" etc. It is also possible to apply the operations to cases where two single colors are used. That is, in the case where the wavelength range or the center of wavelength of a first infrared beam is shorter than that of the second infrared beam, an color image can be obtained the same as or close to image data obtained by capture using a visible light by allocating colors in the order "R" "G" or "R" "B" with respect to the irradiation of the first and the second infrared beams. Furthermore, allocation in the following order is also possible: "G" "B", "G" "R", "B" "R", or "B" "G".

In addition, in the case of RGB colors, in the case of reproduction such as display when allocating colors in the order "R" "G" "B" or "R" "B" "G" with respect to the order where the wavelength range or the center of wavelength of an infrared beam is shorter, a color image can be obtained the same as or close to image data obtained by capture using a visible light. Furthermore, allocation in the following order is also possible: "G" "B" "R", "G" "R" "B", "B" "R" "G", or "B" "G" "R"

One or more of the control processing part, the irradiating part, the capturing part, and the color setting part, that is, one or more of the control processing part irradiating part, the capturing part, and the color setting part may be stabilized using a PLL (Phase Lock Loop).

(Second Embodiment)

Figure 15:
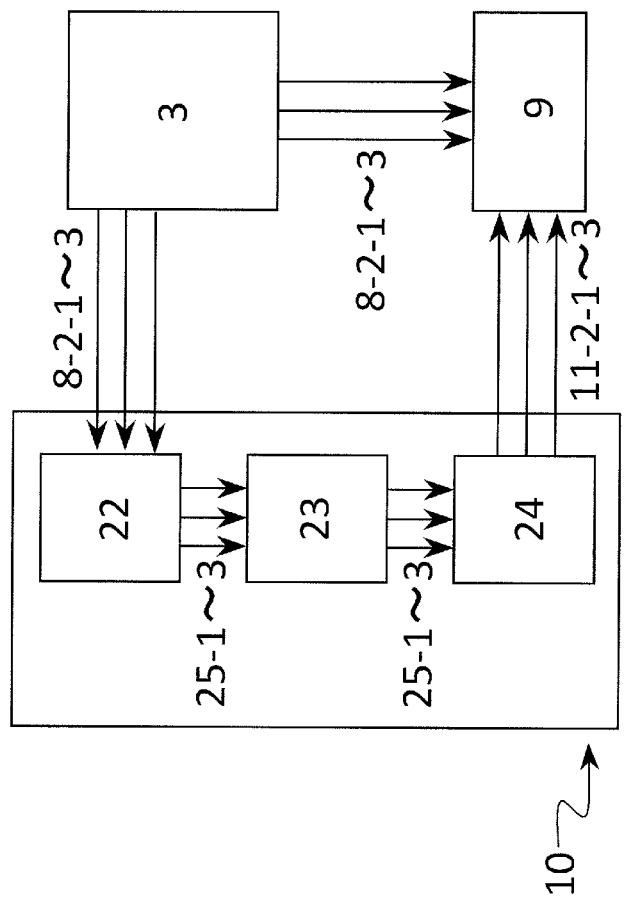
FIG. 15 is a schematic diagram showing a configuration of embodiment 2 of an image capturing device and an image capturing method of the present invention.

FIG. 15 shows a second embodiment of an image capturing device and image capturing method according to the present invention. Furthermore, in FIG. 15, parts other than the color setting part 3, the image storing part 10, and the displaying part 9 are abbreviated. As is shown in FIG. 15, the image storing part 10 is further arranged with an A/D (Analog Digital) converter 22, an image memory 23 and a D/A (Digital Analog) converter 24.

Here, the color setting part 3 sequentially sends first to third image data 8-2-1 to 8-2-3 set with color data for each one field to the displaying part 9 and the A/D converter 22 which forms the image storing part 10. The A/D converter 22 converts the first to the third image data 8-2-1 to 8-2-3 to digital data, and sequentially sends the first to the third digital image data 25-1 to 25-3 to the image memory 23. The image memory 23 stores the first to third digital image data 25-1 to 25-3.

Next, the image memory 23 sends the first to the third digital image data 25-1 to 25-3 to the D/A converter 24. The D/A converter 24 converts the first to the third digital image data 25-1 to 25-3 to analog signals and sends the first to the third image data 11-2-1 to 11-2-3 stored in the image storing part and set with color data to the displaying part 9.

Here, the displaying part 9 colors the first, the second, and the third images with the first, the second, and the third colors respectively using the first image data 11-2-1, the second image data 11-2-2, and the third image data 8-2-3 and displays the images simultaneously.

Next, the displaying part 9 colors the second, the third, and the first images with the second, the third, and the first colors respectively using the second image data 11-2-2, third image data 11-2-3, and the first image data 8-2-1 and displays the images simultaneously.

Next, the displaying part 9 colors the third, the first, and the second images with the third, the first, and the second colors respectively using the third image data 11-2-3, the first image data 11-2-1, and the second image data 8-2-2 and displays the images simultaneously. With this operation it is possible to display a color image of an object with fewer flickers.

Furthermore, similar to the first embodiment, it is possible to use "R", "G", and "B" as the first to the third colors respectively.

Furthermore, it is possible to use a camera with all pixel signal simultaneous transfer specifications such as a CCD camera as the capturing part. A CMOS camera with pixel signal sequential transfer specifications may also be used. The CCD camera may be a black and white CCD camera or a color CCD camera. The CMOS camera may be a black and white CMOS camera or a color CMOS camera. Furthermore, if a CMOS camera is arranged with all pixel signal transfer specifications, it may be arranged the same as a CCD camera may also be used. Furthermore, it is possible to arrange a CMOS camera to be with all pixel signal simultaneous transfer specifications if a memory is arranged on each pixel.

Furthermore, the image storing part may be formed using a video decoder, a video encoder, an FPGA, a PLD, a CPLD, a DSP, an SDRAM, a field memory, a frame memory, or a recursive filter, etc.

Figure 16:
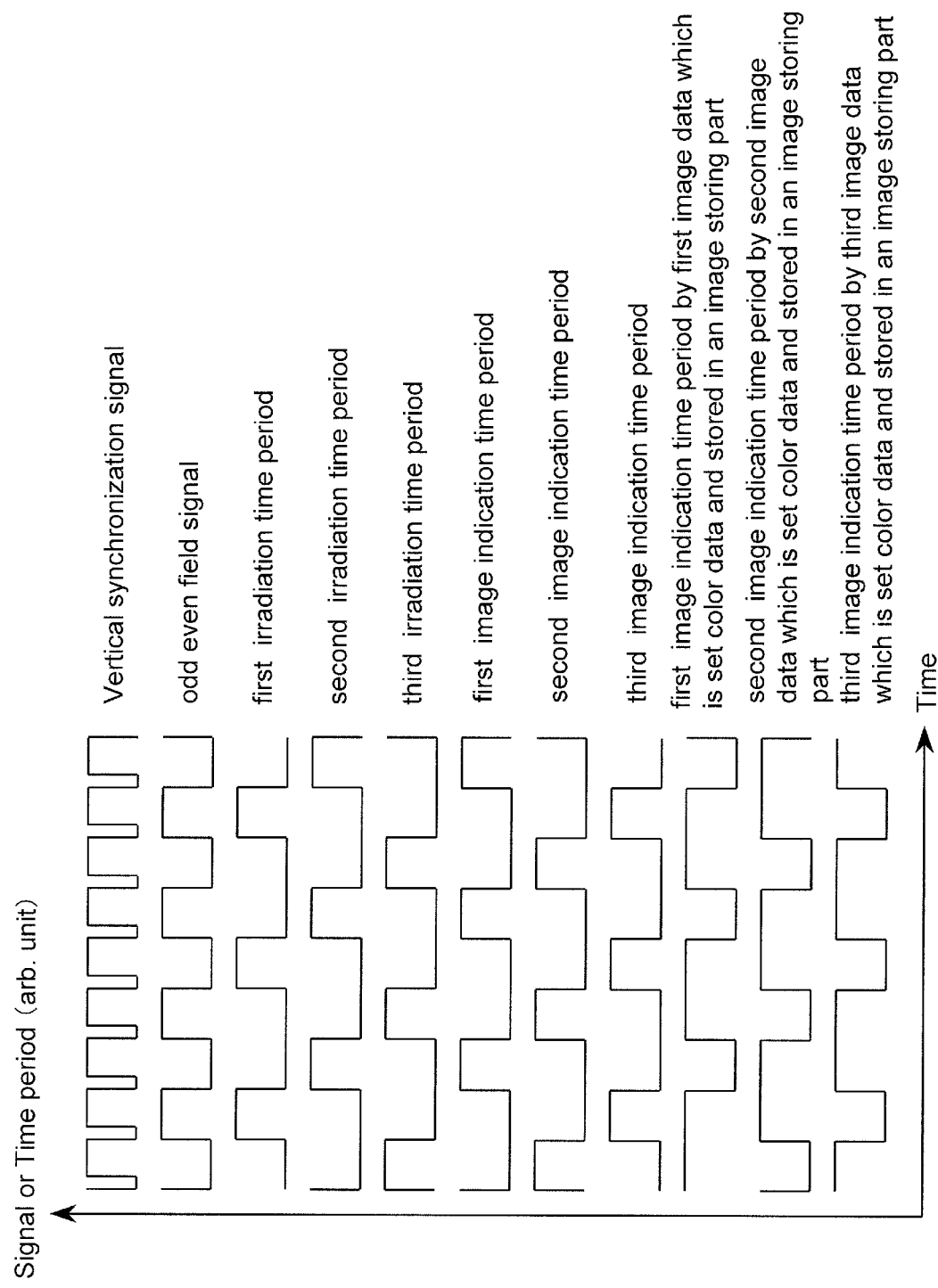
FIG. 16 is a schematic diagram showing a timing chart in embodiment 2 of an image capturing device and a method of the present invention.

FIG. 16 shows a timing chart of the second embodiment of an image capturing device and an image capturing method according to the present invention. Furthermore, FIG. 16 is an example in the case where a camera having all pixel signal simultaneous transfer specifications such as a CCD camera is used. In FIG. 16, a vertical synchronization signal, an odd/even field signal, a first irradiation time period, a second irradiation time period, a third irradiation time period, a first image indication time period, a second image indication time period, a third image indication time period, a first image indication time period by first image data which is set color data and stored in an image storing part, a second image indication time period by second image data which is set color data and stored in an image storing part, and third image indication time period by third image data which is set color data and stored in an image storing part, are shown in order from the top.

As is shown in FIG. 16, for example, the first image via first image data which is set color data and stored in an image storing part, a second image via second image data which is set color data and stored in an image storing part, and a third image via third image data set with color data are colored with the first, the second, and the third colors respectively and displayed simultaneously. With this operation, it is possible to display an infrared image of an object with fewer flickers.

Figure 17:
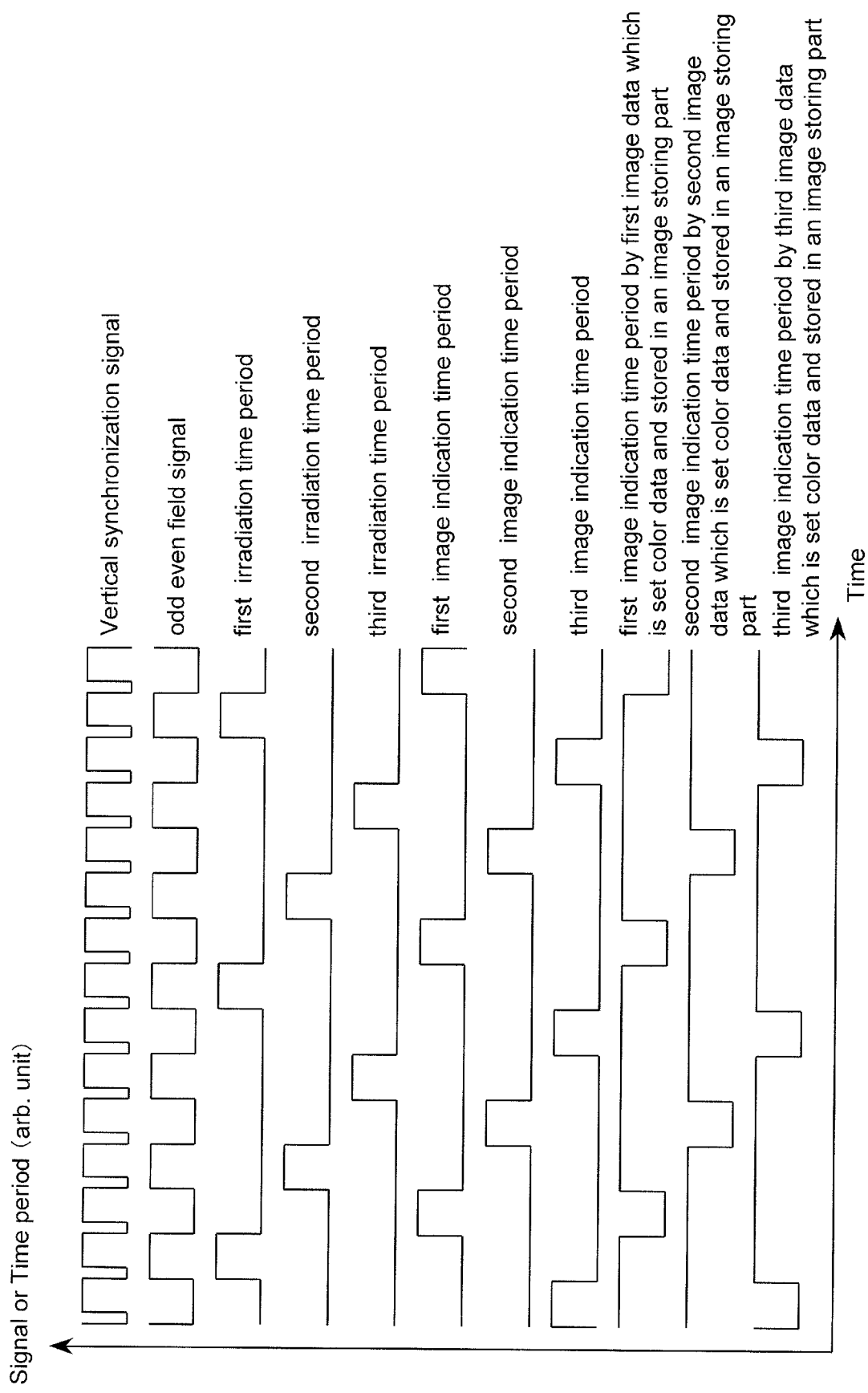
FIG. 17 is a schematic diagram showing a timing chart in embodiment 2 of an image capturing device and a method of the present invention.

Furthermore, FIG. 17 shows a timing chart of the second embodiment of an image capturing device and an image capturing method according to the present invention in the case where a camera having pixel signal sequential transfer specifications such as a CMOS camera is used. In FIG. 17, a vertical synchronization signal, an odd/even field signal, a first irradiation time period, a second irradiation time period, a third irradiation time period, a first image indication time period, a second image indication time period, a third image indication time period, a first image indication time period by first image data which is set color data and stored in an image storing part, a second image indication time period by second image data which is set color data and stored in an image storing part, and third image indication time period by third image data which is set color data and stored in an image storing part, are shown in order from the top. Similarly, with the operations shown in FIG. 17 it is possible to display an infrared image of an object with fewer flickers.

(Third Embodiment)

Figure 18:
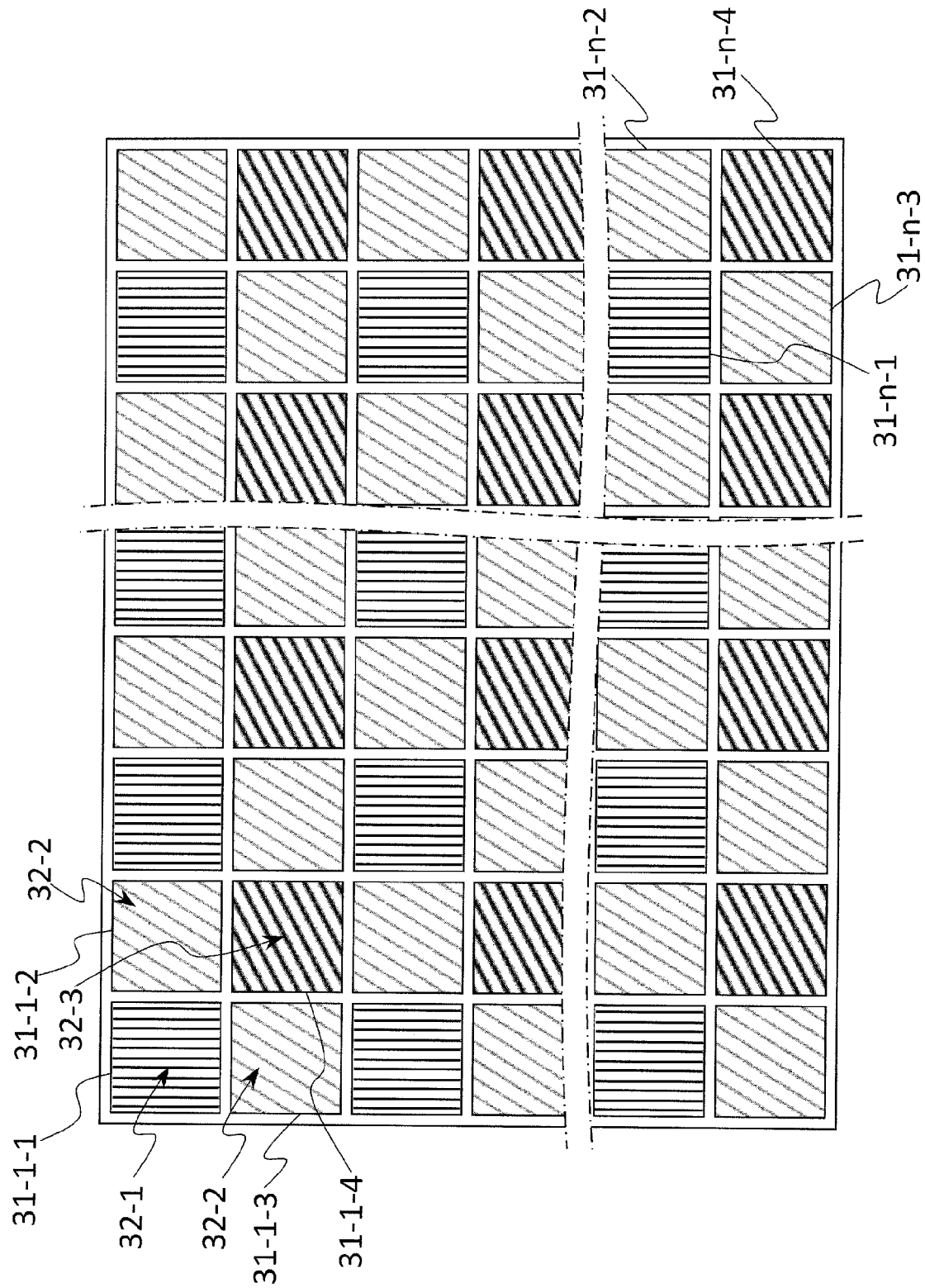
FIG. 18 is a schematic diagram showing a configuration of embodiment 3 of an image capturing device and an image capturing method of the present invention.

FIG. 18 shows a third embodiment of an image capturing device and image capturing method according to the present invention. As is shown in FIG. 18, separating parts 31-1 to 32-3 are attached on each of pixels 31-1-1 to 31-1-4 to pixels 31-$n$-1 to 31-$n$-4 of a capturing part. Here, "n" is a positive integer.

In FIG. 18, a light beam from an object is formed into an image on a capture screen comprised of a plurality of pixels, for example, in order to obtain an image of an object by separating into a plurality of light beams as shown in FIG. 9, a first separating part 32-1 allows a first light beam including an "R wavelength region" and a first infrared beam to penetrate, a second separating part 32-2 allows a second light beam including a "G wavelength region" and a second infrared beam to penetrate, and a third separating part 32-3 allows a third light beam including a "B wavelength region" and a third infrared beam to penetrate. In addition, the first image captured using the pixels 31-1-1 to 31-$n$-1 is colored using "R", the second image captured using the pixels 31-1-2 to 31-$n$-2 is colored using "G" and the third image captured using the pixels 31-1-4 to 31-$n$-4 is colored using "B" and the images are displayed. In this way, it is possible to obtain a color image of an object.

Furthermore, in FIG. 18, a light beam from an object is formed into an image on pixels, for example, in order to obtain an image of an object by separating into light beams as shown in FIG. 10 or FIG. 11, a first separating part 32-1 allows a first light beam including an "R wavelength region" and a first infrared beam to penetrate, a second separating part 32-2 allows a second light beam including a "G wavelength region" and a third infrared beam to penetrate, and a third separating part 32-3 allows a third light beam including a "B wavelength region" and a second infrared beam to penetrate. In addition, the first image captured using the pixels 31-1-1 to 31-$n$-1 is colored using "R", the second image captured using the pixels 31-1-2 to 31-$n$-2 and pixels 31-1-3 to 31-$n$-3 is colored using "G" and the third image captured using the pixels 31-1-4 to 31-$n$-4 is colored using "B" and the images are displayed. In this way, it is possible to obtain a color image of an object.

Furthermore, there are many combinations of this type and any capturing is possible using combinations other than those described above.

Furthermore, for example, it is possible to capture a color image of an object by not attaching separating parts to the pixels 31-1-3 to 31-$n$-3 or by attaching parts which allow white lights to penetrate. Furthermore, there are many combinations of this type and any capturing is possible using combinations other than those described above.

(Fourth Embodiment)

Figure 19:
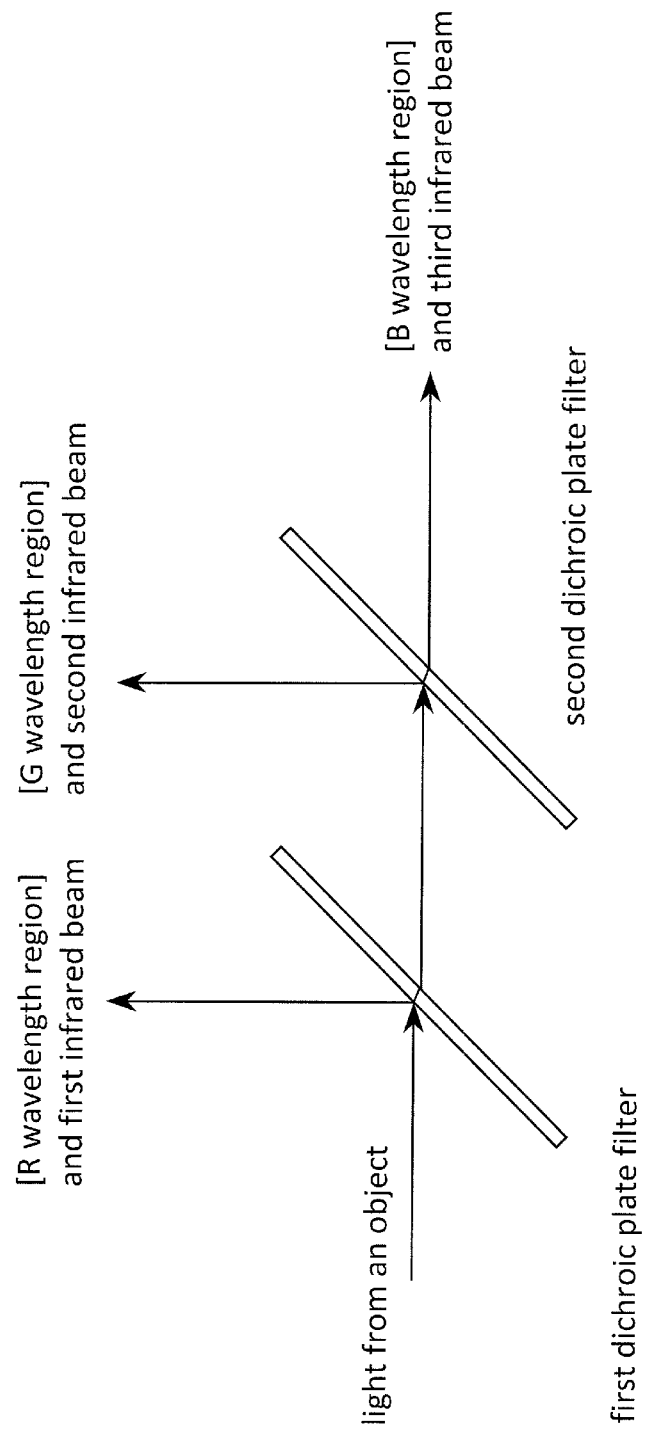
FIG. 19 is a schematic diagram showing a configuration of embodiment 4 of an image capturing device and an image capturing method of the present invention.

FIG. 19 shows a fourth embodiment of an image capturing device and an image capturing method according to the present invention. As is shown in FIG. 19, a separating part is arranged with two dichroic plate filters. In order to obtain an image of an object, for example, by separating a light beam from an object into a plurality of light beams as is shown in FIG. 9, a light beam from an object is made to be incident into a first dichroic plate filter and the first dichroic plate filter reflects a first light beam including an "R wavelength region" and a first infrared beam, and colors the first image captured using "R". In addition, the light beam which penetrates is made to be incident into a second dichroic plate filter and the second dichroic plate filter reflects a second light beam including a "G wavelength region" and a second infrared beam, and colors the second image captured using "G". In addition, a third image captured from a third light beam which includes a "B wavelength region" and a third infrared beam which penetrates is colored using "B". It is possible to obtain a color image of an object by coloring and displaying in this way.

Furthermore, there are many combinations of this type and any capturing is possible using combinations other than those described above.

Figure 20:
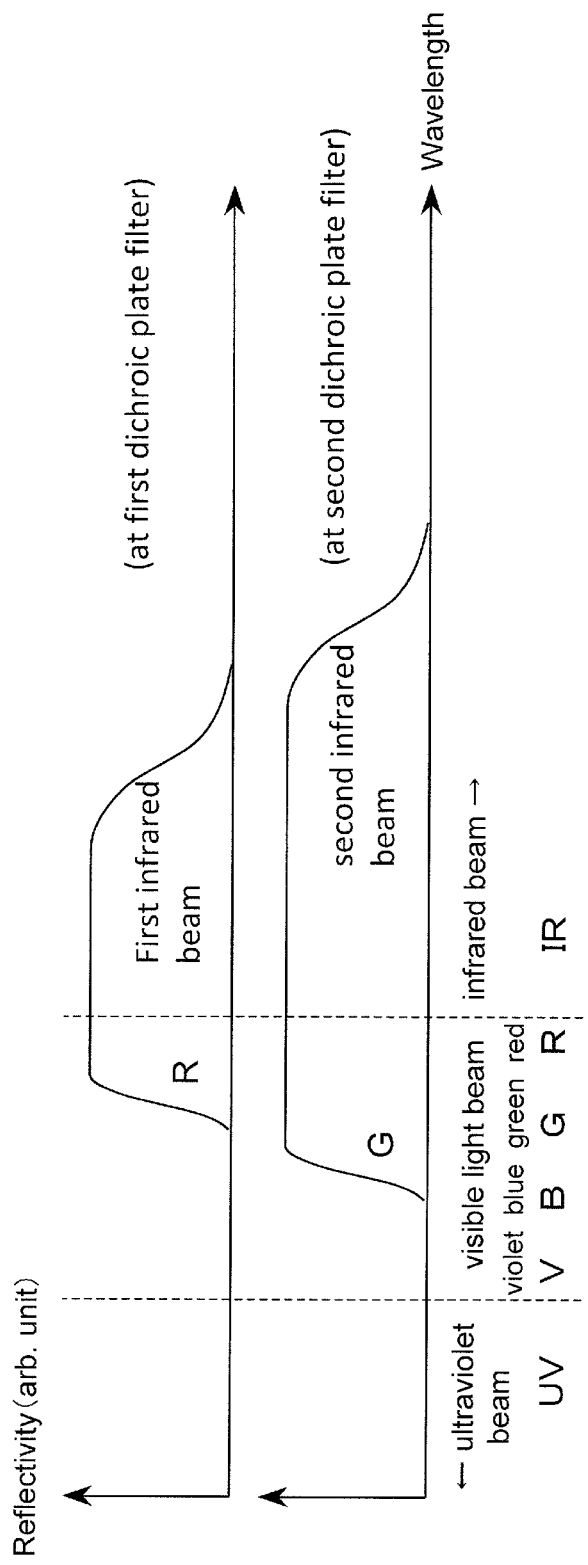
FIG. 20 is an example diagram showing reflection properties of a first and a second dichroic plate filters of embodiment 4 of an image capturing device and an image capturing method of the present invention.

FIG. 20 shows an example of the reflection properties of a first and a second dichroic plate filter of the fourth embodiment of an image capturing device and an image capturing method according to the present invention. As is shown in FIG. 20, the second dichroic plate filter as well as the first dichroic plate filter may have a consecutive infrared region and visible light region of a reflection wavelength band.

This is because since the first light beam which includes the "R wavelength region" and the first infrared beam is reflected by the first dichroic plate filter, the first light beam which includes the "R wavelength region" and the first infrared beam is not included in the second light beam which is reflected by the second dichroic plate filter. In addition, the first light beam which includes the "R wavelength region" and the first infrared beam and the second light beam which includes the "G wavelength region" and the second infrared beam are not included in the third light beam which penetrates the second dichroic plate filter.

Furthermore, it is possible to place capturing parts at locations reached by the first to the third light beams.

Furthermore, if a glass material such as BK7 is used as the dichroic plate filter, hardly any ultraviolet beam penetrates. In addition, an ultraviolet beam cut filter may be arranged on the incident entrance side of the first dichroic plate filter, and an ultraviolet beam cut filter, a color filter or a trimming filter, etc. may be arranged on the incident entrance of the capturing parts.

(Fifth Embodiment)

Figure 21:
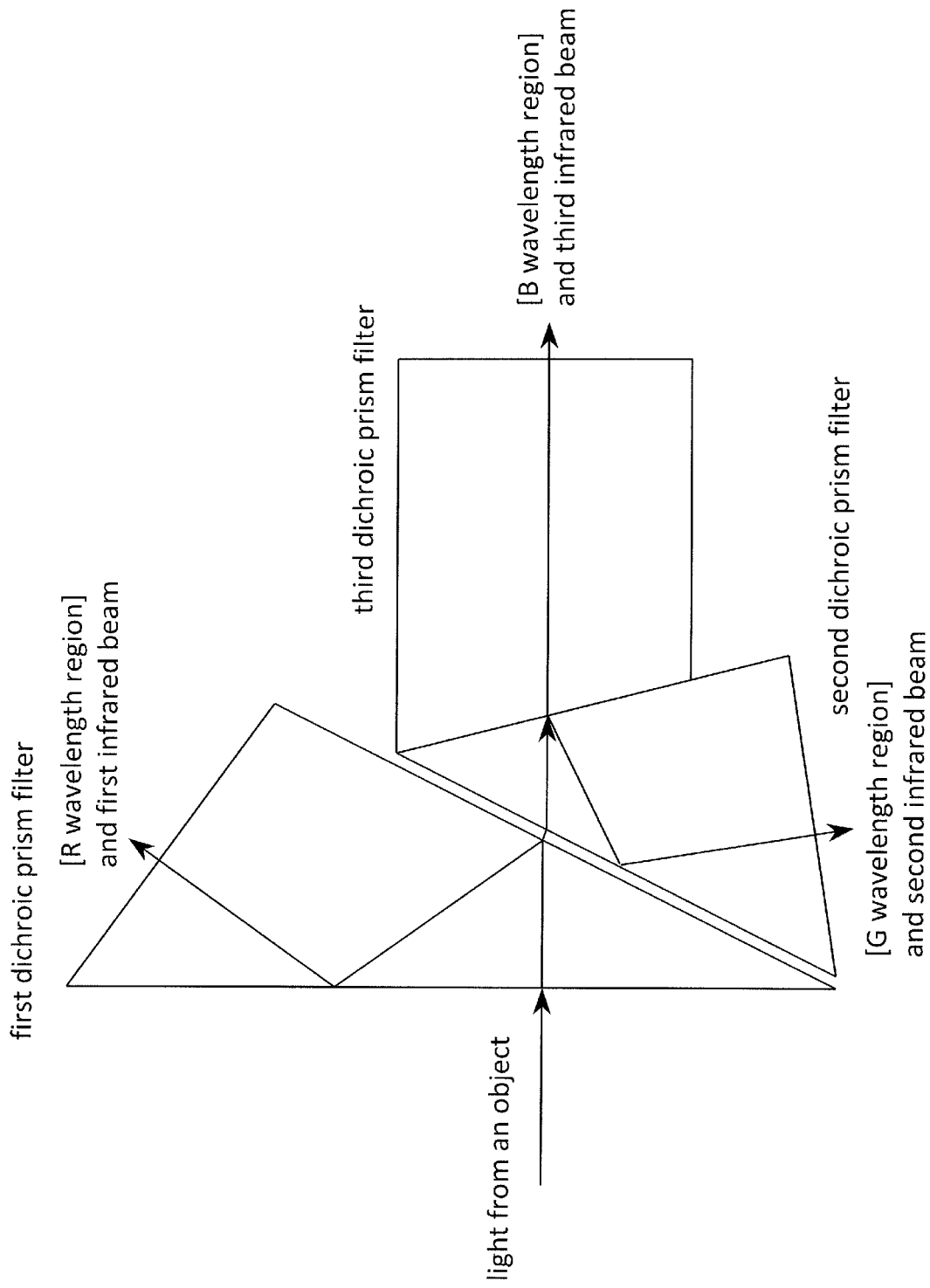
FIG. 21 is a schematic diagram showing a configuration of embodiment 5 of an image capturing device and an image capturing method of the present invention.

FIG. 21 shows a fifth embodiment of an image capturing device and an image capturing method according to the present invention. As is shown in FIG. 21, a compound prism arranged with three dichroic prism filters is used as a separating part.

In FIG. 21, in order to obtain an image of an object, for example, by separating a light beam from an object into light beams as is shown in FIG. 9, a light beam from an object is made to be incident into a first dichroic prism filter, a first light beam including an "R wavelength region" and a first infrared beam is twice reflected by inner surfaces of the first dichroic prism filter and emitted externally, and a captured first image is colored using "R". In addition, a light beam which penetrates is made to be incident into a second dichroic prism filter, a second light beam including a "G wavelength region" and a second infrared beam is twice reflected by inner surfaces of the second dichroic prism filter and emitted externally, and a captured second image is colored using "G". In addition, a light beam which penetrates is made to be incident into a third dichroic prism filter, a third light beam including a "B wavelength region" and a third infrared beam is not reflected by an inner surface of the third dichroic prism filter and emitted externally, and a captured third image is colored using "B". It is possible to obtain a color image of an object by coloring in this way and by displaying.

Furthermore, it is possible to place capturing parts at locations reached by the first to the third light beams.

Furthermore, there are many combinations of this type and any capturing is possible using combinations other than those described above.

Furthermore, if a glass material such as BK7 is used as the dichroic prism filter, hardly any ultraviolet beam penetrates. In addition, a color filter or a trimming filter may be arranged on the exit side of each dichroic prism filter or the entrance side of each capturing part.

(Sixth Embodiment)

FIG. 22 shows a sixth embodiment of an image capturing device and an image capturing method according to the present invention. As is shown in FIG. 22, infrared LED groups 51-1 to 51-3 comprised individually from a first to a third infrared LEDs 50-1 to 50-3 which emit a first to a third infrared beams are arranged in a circle on the surface of a case 53. A CCD camera 52 attached with a lens is arranged at the center part. Furthermore, a color setting part and a control processing part are arranged within the case 53.

Here, the first to the third infrared beams are irradiated to an object from the infrared LED groups 51-1 to 51-3, and the CCD camera 52 captures an image of the object from the first to the third infrared beams reflected from the object.

Furthermore, the embodiment in FIG. 22 is an example whereby infrared LEDs 50-1 to 50-3 are each collected into three infrared LED groups 51-1 to 51-3 respectively and arranged at three sections. The infrared LEDs 50-1 to 50-3 may be mixed and arranged, alternatively, arranged randomly.

(Seventh Embodiment)

Figure 23:
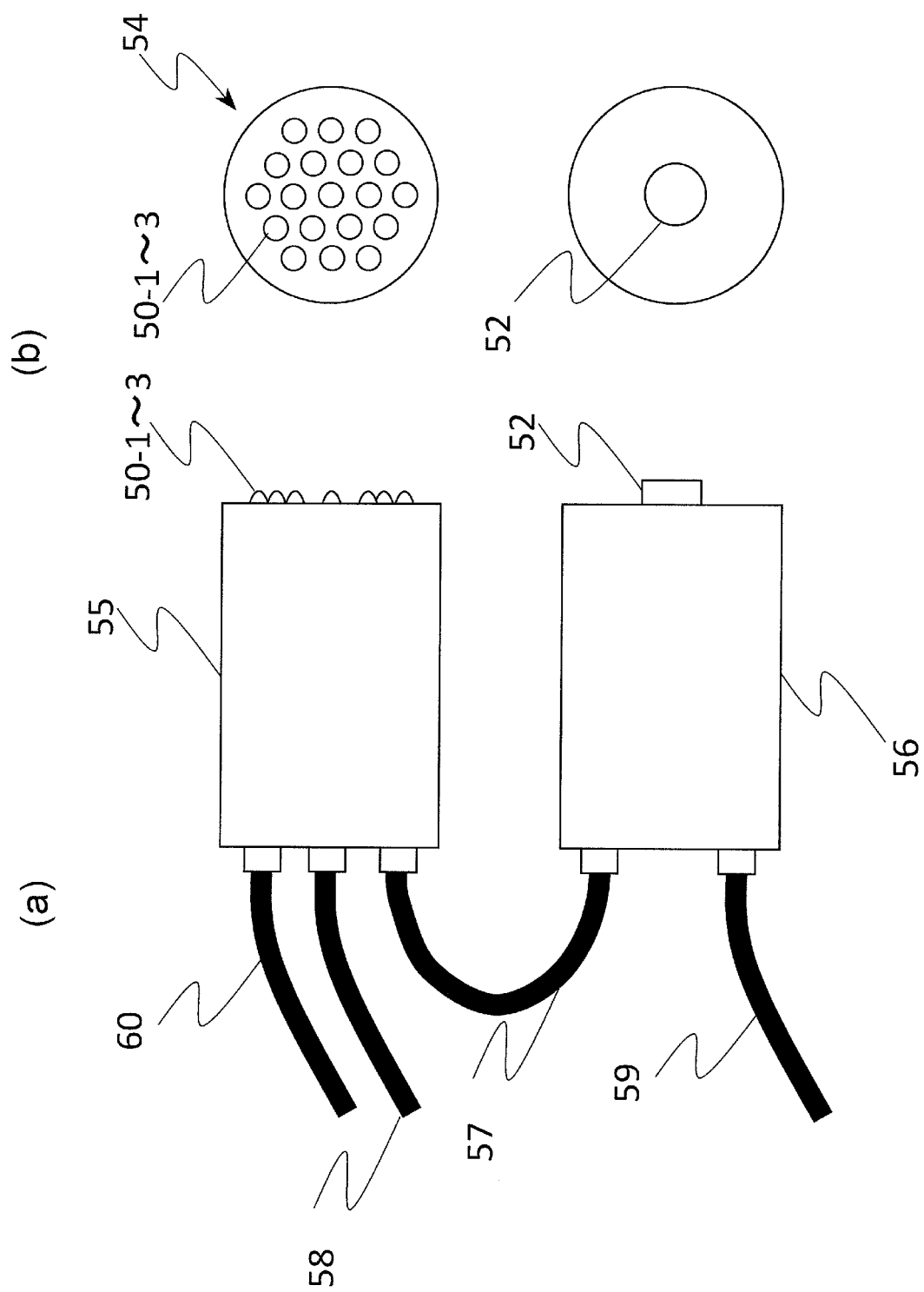
FIG. 23 is a schematic diagram showing a configuration of embodiment 7 of an image capturing device and an image capturing method of the present invention.

FIG. 23 shows a seventh embodiment of an image capturing device and an image capturing method according to the present invention. As is shown in FIG. 23, an infrared LED group 54 comprised from a first to a third infrared LEDs 50-1 to 50-3 which emit a first to third infrared beams is arranged in a circle on the surface of a case 55, and a CCD camera 52 attached with a lens is enclosed by a separate case 56. In addition, a color setting part and a control processing part are arranged within the case 55. In addition, if an RGD encoder is also installed, it is possible to output a reconstructed NTSC video signal.

Here, infrared beams are irradiated to an object from the infrared LED group 54 and the CCD camera 52 captures an image of the object from a first to a third infrared beams reflected from the object. Furthermore, the CCD camera 52 does not have to be arranged in a case.

Here, an NTSC video signal is sent to the inside of the case 55 via a cable 57 from the CCD camera 52, an operation is performed based on the NTSC signal received by the color setting part and the control processing part within the case 55, an RGB video signal or a reconstructed NTSC video signal is output from a cable 58 and sent to a monitor. Furthermore, power is supplied via cables 59 and 60 respectively.

(Eighth Embodiment)

Figure 24:
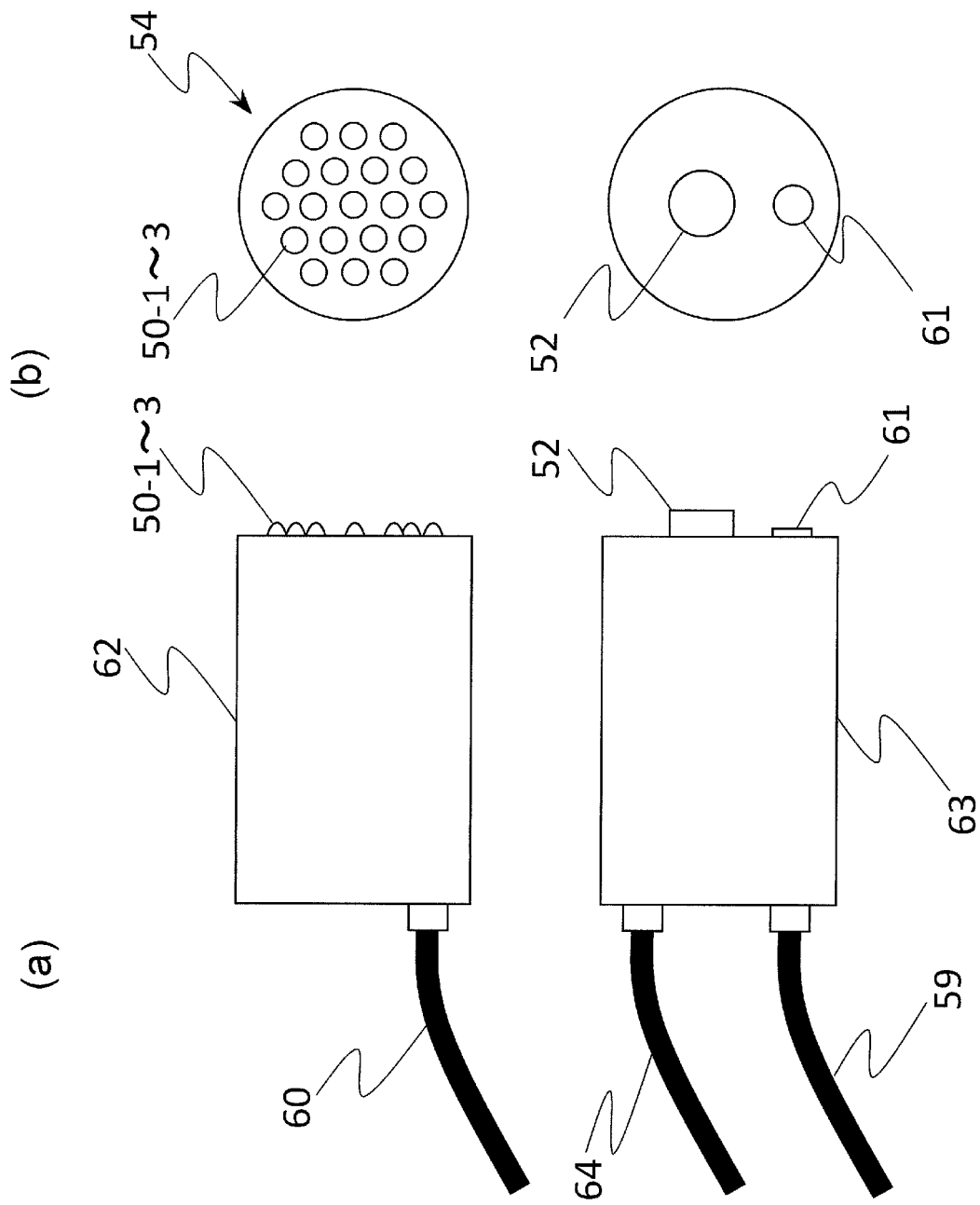
FIG. 24 is a schematic diagram showing a configuration of embodiment 8 of an image capturing device and an image capturing method of the present invention.

FIG. 24 shows an eighth embodiment of an image capturing device and an image capturing method according to the present invention. As is shown in FIG. 24, an infrared LED group 54 is arranged in a circle on a surface of a case 62 and a CCD camera 52 attached with a lens is enclosed by a separate case 63.

Here, infrared beams are irradiated to an object from the infrared LED group 52 and the CCD camera 52 captures an image of the object from a first to a third infrared beams reflected from the object. Furthermore, although the control processing part is arranged within the case 62, an infrared beam sensor 61 receives an irradiating operation start signal which overlaps an infrared beam emitted from the infrared LED group 54, the signal is sent to a separate control processing part arranged within the case 63, and a capturing operation begins. Furthermore, the color setting part is enclosed within the case 63. In addition, if an RGD encoder is also installed within the case 63, it is possible to output a reconstructed NTSC video signal from a cable 64. An RGB video signal may also be output. Furthermore, power is supplied via cables 59 and 60 respectively.

(Ninth Embodiment)

Figure 25:
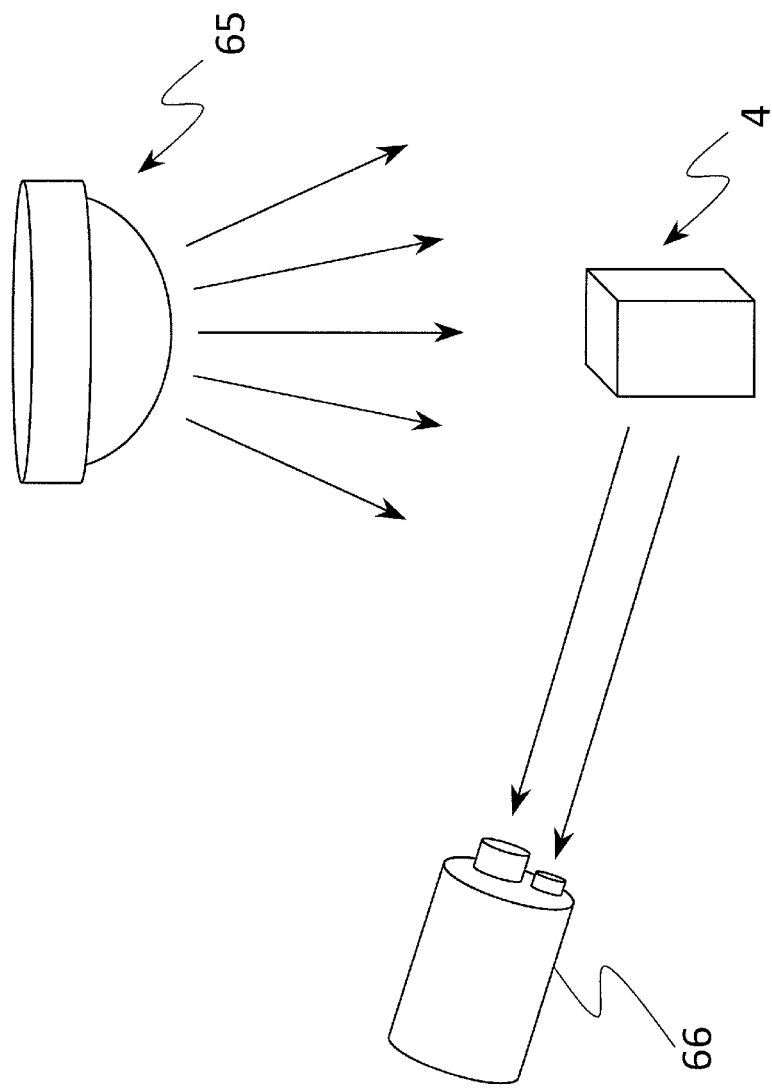
FIG. 25 is a schematic diagram showing a configuration of embodiment 9 of an image capturing device and an image capturing method of the present invention.

FIG. 25 shows a ninth embodiment of an image capturing device and an image capturing method according to the present invention. A first to a third infrared beams are irradiated to an object from a case 65 which encloses a control processing part and an irradiating part and which is arranged on an upper part such as a ceiling, and an infrared sensor, a control processing part, a capturing part, and a color setting part arranged within a case 66 perform predetermined operations using a first to a third infrared beams reflected from the object 4. Furthermore, an infrared emitting exit side of the case 65 may be formed by a component which allows an infrared beam to penetrate.

(Experiment 1)

Figure 26:
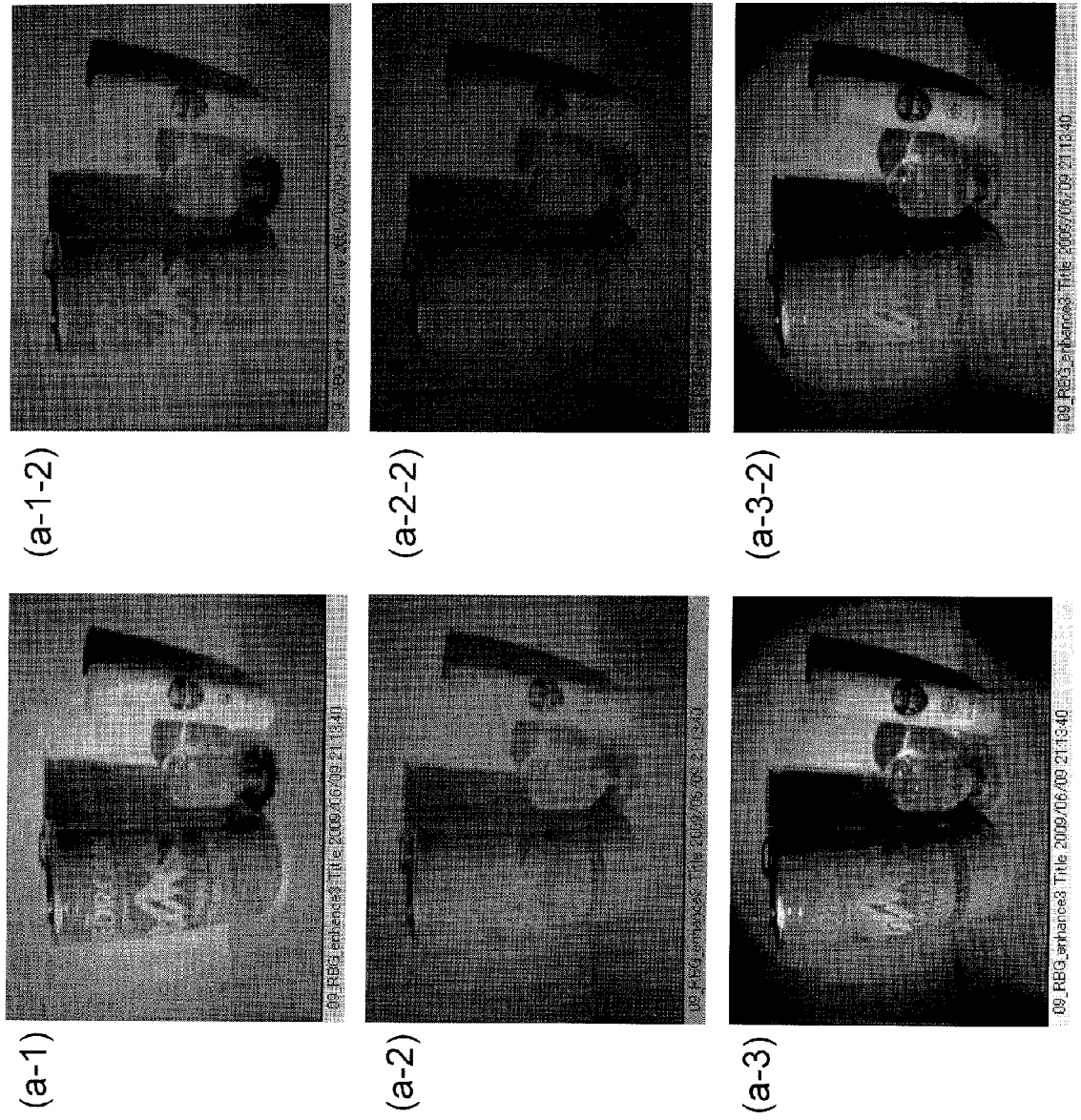
FIG. 26 shows photographs by example experiment 1 according to one embodiment of the present invention.

FIG. 26 shows an a first experiment which explains coloring and additive color mixing of an image capturing device and an image capturing method according to the present invention. Here, FIG. 26 (a-1) is a first image captured by irradiating a first infrared beam, FIG. 26 (a-2) is a second image captured by irradiating a second infrared beam, and FIG. 26 (a-3) is a third image captured by irradiating a third infrared beam. Each image shows the intensity of a reflected infrared beam and is shown by a grey scale. The first image, the second image, and the third image are images of the same object, however, because the infrared reflection properties vary according to wavelength, the images are different.

Furthermore, the first infrared beam is generated by an LED which emits a center wavelength of 780 nm and an average power of about 5.7 mW. In addition, the second infrared beam is generated by an LED which emits a center wavelength of 870 nm and an average power of about 6.1 mW. In addition, the third infrared beam is generated by an LED which emits a center wavelength of 940 nm and an average power of about 4.5 mW. Furthermore, a full width at half-maximum of each wavelength intensity distribution is about 50 nm. In addition, the distance between an irradiating part and an object is about 30 cm and the distance between a capturing part and the object is about 20 cm. The object illuminance in the visible light region is almost 0 Lux.

In addition, FIG. 26 (a-1-2) is a first image displayed by coloring FIG. 26 (a-1) with "R", FIG. 26 (a-2-2) is a second image displayed by coloring FIG. 26 (a-2) with "B", and FIG. 26 (a-3-2) is a third image displayed by coloring FIG. 26 (a-3) with "G." Furthermore, in FIG. 26, an intensity of each reflected infrared beam is shown by a mono-color scale according to an luminance of each single color.

FIG. 27 (b-1) shows a color image whereby FIG. 26 (a-1-2), FIG. 26 (a-2-2) and FIG. 26 (a-3-2) are additive color mixed. FIG. 27 (b-1) is an infrared color image having single colors "R", "G", and "B."

In addition, FIG. 27 (b-2) is a grayscale image formed by adding the luminance of each location corresponding to the images in FIG. 26 (a-1), FIG. 26 (a-2), and FIG. 26 (a-3). That is, corresponding to an image by conventional infrared beam capturing.

In addition, FIG. 27 (b-3) shows a conventional pseudo-color scale of an image in FIG. 27 (b-2).

In addition, FIG. 27 (b-4) shows a color image captured by a conventional color CCD camera under illumination of about 450 Lux.

As is shown in FIG. 27, FIG. 27 (b-1) compared to each Fig. in FIG. 26 or to FIG. 27 (b-2) and FIG. 27 (b-3) has more information and is more vivid, and the apparent coloration is closest to FIG. 27 (b-4).

Figure 28:
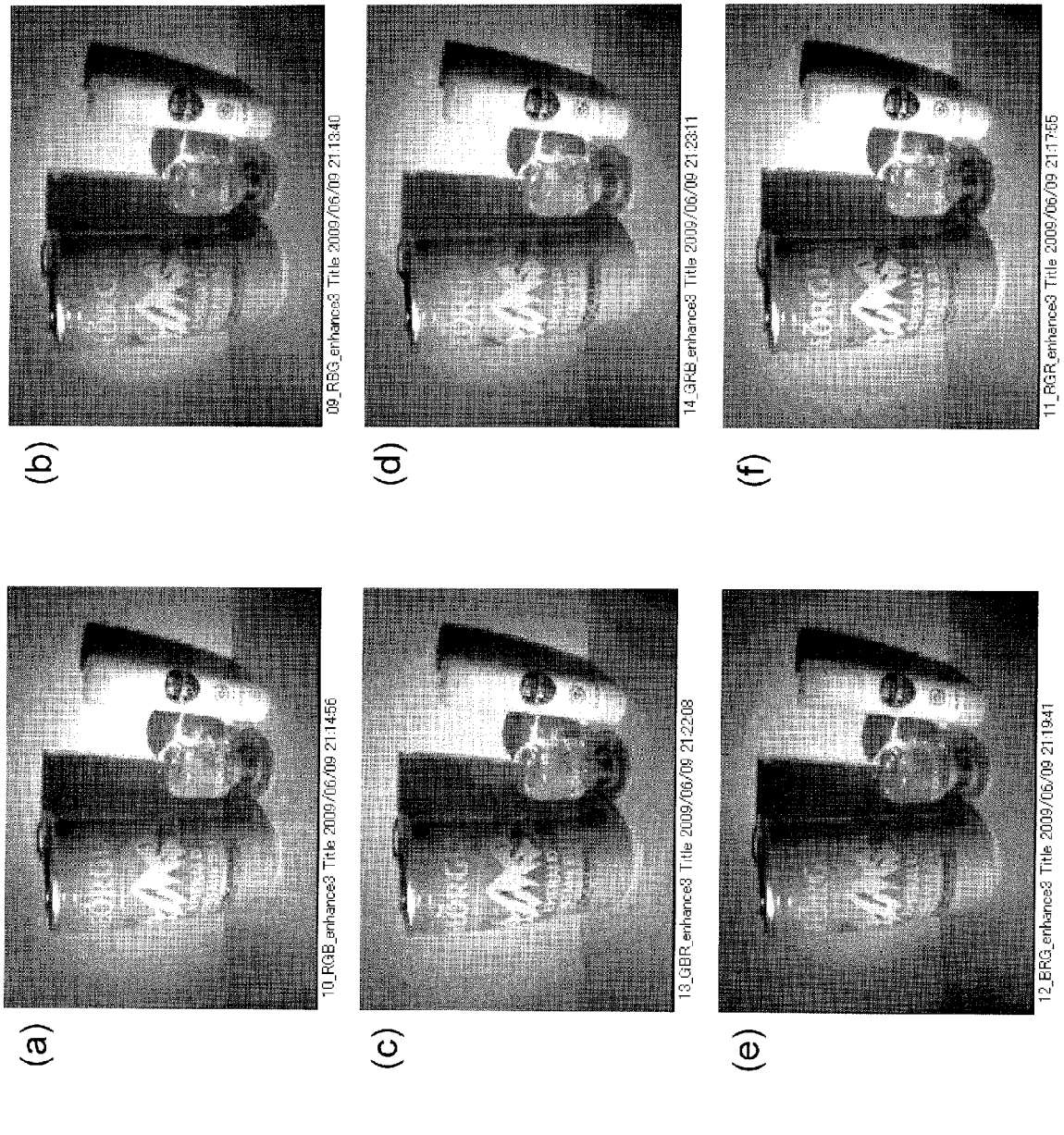
FIG. 28 shows photographs by example experiment 1 according to one embodiment of the present invention.

FIG. 28 shows a first experiment in the case where coloring is changed in various ways. Here, FIG. 28 (a) shows an infrared color image formed by additive mixture color whereby a first to a third image are colored in the order "R", "G", and "B". FIG. 28 (b) shows an infrared color image formed by additive mixture color whereby a first to third image are colored in the order "R", "B", "G". FIG. 28 (c) shows an infrared color image formed by additive mixture color whereby a first to a third image are colored in the order "G", "B", and "R". FIG. 28 (d) shows an infrared color image formed by additive mixture color whereby a first to a third image are colored in the order "G", "R", and "B", FIG. 28 (e) shows an infrared color image formed by additive mixture color whereby a first to a third image are colored in the order "B", "R", and "G". FIG. 28 (f) shows an infrared color image formed by additive mixture color whereby a first to third image are colored in the order "B", "G", and "R". Here, it can be seen that FIG. 28 (a) or FIG. 28 (b) is close in color to FIG. 27 (b-4).

Furthermore, each image in FIG. 27 (b-1) and FIG. 28 can be displayed on a monitor as a video and can be recorded as a video with a frame rate of 30 fps. In addition, at this time, when the frame rate is substantially reduced by 10 fps using a recursive filter, it is possible to obtain a video with less flickering. It is also possible to obtain a substantial 30 fps video using a recursive filter.

In addition, when other objects were captured by an image capturing device and an image capturing method of the present invention, a tendency has been seen where the coloring condition in FIG. 27 (b-1) and FIG. 28 (b) reproduces the colors of the objects under a visible light better than the coloring condition in FIG. 28 (a).

In this case, it is possible to better reproduce skin color of a person's face and hand, etc. and it is possible to naturally reproduce black color of hair. In addition, the luster of metals can also be better reproduced.

Furthermore, when correction by color balance, hue, brightness, contrast, and adjustment of a gamma correction parameter and so on is performed, it is possible to almost reproduce a color image of an object under a visible light. In addition, it is also possible to enhance colors and display an image by image processing such as taking the difference of each image.

An additional explanation of the principles of the present invention is given below. Each material offers a particular color or spectrum. The color or the spectrum is determined by a reflectance ratio, an absorption ratio, or a transmittance ratio of the material. In terms of electronic properties of material, a reflectance ratio, an absorption ratio, or a transmittance ratio depends on interaction between an electric charge and a photon on the surface or within the material. In addition, in the case where an energy level of a fundamental absorption edge or a band-to-band transition is existent in a visible light region, because the case offers a reflectance ratio, an absorption ratio, or a transmittance ratio which changes in a visible light region, a light reflected by the material is recognized by a human as a color.

In addition, in the case of chemically synthesizing a dye which becomes a base for a paint or a pigment and which offers a particular color, an energy level of an absorption edge or a band-to-band transition increases/decreases or shifts by replacing an atom or a molecule in a base material, or an energy level of an absorption band or a band-to-band transition is added by incorporation of an impurity, and thereby it is possible to synthesize a dye which offers a desired color.

Here, for example, in the case of an optical filter comprised from a homogeneous material, a color of a light which penetrates the filter is determined by a transmittance ratio of the material, and a color of a light which is reflected by the filter is determined by a reflectance ratio of the material. On the other hand, in the case of a filter which includes fine particles in a transparent medium, because not only a light diffused at surfaces of the fine particles but also a light refracting and penetrating the fine particles are included in a transmitted light and a reflected light, the transmittance ratio and the reflectance ratio are often called a diffused transmittance ratio and a diffused reflectance ratio, respectively. In the case of a filter which includes fine particles in a non-transparent medium, a wavelength intensity distribution (color) of a light which penetrates the filter is determined by the transmittance ratio of the medium and the reflectance ratio and the diffused reflectance ratio of the fine particles.

A device wherein fine particles of a semiconductor or a metal are dispersed in a glass is a typical example of a long wavelength pass filter. For example, when CdS is mixed in a glass and a heating process is performed, average sized CdS fine particles are generated within the glass. The location of an absorption edge of the CdS fine particles changes according to the size of the fine particles due to an exciton confinement effect. Furthermore, sizes of the fine particles can be controlled by a heating process condition.

Furthermore, in the case of a paint or a pigment, a color of the paint or the pigment is determined by a reflectance ratio of a material which is coated, a reflectance ratio and a transmittance ratio of a medium which forms the paint or the pigment (because there is a reflectance from the material which is coated), and a reflectance ratio and a diffused reflectance ratio of fine particles which form the paint or the pigment.

(Experiment 2)

Figure 29:
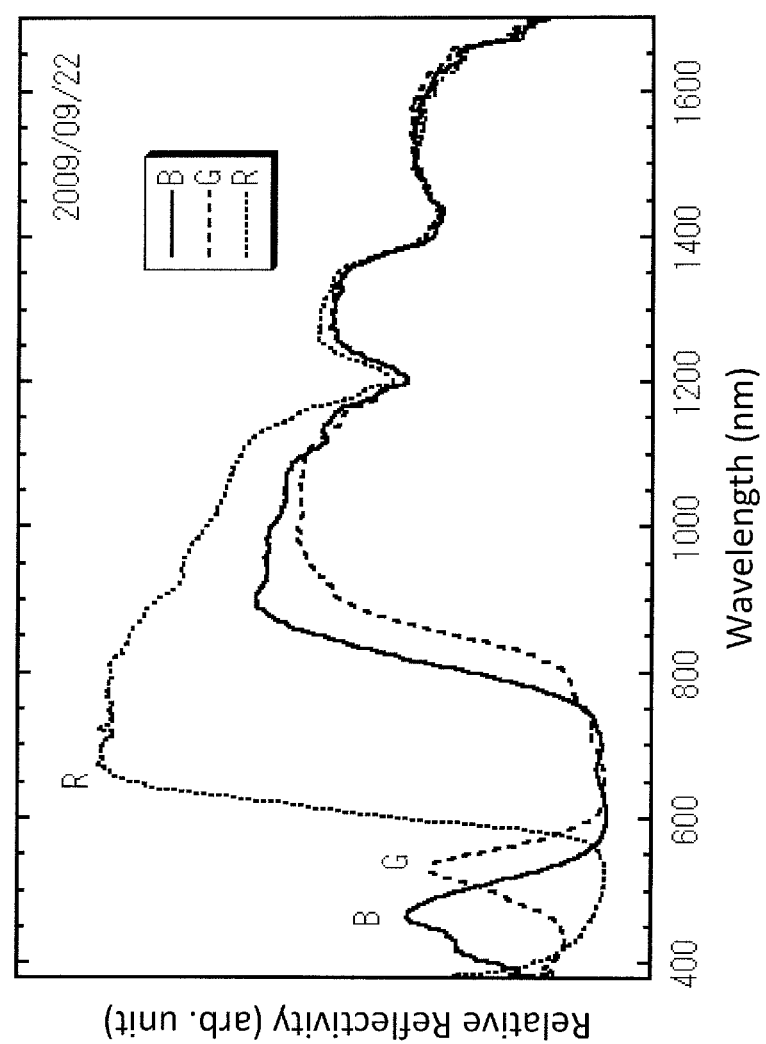
FIG. 29 shows measurement data by example experiment 2 according to one embodiment of the present invention.

FIG. 29 shows an example which includes relative reflectance ratios (relative reflectivity) of materials where each of the materials offers each color of blue "B", green "G", and red "R", respectively, comprised from the same resin substrate. As can be seen in FIG. 29, while wavelength regions are observed where each of the wavelength regions shows a large reflectance ratio corresponding to each of "B", "G", and "R", respectively in a visible light region, the structure of each wavelength region mainly corresponds to the color of each material. In addition, structures where each of the structures has a particular reflectance ratio are seen also in an infrared region.

Here, when shapes of intensity distributions of reflectance ratios of curves of "B" and "G" in a wavelength region from 375 nm to 1100 nm are compared, it can be seen that there is a relationship where a shape almost mutually shifts in parallel between the curves. This is considered to be an example which shows that "an energy level of an absorption edge or a band-to-band transition increases/decreases or shifts" described above. In addition, it can also be seen that the structures in a visible light region and an infrared beam region are linked and shift in parallel.

Figure 30:
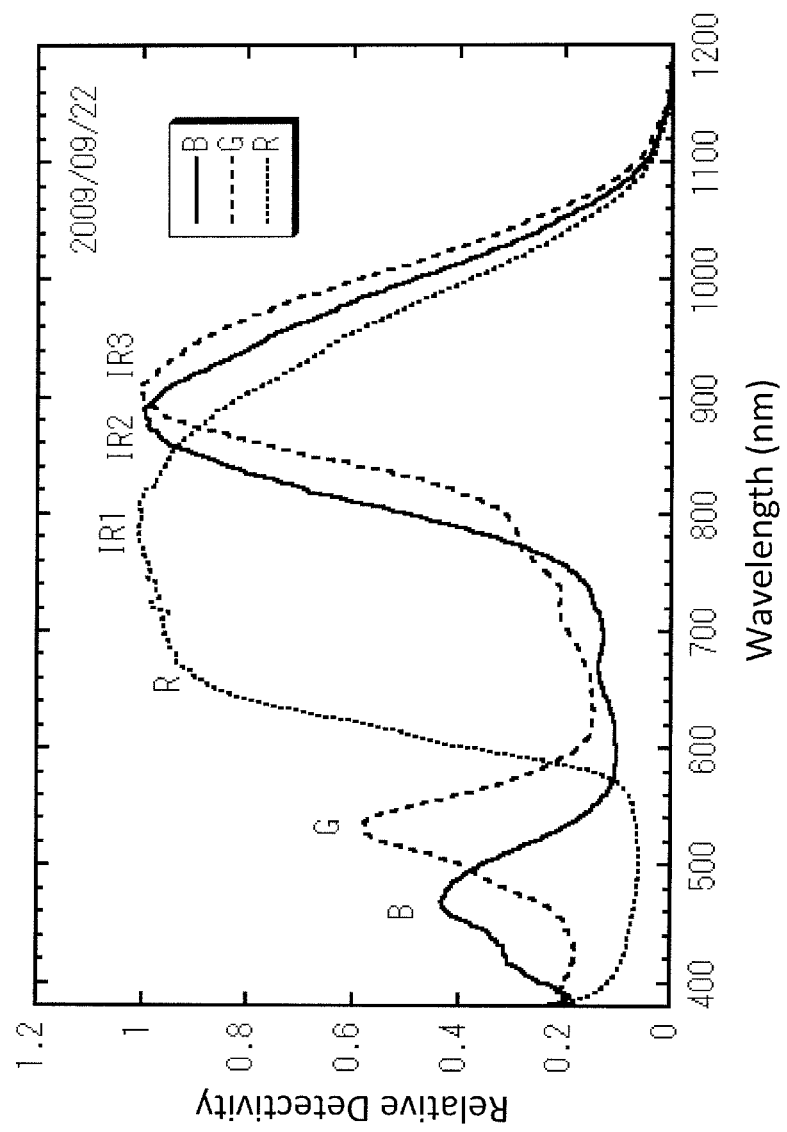
FIG. 30 shows measurement data by example experiment 2 according to one embodiment of the present invention.
Figure 33:
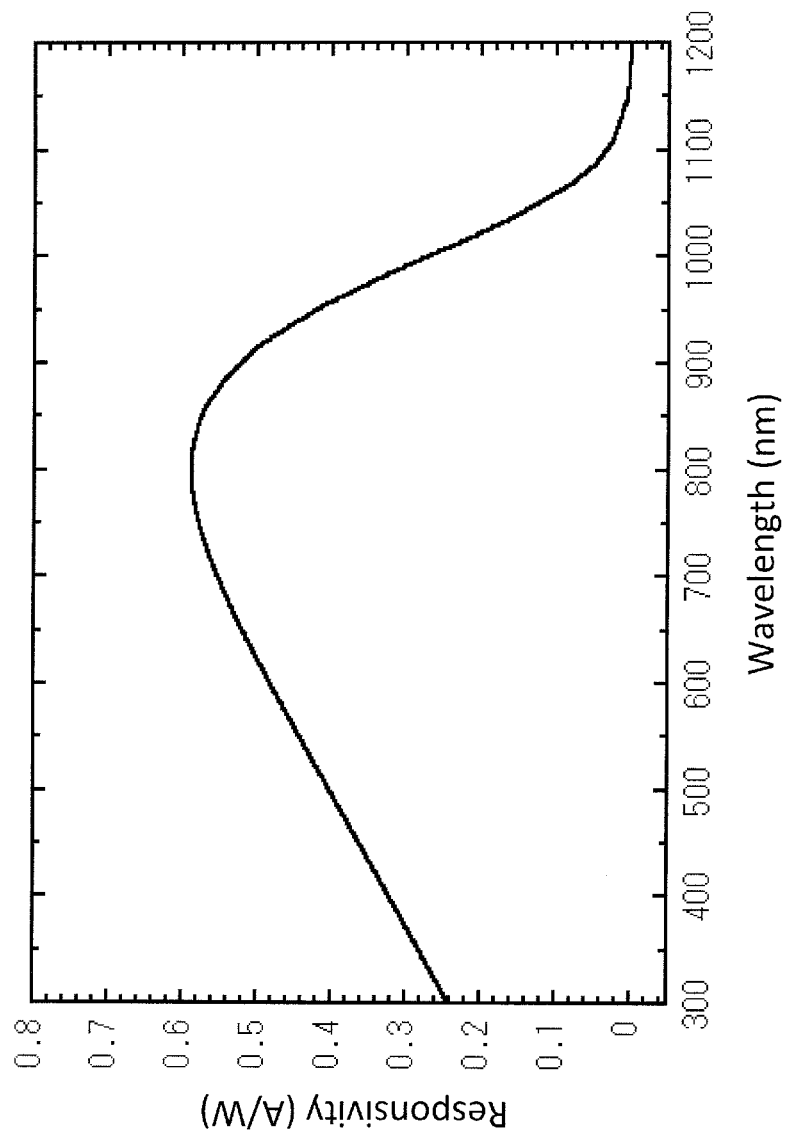
FIG. 33 is a diagram showing a responsivity of a silicon image sensor in embodiment 10 of an image capturing device and an image capturing method in one embodiment of the present invention.

FIG. 30 shows a diagram in the case where data obtained by applying data which represent an example of responsivity of a silicon light detector in FIG. 33 to data which represent each curve in FIG. 29 are normalized using each maximum value. In other words, FIG. 30 corresponds to relative detectivity whereby reflected lights, which are obtained when a white light is irradiated onto materials where each material offers blue "B", green "G", and red "R", respectively, are detected by a silicon detector, and each signal is normalized by each maximum value.

As can be seen in FIG. 30, a material which offers red "R" has a wavelength region having a high relative detectivity in [IR1], a material which offers green "G" has a wavelength region having a high relative detectivity in [IR3], and a material which offers blue "B" has a wavelength region having a high relative detectivity in [IR2].

Therefore, it is possible to predict that a material which has a wavelength region having a high relative detectivity in [IR1] offers red "R", a material which has a wavelength region having a high relative detectivity in [IR2] offers blue "B", and a material which has a wavelength region having a high relative detectivity in [IR3] offers green "G". In other words, it is possible to predict a result of a reflectance measurement in a visible light region, that is, a color offered by the material by a reflectance measurement in an infrared beam region.

In other words, in infrared lights from an object, by coloring an image obtained by capturing an infrared beam corresponding to [IR1] with "R", coloring an image obtained by capturing an infrared beam corresponding to [IR2] with "B", and coloring an image obtained by capturing an infrared beam corresponding to [IR3] with "G", it is possible to reproduce the color of a material under a visible light.

In addition, by irradiating an object with an infrared beam corresponding to [IR1] and coloring an image obtained by capturing the light reflected from the object with "R", by irradiating an object with an infrared beam corresponding to [IR2] and coloring an image obtained by capturing the light reflected from the object with "B", and by irradiating an object with an infrared beam corresponding to [IR3] and coloring an image obtained by capturing the light reflected from the object with "G", it is possible to reproduce the color of a material under a visible light.

(Experiment 3)

FIG. 31 (a) shows symbols and characters which are drawn using green, red, and blue paints on a black paper and which are captured as an object under a light by a fluorescent lamp which mainly emits a visible light, and FIG. 31 (b) shows the same object captured under almost the same conditions as FIG. 27 (b-1) and FIG. 28 (b) by an image capturing device of the present invention.

Figure 32:
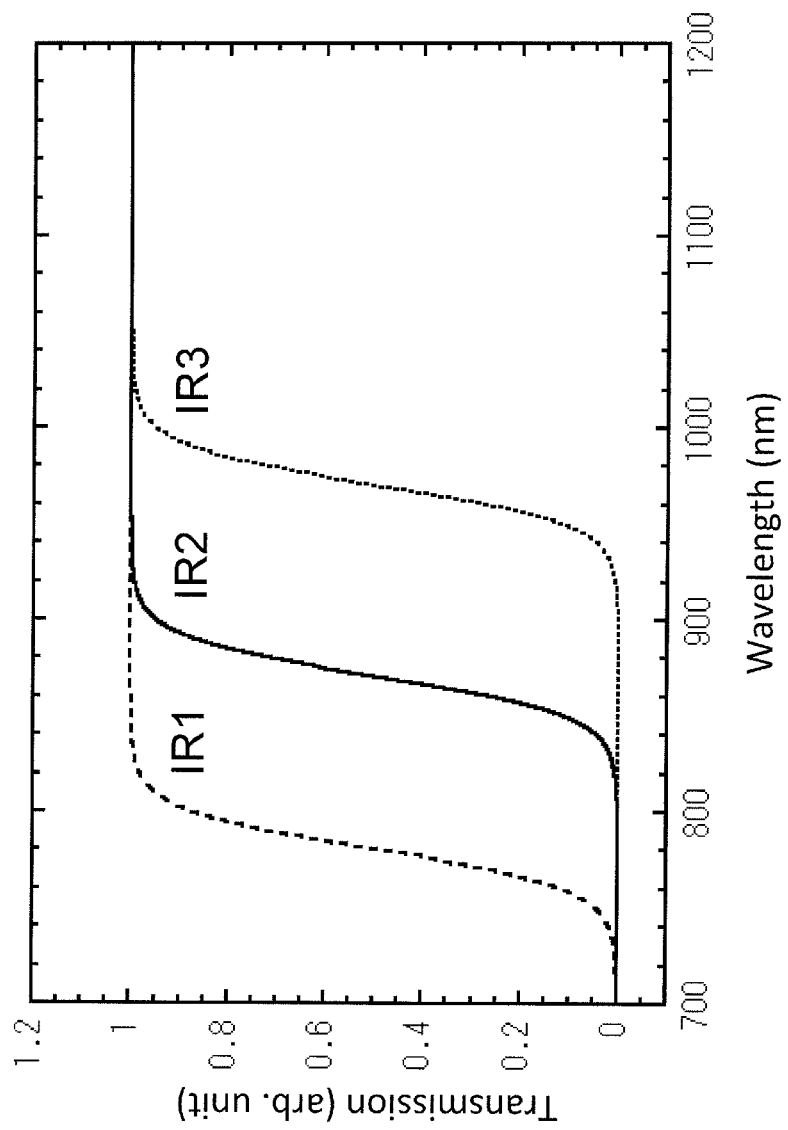
FIG. 32 is an example diagram showing filter properties in embodiment 10 of an image capturing device and an image capturing method in one embodiment of the present invention.

When FIG. 31 (a) and FIG. 32 (b) are compared, it is clear that it is possible to obtain a color image the same as or close to an image obtained by capturing an object using a visible light by capture using an image capturing device of the present invention. That is, it is clear that it is possible to reproduce the color of an object under a visible light by capture using an image capturing device of the present invention using infrared irradiation.

(Tenth Embodiment)

Figure 34:
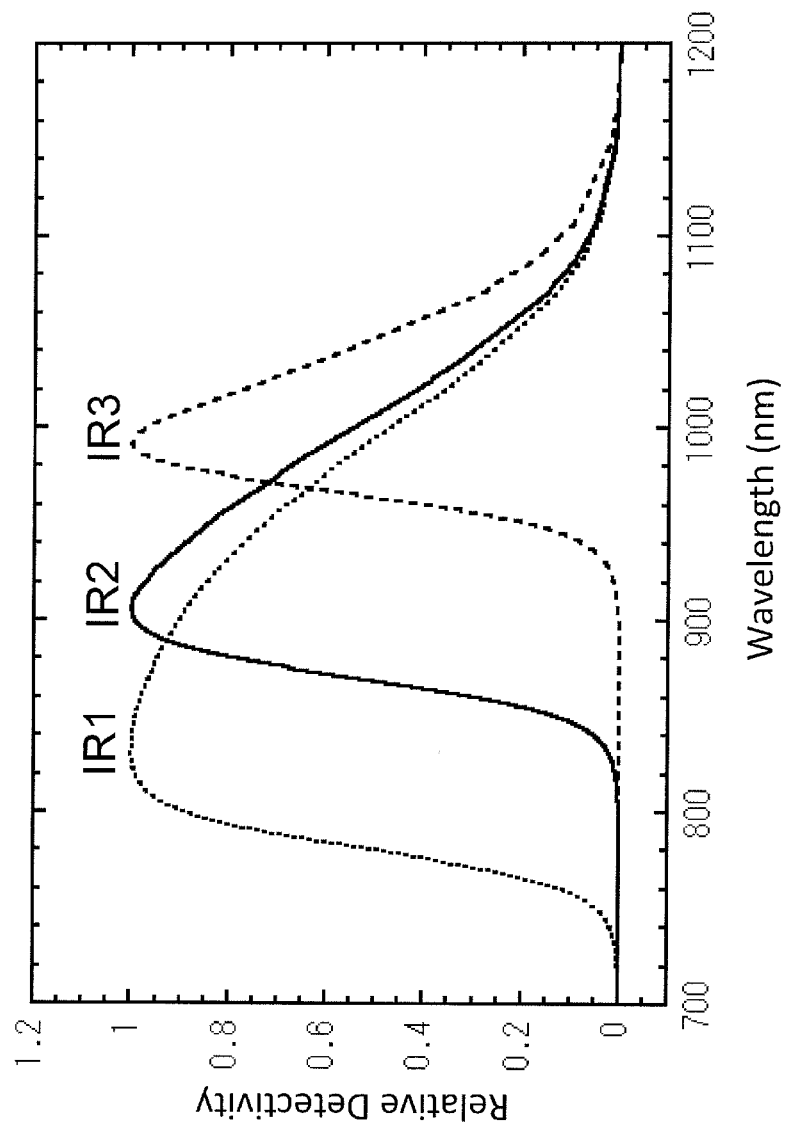
FIG. 34 is a diagram showing a detectivity in embodiment 10 of an image capturing device and an image capturing method in one embodiment of the present invention.

Detecting the intensity of each infrared beam as shown in FIG. 4, FIG. 5, or FIG. 8 is possible by arranging a combination of an optical filter and a detector. As an example of such a combination, FIG. 32 shows properties of three long wavelength pass filters, and FIG. 33 shows an example of a responsivity of a silicon light detector used in the present embodiment. In addition, FIG. 34 shows data which are obtained by applying data which represent each curve in FIG. 32 to the curve in FIG. 33 and normalized with each maximum value. In this case, it can be seen that the intensity of each infrared beam which is separated and detected is similar to an infrared wavelength range shown in FIG. 4, FIG. 5, or FIG. 8.

(Eleventh Embodiment)

Figure 35:
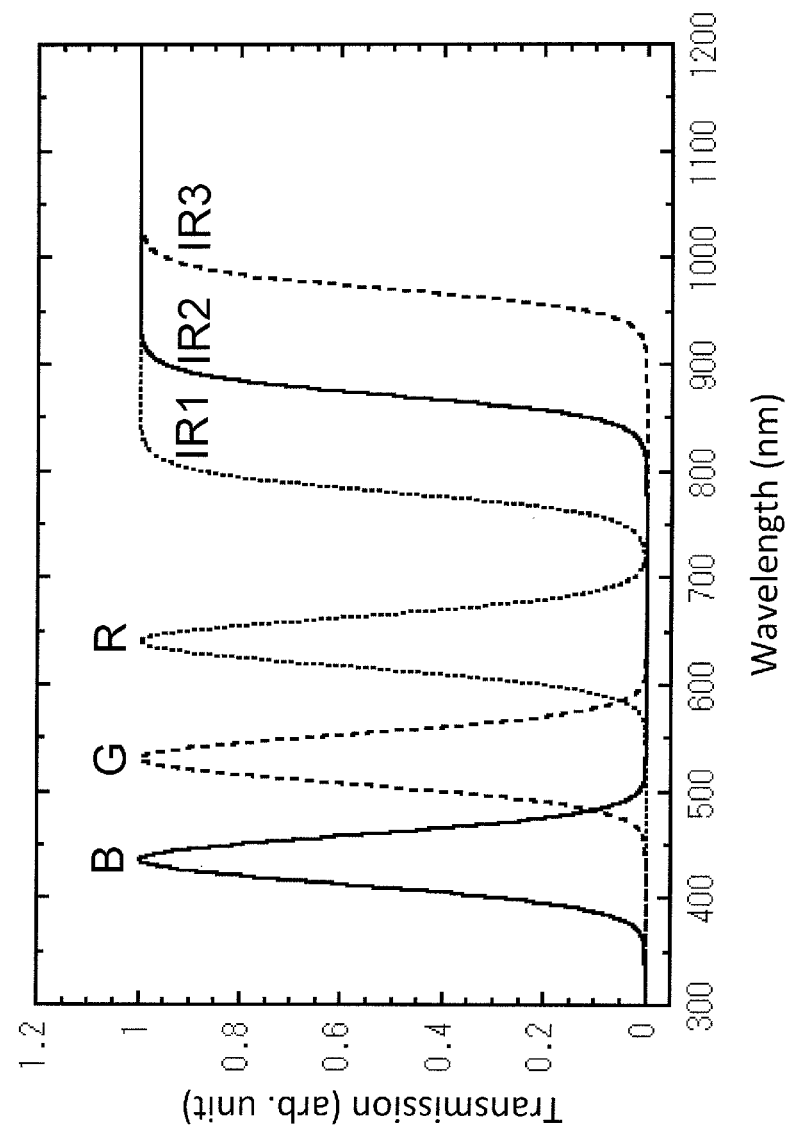
FIG. 35 is an example diagram showing filter properties in embodiment 11 of an image capturing device and an image capturing method in one embodiment of the present invention.
Figure 36:
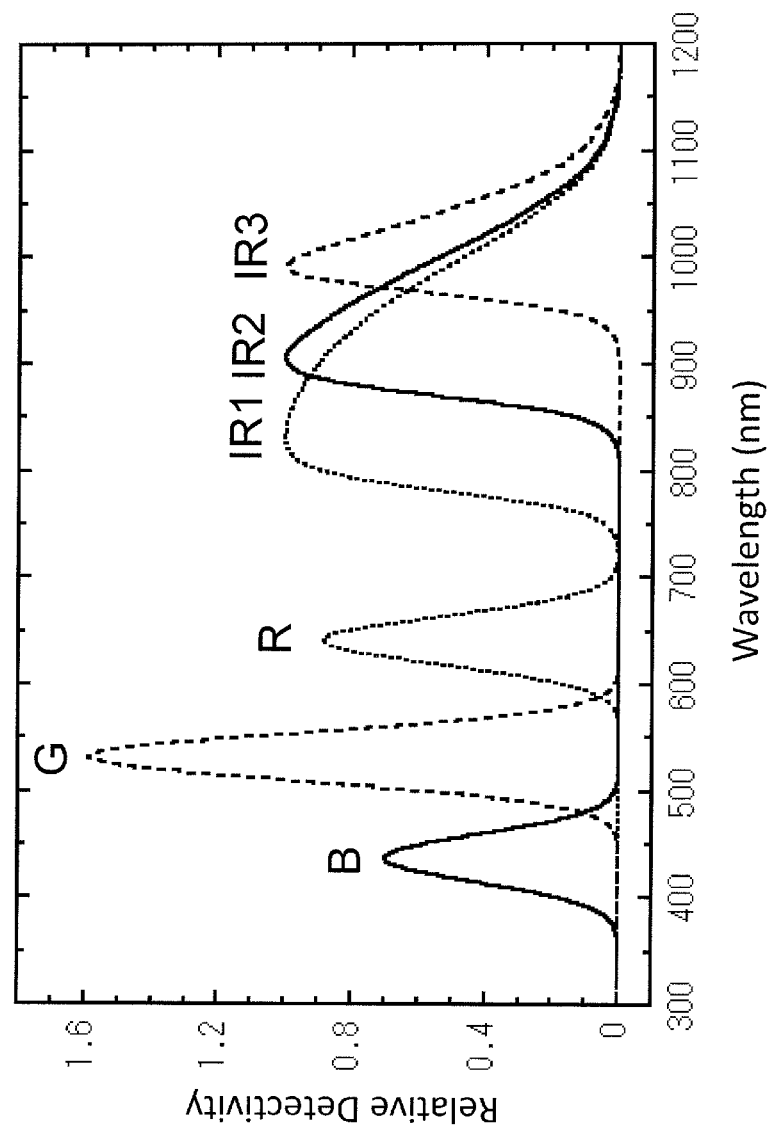
FIG. 36 is a diagram showing a detectivity in embodiment 11 of an image capturing device and an image capturing method in one embodiment of the present invention.

FIG. 35 shows an example of other optical filters. Here, an example of filters is shown where the filters allow "B", "G", and "R" to penetrate in a visible light region, respectively, and allow "second infrared beam", "third infrared beam", and "first infrared beam" to penetrate in an infrared beam region, respectively. Furthermore, FIG. 36 shows data which are obtained by applying data which represent the curve in FIG. 33 to data which represent each curve in FIG. 35 and normalized with each maximum value of peak structures in an infrared light region.

(Twelfth Embodiment)

Figure 37:
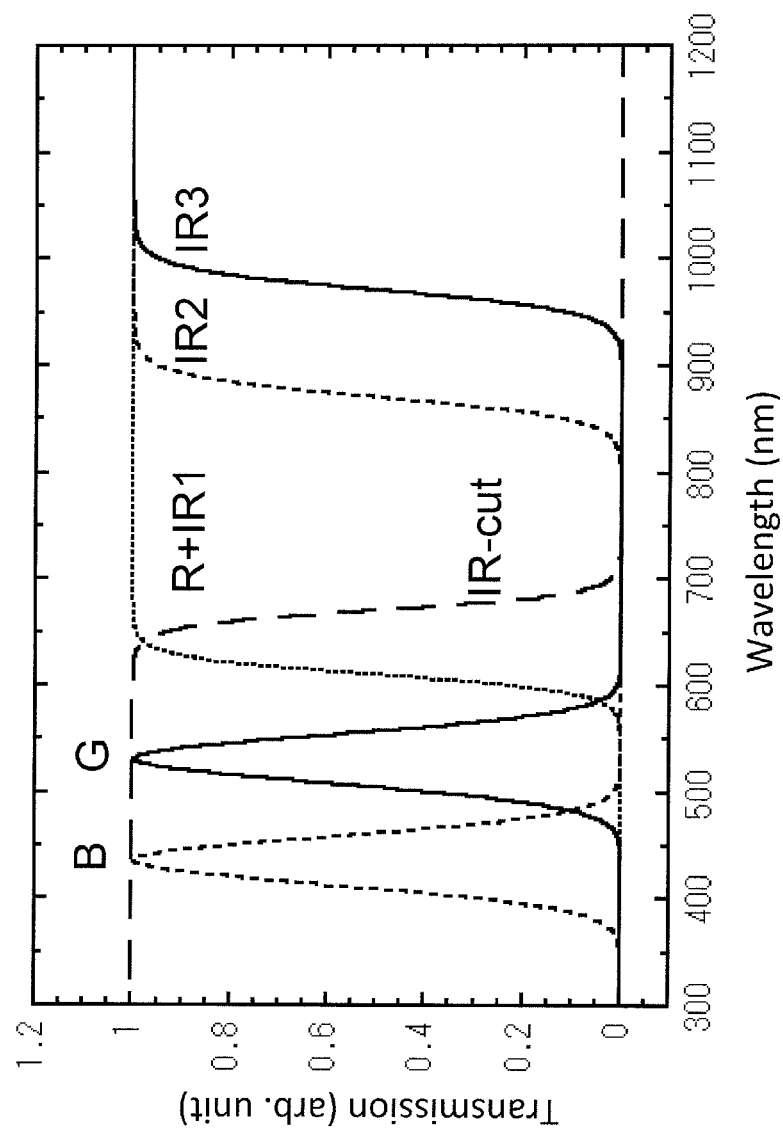
FIG. 37 is an example diagram showing filter properties in embodiment 12 of an image capturing device and an image capturing method in one embodiment of the present invention.
Figure 38:
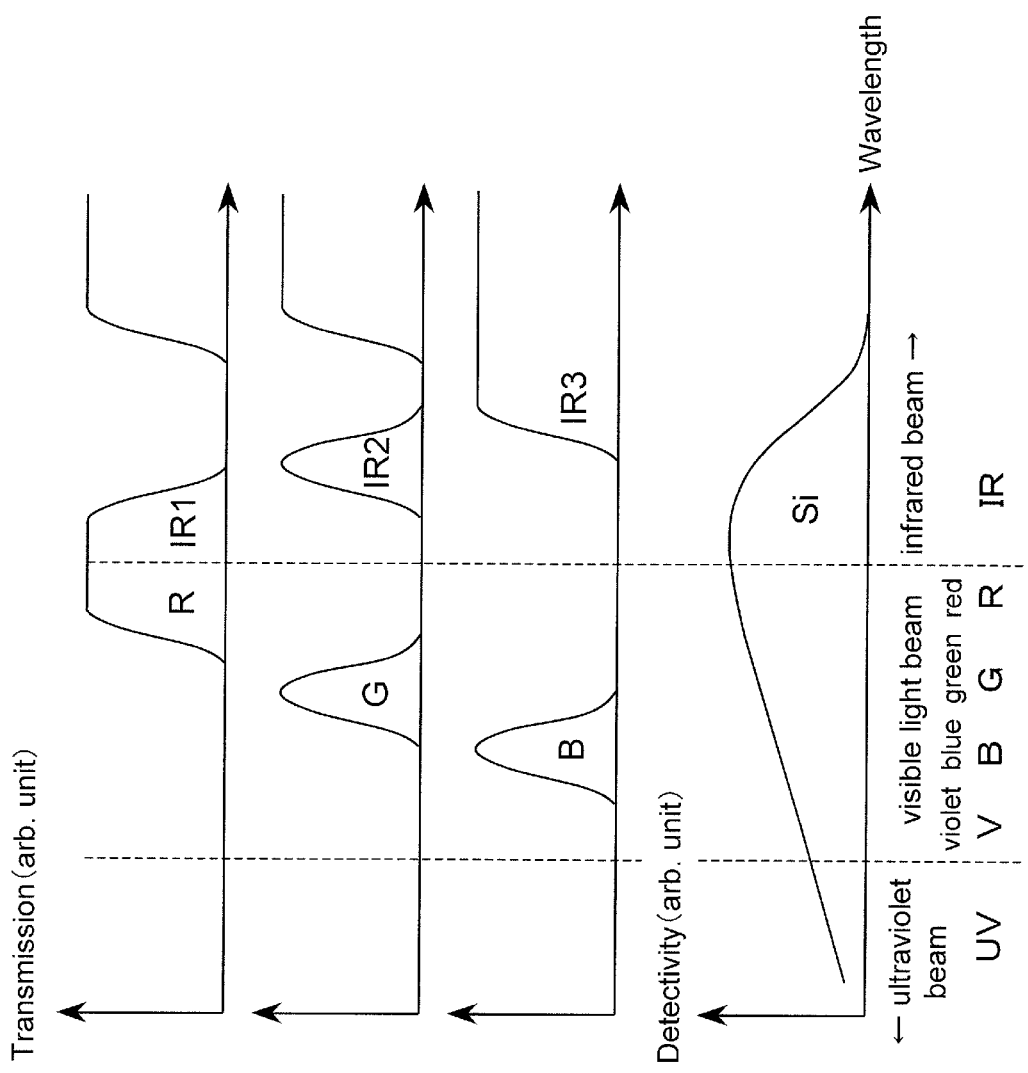
FIG. 38 is a diagram showing an example of filter properties and a responsivity of a silicon image sensor in embodiment 13 of an image capturing device and an image capturing method in one embodiment of the present invention
Figure 39:
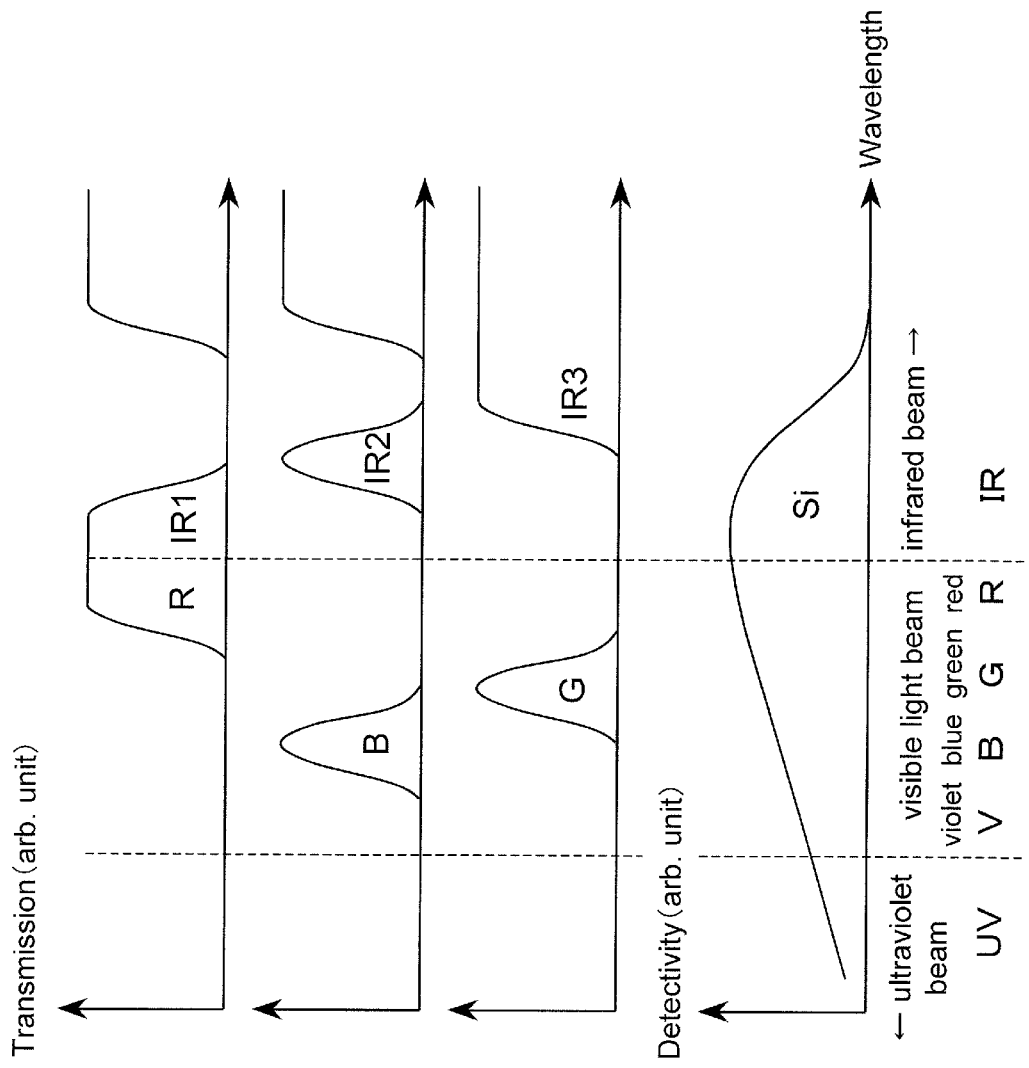
FIG. 39 is a diagram showing an example of filter properties and a responsivity of a silicon image sensor in embodiment 14 of an image capturing device and an image capturing method in one embodiment of the present invention.
Figure 40:
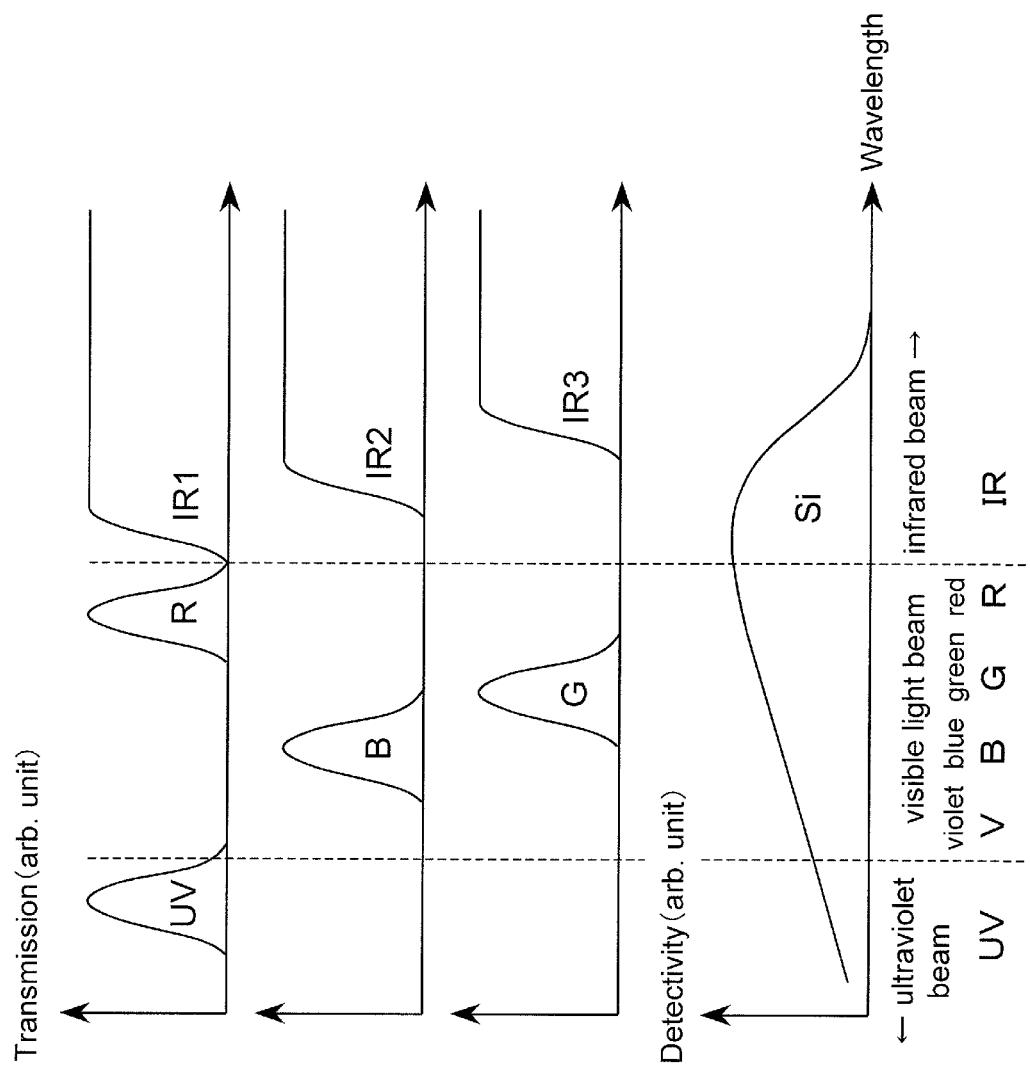
FIG. 40 is a diagram showing an example of filter properties and a responsivity of a silicon image sensor in embodiment 15 of an image capturing device and an image capturing method in one embodiment of the present invention.
Figure 41:
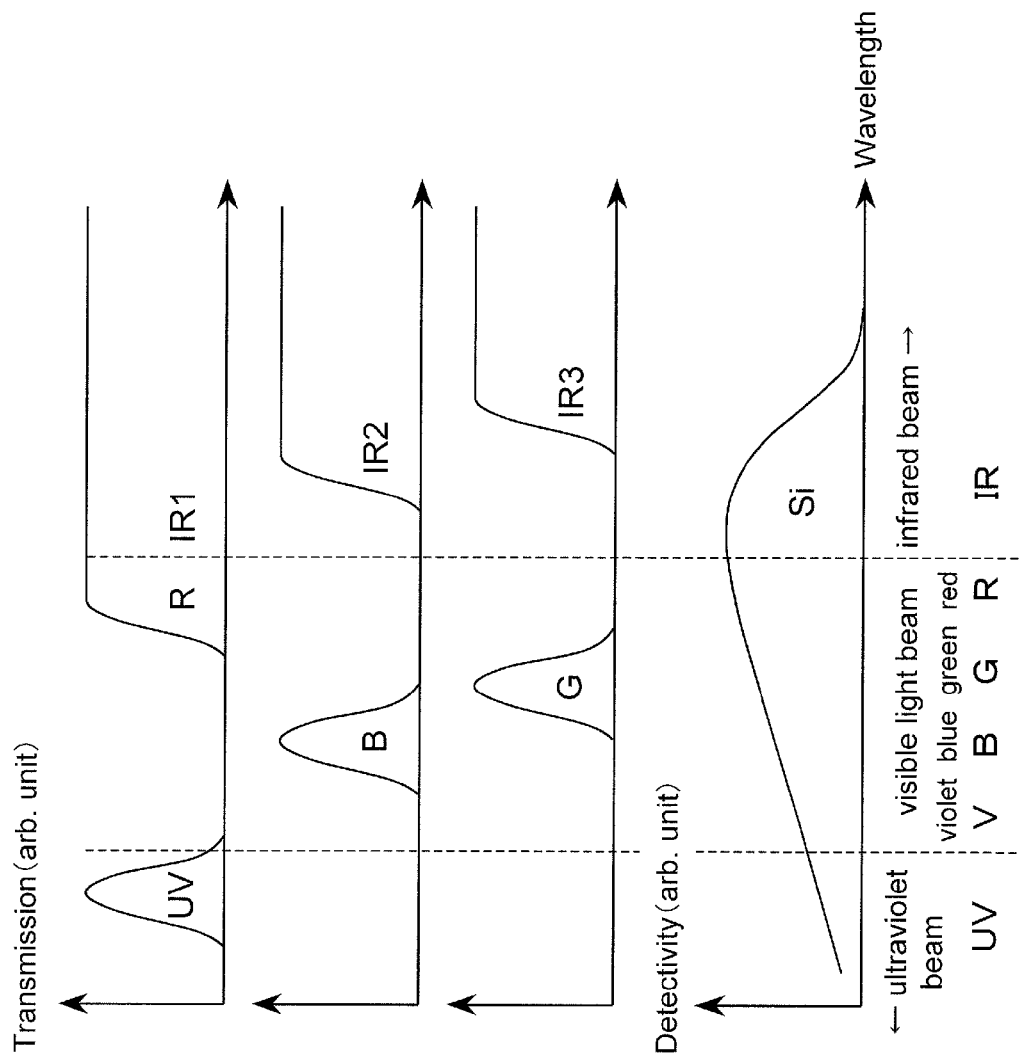
FIG. 41 is a diagram showing an example of filter properties and a responsivity of a silicon image sensor in embodiment 16 of an image capturing device and an image capturing method in one embodiment of the present invention.
Figure 42:
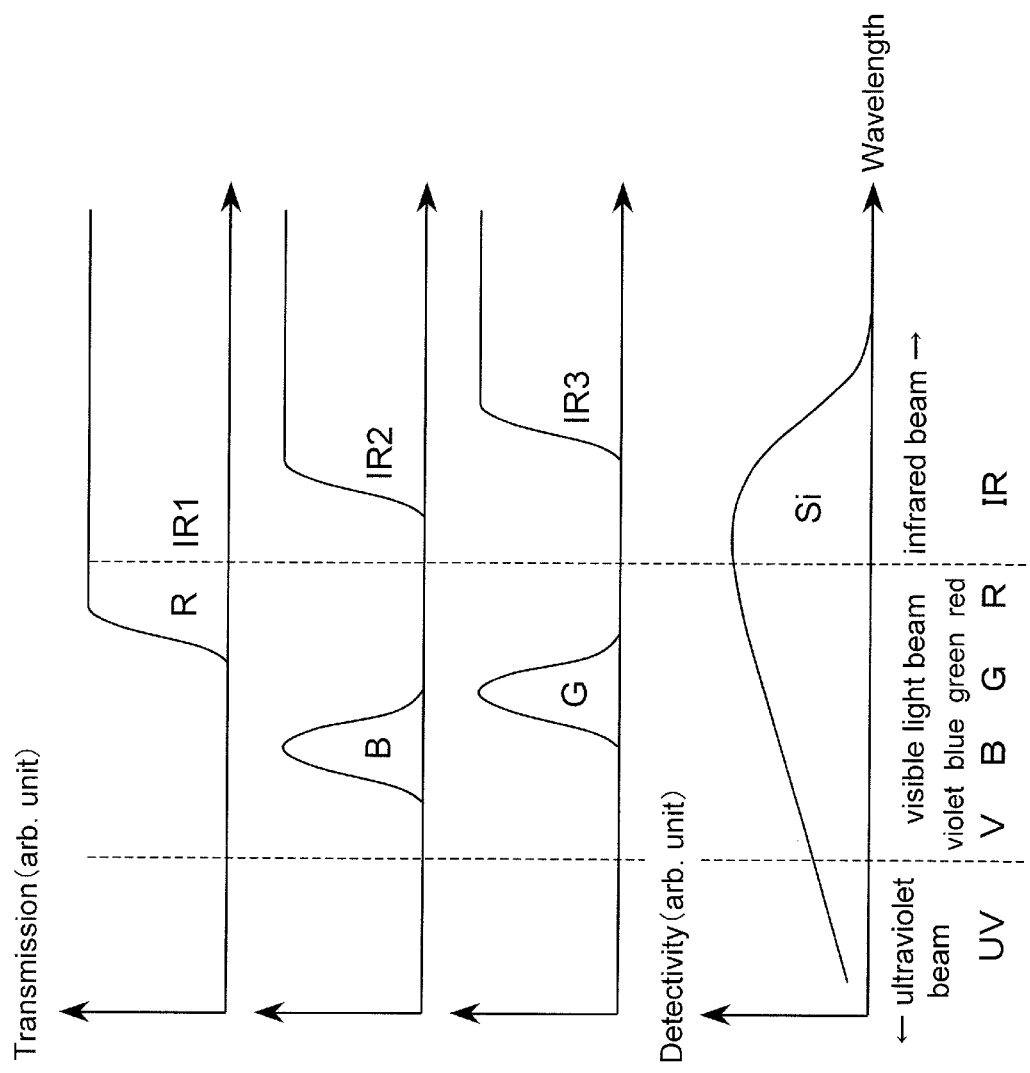
FIG. 42 is a diagram showing an example of filter properties and a responsivity of a silicon image sensor in embodiment 17 of an image capturing device and an image capturing method in one embodiment of the present invention.

FIG. 37 shows a measurement example of transmittance ratios of other optical filters. An example of filters is shown where each filter allows "B" and "second infrared beam", "G" and "third infrared beam", and "R" and "first infrared beam" to penetrate, respectively. In addition, an example of a transmittance ratio of an infrared cut filter (IR-cut) is also shown. It is preferable that the infrared cut filter allows only the visible light region to penetrate and to be used in the case of capturing a visible light image.

(Thirteenth to Seventeenth Embodiments)

FIG. 38 to FIG. 42 show a combination of each optical filter and a responsivity of an silicon image sensor which is a light detector. Each optical filter may be switched according to a capturing condition.

According to an image capturing device and an image capturing method of the present invention, it is possible to form more natural color image of an object in an infrared beam region. In addition, in comparison with conventional monochromatic indication, gray scale indication, mono-color scale indication, or pseudo-color indication, the color images obtained by an image capturing device and an image capturing method of the present invention have much information. Therefore, as an effect, it is possible to provide color images which are more natural and easy to see.

The present invention can capture, display, and store a color still image or a color video of an object in darkness, therefore, it is possible to use the present invention as a camera such as a night vision camera for surveillance or security purposes.

What is claimed is:

1. An image capturing device comprising:
an irradiating part, a capturing part, and a color setting part; wherein
the irradiating part irradiates plurality of infrared beams onto an object, each of the plurality of the infrared beams having different wavelength intensity distributions each other;
the capturing part captures an image of the object using each of a plurality of reflected infrared beams having different wavelength intensity distributions, each of the plurality of the reflected infrared beams being reflected by the object, and forms image data which represent a plurality of images for the each of the plurality of the reflected infrared beams; and
the color setting part sets color data for coloring each of the plurality of the images represented by the image data by using different mono-colors, wherein when the image data is denoted by |C>, the following equations hold;

$|C>=H|I>$, $|C>=(R, G, B)$, $|I>^T=(I_1(x, y), I_2(x, y), I_3(x, y), \ldots, I_n(x, y))$ wherein n is an integer, each of $I_1(x, y)$, $I_2(x, y)$, $I_3(x, y)$, ..., and $I_n(x, y)$ is the image data representing the each of the plurality of the images captured by the capturing part, (x, y) is a position in the each of the plurality of the images, H denotes the color data expressed in a matrix of three rows and n columns, and R, G, and B respectively denote luminosity of "R", "G", and "B" components in three primary colors, $I_1(x, y)$ is captured using the reflected infrared beam having a wavelength intensity distribution located at a shortest wavelength side among the plurality of the reflected infrared beams, and H is selected so that R depends mainly on $I_1(x, y)$.

2. An image capturing device comprising:

a separating part, a capturing part, and a color setting part;
wherein
the separating part separates a light beam from an object into a plurality of infrared beams having different wavelength intensity distributions each other;
the capturing part captures an image of the object using each of the plurality of the infrared beams having different wavelength intensity distributions, and forms image data which represent a plurality of images for each of the plurality of the infrared beams; and
the color setting part sets color data for coloring each of the plurality of the images represented by the image date by using different mono-colors, wherein when the image data is denoted by |C>, the following equations hold:

$|C> = H|I>$, $|C> = (R, G, B)$, $|I>^T = (I_1(x, y), I_2(x, y), I_3(x, y), \ldots, I_n(x, y))$ wherein n is an integer, each of $I_1(x, y)$, $I_2(x, y)$, $I_3(x, y)$, ..., and $I_n(x, y)$ is the image data representing the each of the plurality of the images captured by the capturing part, (x, y) is a position in the each of the plurality of the images, H denotes the color data expressed in a matrix of three rows and n columns, and R, G, and B respectively denote luminosity of "R", "G", and "B" components in three primary colors, $I_1(x, y)$ is captured using the infrared beam having a wavelength intensity distribution located at a shortest wavelength side among the plurality of the infrared beams, and H is selected so that R depends mainly on $I_1(x, y)$.

3. An image capturing device comprising:

a separating part, a capturing part, and a color setting part;
wherein
the separating part separates a light beam from an object into a plurality of light beams having different wavelength intensity distributions each other;
the capturing part captures an images of the object using each of the plurality of the light beams having different wavelength intensity distributions and forms image data which represent a plurality of images for each of the plurality of the light beams; and
the color setting part sets color data for coloring each of the plurality of the images represented by the image data by using different mono-colors, wherein when the image data is denoted by |C>, the following equations hold:

$|C> = H|I>$, $|C> = (R, G, B)$, $|I>^T = (I_1(x, y), I_2(x, y), I_3(x, y), \ldots, I_n(x, y))$ wherein n is an integer, each of $I_1(x, y)$, $I_2(x, y)$, $I_3(x, y)$, ..., and $I_n(x, y)$ is the image data representing the each of the plurality of the images captured by the capturing part, (x, y) is a position in the each of the plurality of the images, H denotes the color data expressed in a matrix of three rows and n columns, and R, G, and B respectively denote luminosity of "R", "G", and "B" components in three primary colors, $I_1(x, y)$ is captured using the light beam having a visible light having "R wavelength region" and an infrared beam having a wavelength intensity distribution closest to the "R wavelength region" among the plurality of the light beams, and H is selected so that R depends mainly on $I_1(x, y)$.

4. An image capturing device comprising:

an irradiating part, a separating part, a capturing part, and a color setting part;
wherein
the irradiating part irradiates a plurality of infrared beams onto an object, each of the plurality of the infrared beams having different wavelength intensity distributions each other;
the separating part separates a visible light beam from the object into a plurality of visible light beams having different wavelength intensity distributions each other;
the capturing part captures an image of the object using each of a plurality of reflected infrared beams having different wavelength intensity distributions, the each of the plurality of the reflected infrared beams being reflected by the object, and each of the plurality of the visible light beams having different wavelength intensity distributions, and forms image data which represent a plurality of images for the each of the plurality of the reflected infrared beams and the each of the plurality of the visible light beams; and
the color setting part sets color data for coloring each of the plurality of the images represented by the image data by using different mono-colors, wherein when the image data is denoted by |C>, the following equations hold:

$|C> = H|I>$, $|C> = (R, G, B)$, $|I>^T = (I_1(x, y), I_2(x, y), I_3(x, y), \ldots, I_n(x, y))$ wherein n is an integer, each of $I_1(x, y)$, $I_2(x, y)$, $I_3(x, y)$, ..., and $I_n(x, y)$ is the image data representing the each of the plurality of the images captured by the capturing part, (x, y) is a position in the each of the plurality of the images, H denotes the color data expressed in a matrix of three rows and n columns, and R, G, and B respectively denote luminosity of "R", "G", and "B" components in three primary colors, $I_1(x, y)$ is captured using the reflected infrared beam having a wavelength intensity distribution located at a shortest wavelength side among the plurality of the reflected infrared beams and the visible light beam having "R wavelength region", and H is selected so that R depends mainly on $I_1(x, y)$.

5. The image capturing device according to claim 1, wherein n=3.

6. The image capturing device according to claim 1, wherein n=3 and $$H = \begin{pmatrix} \alpha_1 & \alpha_2 & \alpha_3 \\ \beta_1 & \beta_2 & \beta_3 \\ \gamma_1 & \gamma_2 & \gamma_3 \end{pmatrix}$$

where $\alpha 2$, $\alpha 3$, $\beta 1$, $\beta 2$, $\gamma 1$, and $\gamma 3$ are zero or small enough when compared with other elements of H.

7. The image capturing device according to claim 2, wherein n=3.

8. The image capturing device according to claim 2, wherein n=3 and $$H = \begin{pmatrix} \alpha_1 & \alpha_2 & \alpha_3 \\ \beta_1 & \beta_2 & \beta_3 \\ \gamma_1 & \gamma_2 & \gamma_3 \end{pmatrix}$$

where $\alpha 2$, $\alpha 3$, $\beta 1$, $\beta 2$, $\gamma 1$, and $\gamma 3$ are zero or small enough when compared with other elements of H.

9. The image capturing device according to claim 3, wherein n=3.

10. The image capturing device according to claim 3, wherein n=3 and $$H = \begin{pmatrix} \alpha_1 & \alpha_2 & \alpha_3 \\ \beta_1 & \beta_2 & \beta_3 \\ \gamma_1 & \gamma_2 & \gamma_3 \end{pmatrix}$$

where $\alpha 2$, $\alpha 3$, $\beta 1$, $\beta 2$, $\gamma 1$, and $\gamma 3$ are zero or small enough when compared with other elements of H.

11. The image capturing device according to claim 4, wherein n=3.

12. The image capturing device according to claim 4, wherein n=3 and $$H = \begin{pmatrix} \alpha_1 & \alpha_2 & \alpha_3 \\ \beta_1 & \beta_2 & \beta_3 \\ \gamma_1 & \gamma_2 & \gamma_3 \end{pmatrix}$$

where $\alpha 2$, $\alpha 3$, $\beta 1$, $\beta 2$, $\gamma 1$, and $\gamma 3$ are zero or small enough when compared with other elements of H.

13. The image capturing device according to claim 2, wherein the capturing part further comprises a plurality of pixels, the separating part being attached to each of the plurality of the pixels.

14. The image capturing device according to claim 3 wherein the capturing part further comprises a plurality of pixels, the separating part being attached to each of the plurality of the pixels.

15. The image capturing device according to claim 4 wherein the capturing part further comprises a plurality of pixels, the separating part being attached to each of the plurality of the pixels.

16. The image capturing device according to claim 2, further comprising an irradiating part which irradiates an infrared beam onto the object.

17. The image capturing device according to claim 3 further comprising an irradiating part which irradiates an infrared beam onto the object.

* * * * *